(12) United States Patent
Yoshizawa

(10) Patent No.: US 8,153,246 B2
(45) Date of Patent: Apr. 10, 2012

(54) OPTICAL COMPENSATORY FILM, POLARIZING PLATE, AND LIQUID CRYSTAL DISPLAY DEVICE

(75) Inventor: Masataka Yoshizawa, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 983 days.

(21) Appl. No.: 12/088,164

(22) PCT Filed: Sep. 27, 2006

(86) PCT No.: PCT/JP2006/319813
§ 371 (c)(1),
(2), (4) Date: Mar. 26, 2008

(87) PCT Pub. No.: WO2007/037497
PCT Pub. Date: Apr. 5, 2007

(65) Prior Publication Data
US 2009/0273740 A1    Nov. 5, 2009

(30) Foreign Application Priority Data
Sep. 28, 2005   (JP) .................................. 2005-281833

(51) Int. Cl.
*B32B 5/16* (2006.01)
(52) U.S. Cl. .................. 428/313.3; 428/323; 428/411.1; 428/421; 349/75; 349/167
(58) Field of Classification Search ............... 428/313.3, 428/411.1, 323; 429/421; 349/75, 167
See application file for complete search history.

(56) References Cited

U.S. PATENT DOCUMENTS

| | | | | |
|---|---|---|---|---|
| 7,273,690 B2 * | 9/2007 | Kodama et al. | ............ | 430/270.1 |
| 2005/0186505 A1 * | 8/2005 | Kodama et al. | ............ | 430/270.1 |

FOREIGN PATENT DOCUMENTS

JP    2003-292805    * 10/2003
(Continued)

OTHER PUBLICATIONS

Form PCT/ISA/210 (International Search Report) dated Jan. 9, 2007.
(Continued)

*Primary Examiner* — Peter D. Mulcahy
*Assistant Examiner* — Henry Hu
(74) *Attorney, Agent, or Firm* — Buchanan Ingersoll & Rooney PC

(57) ABSTRACT

An optical compensatory film comprising an optically anisotropic layer composed of a liquid crystal composition including a liquid crystal compound, wherein the liquid crystal composition contains a copolymer including a repeating unit derived from a monomer of formula [1] and a repeating unit derived from a monomer of formula [2]:

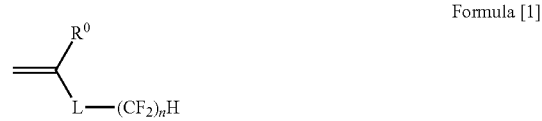

Formula [1]

wherein $R^0$ represents a hydrogen atom, a halogen atom or an alkyl group, L represents a divalent linking group, and n represents an integer of 1-18;

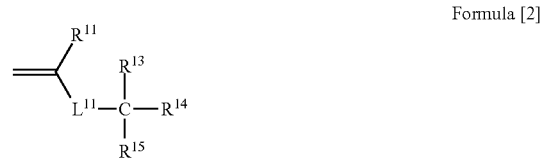

Formula [2]

wherein $R^{11}$ represents a hydrogen atom, a halogen atom or an alkyl group, $L^{11}$ represents a divalent linking group, and $R^{13}$, $R^{14}$ and $R^{15}$ represents a hydrocarbon group or an aromatic heterocyclic group.

5 Claims, 3 Drawing Sheets

FOREIGN PATENT DOCUMENTS

| | | | |
|---|---|---|---|
| JP | 2004-331812 | * | 11/2004 |
| JP | 2004-333861 A | | 11/2004 |
| JP | 2005-194451 A | | 7/2005 |
| JP | 2005-196064 A | | 7/2005 |
| JP | 2005-206638 A | | 8/2005 |
| JP | 2005-215398 A | | 8/2005 |
| WO | WO-2006/080456 A1 | * | 8/2006 |

OTHER PUBLICATIONS

Form PCT/ISA/237 (Written Opinion of the International Searching Authority) dated Dec. 25, 2006.

* cited by examiner

OPTICAL COMPENSATORY FILM, POLARIZING PLATE, AND LIQUID CRYSTAL DISPLAY DEVICE

TECHNICAL FIELD

The present invention relates to an optical compensatory film that contributes to widen the viewing angle of a liquid crystal display device, and a polarizing plate using the same. Further, the invention relates to a liquid crystal display device, in particular liquid crystal display device of an in-plane switching mode in which display is carried out by applying a lateral electric field to liquid crystal molecules aligning in the horizontal direction.

BACKGROUND ART

Widely used is a liquid crystal display device with a system in which a liquid crystal layer of twist-arranged nematic liquid crystals are interposed between two orthogonal polarizing plates and an electric field is applied in the perpendicular direction to the substrate, so-called TN mode. In the system, since the liquid crystal rises relative to the substrate at the time of black level, when viewed from an oblique direction, birefringence due to the liquid crystal molecule generates and light leakage occurs. To solve the problem, a system, in which a film in which liquid crystalline molecules are hybrid-aligned is used to optically compensate a liquid crystal cell and prevent the light leakage, is put into practical use. However, even when liquid crystalline molecules are used, it is very difficult to optically compensate a liquid crystal cell completely without problem, thereby generating such problem that graduation reversal in the bottom of a screen can not completely suppressed.

In order to solve such problem, there have been proposed and put into practical use a liquid crystal display device according to so-called in-plane switching (IPS) mode in which a lateral electric field is applied to the liquid crystal, and vertical alignment (VA) mode in which a liquid crystal having negative permittivity anisotropy is vertically aligned and alignment-divided by a protrusion or slit electrode formed in a panel. Recently, these panels are being developed not only for monitor application but also for TV application, and, concurrently, luminance of the screen has been significantly improved. Therefore, slight light leakage in a diagonally oblique incident direction at the time of black level, which was conventionally not seen as a problem in these operation modes, has come to the surface as a cause of the lowering of display quality.

As one of means for improving hue or viewing angle at black level display, arrangement of an optical compensatory material having birefringence property between a liquid crystal layer and a polarizing plate is also examined in IPS mode. For example, there is disclosed that, by arranging birefringence media having function of compensating increase and decrease in retardation of a liquid crystal layer in an inclined state while setting optical axes to be perpendicular to each other between a substrate and a polarizing plate, coloring when white level display or gray level display is looked from an oblique direction can be improved (see JP-A-9-80424). Further, there are proposed a method in which an optical compensatory film composed of a styrene-based polymer having negative intrinsic birefringence or a discotic liquid crystal compound is used (see JP-A-10-54982, JP-A-11-202323, JP-A-9-292522), a method in which a film having positive birefringence and an optical axis within the plane thereof and a film having positive birefringence and an optical axis in the normal direction thereof are combined as an optical compensatory film (see JP-A-11-133408), a method in which a biaxial optical compensatory sheet having retardation of half wavelength is used (see JP-A-11-305217), and a method in which, while using a film having negative retardation as a protective film of a polarizing plate, an optical compensatory layer having positive retardation is provided on the surface thereof (see JP-A-10-307291).

However, since most of the proposed systems are systems in which viewing angle is improved by canceling anisotropy of birefringence of liquid crystal in a liquid crystal cell, there is such problem that light leakage based on departure of cross angle of polarizing axes from orthogonality when orthogonal polarizing plates are viewed from an oblique direction can not sufficiently solved. Further, it is very difficult to optically compensate a liquid crystal cell completely without problem even in a system that is said to be capable of compensating this light leakage. Further, in an optical compensatory sheet for an IPS mode liquid crystal cell in which optical compensation is carried out by a stretched birefringence polymer film, the use of plural films is necessary. As the result, the thickness of the optical compensatory sheet increases, which is disadvantageous for thinning a display device. Further, since a sticky layer is used for laminating stretched films, the sticky film contracts due to variation of temperature and humidity to lead to generation of such defects as delamination between films and warpage.

On the other hand, a method has been examined to achieve optical compensation of IPS by combining retardation films having positive birefringence and an optical axis in the normal direction. In order to realize such retardation film, a method is known in which a liquid crystal material is aligned vertically and the alignment state is fixed (e.g., see JP-T-2000-514202 (the term "JP-T" as used herein means a published Japanese translation of a PCT patent application), JP-A-10-319408, JP-A-6-331826).

As a method for aligning a rod-shaped liquid crystal compound vertically, a method in which a vertical alignment film is employed, or a method in which a layer of vertical aligning agent (e.g., a silane-coupling agent substituted by quaternary ammonium) is formed on a substrate and a layer of a liquid crystal compound is formed on it, is proposed (e.g., Okano Mitsuharu et al. "Liquid Crystal" Applications, Baihu-kan (1985) p 61; Inamura Shohei Appl. Phys, Lett. vol. 33, No. 1978, P 1-3). However, recently, requirement for display property of a monitor has become difficult and a conventionally known anisotropic substance having been fixed by a vertical alignment system is not sufficient in micro uniformity, thus improvement of which is required.

In addition, conventional techniques developed optical compensatory sheets mainly assuming compact-sized or medium-sized liquid crystal display devices of 15 inches or less. However, recently, it is necessary also to assume liquid crystal display devices of 17 inches or more with high luminance.

It is known that improvement of leveling property is effective in order to reduce unevenness at drying. As a means for improving leveling property, a method of adding surfactant in a coating composition is proposed. This bases on such mechanism that addition of surfactant in a coating liquid lowers surface tension thereof to improve wettability to a body to be coated and diminishes or lowers variation of the surface tension in a formation process of a coated film, thereby preventing heat convection to improve uniformity of the film (see "Current Techniques of Additives for Coating" Kiryu Haruo (edition), CMC, 2001). Although the most appropriate type of surfactant varies depending on compatibility and the like with a solvent, a resin and various types of additives in an intended coating composition, in the case of solvent coating, the use of a fluorine-containing surfactant, which is soluble in a solvent and has the highest performance of reducing surface tension, is effective.

Generally, a fluorine-containing surfactant is composed of a compound having, in one molecule, a fluoroaliphatic group for realizing function of reducing surface tension and a lyophilic group for contributing affinity to various compositions for such applications as coating and molding substance when the surfactant is used as an additive. Such compound can be obtained by copolymerizing a monomer having a fluoroaliphatic group and a monomer having a lyophilic group.

Typical examples of the monomer having a lyophilic group to be copolymerized with a monomer having a fluoroaliphatic group include poly(oxyalkylene) acrylate and poly(oxyalkylene) methacrylate. Further, JP-A-2004-333852 discloses an optical film in which both of improvement of unevenness in thickness caused by drying air and optical performance are satisfied by an ω-H type fluorine-containing polymer surfactant.

However, when a conventional fluorine-containing surfactant is used, although drying marks and unevenness in thickness caused by drying air is improved, there is such problem as generation of coating unevenness to lower grade of the coated optical compensatory film. Further, JP-A-10-309455 discloses a fluorine-containing surfactant containing an ethylenic unsaturated monomer having a branched aliphatic hydrocarbon group, but it does not describe about an optical compensatory film and does not clarify the effect thereof.

DISCLOSURE OF THE INVENTION

Purposes of the present invention are:
(1) to provide an optical film including a fluoroaliphatic group-containing polymer capable of satisfying both of reducing drying marks unevenness in thickness caused by drying air, and not degrading coating unevenness, and
(2) to provide a polarizing plate and a liquid crystal display device having a good display grade employing such optical film.

As the result of careful examination about the structure of a fluoroaliphatic group in a fluoroaliphatic group-containing monomer being a constituent of a fluorine-containing surfactant, and the composition of a fluoroaliphatic group-containing monomer and a fluoroaliphatic group-free monomer in a fluorine-containing surfactant, the present inventors found that, by using a fluorine-containing surfactant including a fluoroaliphatic group-free monomer having a cyclic hydrocarbon and a fluoroaliphatic group-containing monomer having a specified structure, a composition that reduces drying marks and unevenness in thickness caused by drying air at coating and does not degrade coating unevenness can be obtained.

In other word, the above-described purposes of the invention was achieved by under-mentioned means.

[1] An optical compensatory film having an optically anisotropic layer composed of a liquid crystal composition including a liquid crystal compound, wherein the liquid crystal composition contains at least one type of fluoroaliphatic group-containing copolymer including a repeating unit derived from a fluoroaliphatic group-containing monomer represented by the following formula [1] and a repeating unit derived from a monomer represented by the following formula [2]:

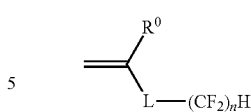

Formula [1]

wherein $R^0$ represents a hydrogen atom, a halogen atom or an alkyl group, L represents a divalent linking group, and n represents an integer in the range of 1-18;

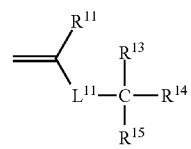

Formula [2]

wherein $R^{11}$ represents a hydrogen atom, a halogen atom or an alkyl group, $L^{11}$ represents a divalent linking group, and $R^{13}$, $R^{14}$ and $R^{15}$ each independently represents a straight-chain, branched or cyclic hydrocarbon group having 1-20 carbon atoms or an aromatic heterocyclic group, which may have a substituent.

[2] The optical compensatory film described in item [1], wherein the fluoroaliphatic group-containing monomer represented by the above-described formula [1] is represented by the following formula [3]:

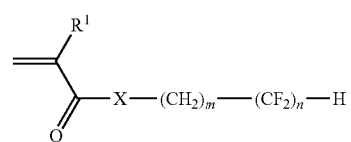

Formula [3]

wherein $R^1$ represents a hydrogen atom, a halogen atom or an alkyl group, X represents an oxygen atom, a sulfur atom or —N(Ra)—, m represents an integer in the range of 1-6, and n represents an integer in the range of 1-18. Ra represents a hydrogen atom or an alkyl group having 1-8 carbon atoms, which may have a substituent.

[3] An optical compensatory film having an optically anisotropic layer composed of a liquid crystal composition including a liquid crystal compound, wherein the liquid crystal composition contains at least one type of fluoroaliphatic group-containing copolymer including a repeating unit derived from a fluoroaliphatic group-containing monomer represented by the following formula [4] and a repeating unit derived from a monomer represented by the following formula [2]:

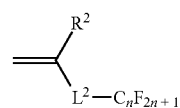

Formula [4]

wherein $R^2$ represents a hydrogen atom, a halogen atom or an alkyl group, $L^2$ represents a divalent linking group, and n represents an integer in the range of 1-6;

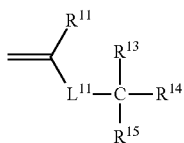

Formula [2]

wherein $R^{11}$ represents a hydrogen atom, a halogen atom or an alkyl group, $L^{11}$ represents a divalent linking group, and $R^{13}$, $R^{14}$ and $R^{15}$ each independently represents a straight-chain, branched or cyclic hydrocarbon group having 1-20 carbon atoms or an aromatic heterocyclic group, which may have a substituent.

[4] The optical compensatory film described in item [3], wherein the fluoroaliphatic group-containing monomer represented by the above-described formula [4] is represented by the following formula [5]:

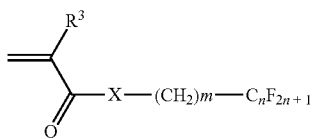

Formula [5]

wherein $R^3$ represents a hydrogen atom, a halogen atom or an alkyl group, X represents an oxygen atom, a sulfur atom or —N(Rb)—, m represents an integer in the range of 1-6, and n represents an integer in the range of 1-6. $R^b$ represents a hydrogen atom or an alkyl group having 1-8 carbon atoms, which may have a substituent.

[5] The optical compensatory film described in any of items [1]-[4], wherein the monomer represented by above-described formula [2] is represented by the following formula [7]:

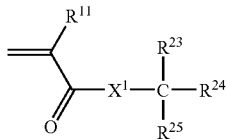

Formula [7]

wherein $R^{11}$ represents a hydrogen atom, a halogen atom or a methyl group, $X^1$ represents an oxygen atom, a sulfur atom or —N(Rc)—, $R^{23}$, $R^{24}$, $R^{25}$ each independently represents a strait-chain, branched or cyclic alkyl group having 1-20 carbon atoms. Rc represents a hydrogen atom or an alkyl group having 1-8 carbon atoms, which may have a substituent.

[6] The optical compensatory film described in any of items [1]-[5], wherein the liquid crystal compound is a rod-shaped liquid crystal compound, and the liquid crystal compound is substantially vertically aligned.

[7] A polarizing plate having the optical compensatory film described in any of items [1]-[6] and a polarizing film.

[8] A liquid crystal display device having the optical compensatory film described in any of items [1]-[6], or the polarizing plate described in item [7].

According to the invention, it is possible to provide an optical compensatory film that can reduce drying marks and unevenness in thickness caused by drying air without degrading coating unevenness. Further, according to the invention, it is possible to provide a polarizing plate and a liquid crystal display device having a good display grade employing such optical compensatory film.

BEST MODE FOR CARRYING OUT THE INVENTION

Figure 1:
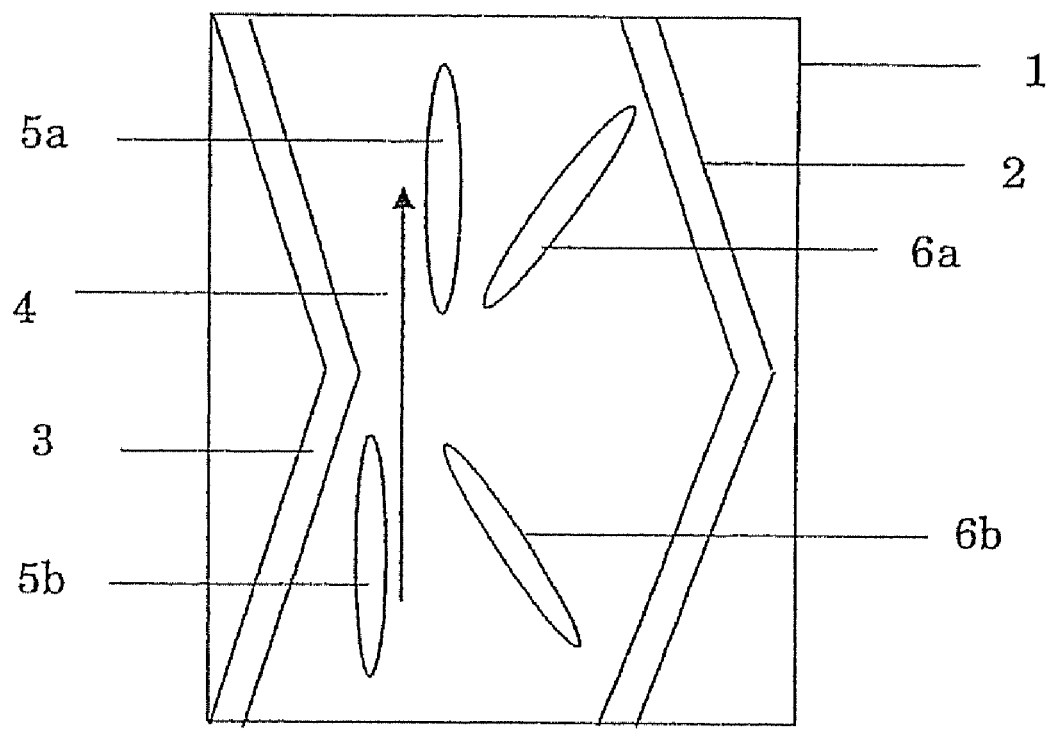
FIG. 1 is a schematic view showing an example of a pixel region of the liquid crystal display device of the invention.

The present invention will be described in detail hereinafter. Constituent features may be described below occasionally on the basis of typical embodiments of the invention, but the invention is not restricted to these embodiments. In this connection, the range of numerical values represented by using "–" herein means a range that includes numerical values described before and after "–" as the lower limit and the upper limit, respectively.

Re(λ) and Rth(λ) as used herein represent in-plane retardation and retardation in the thickness direction at a wavelength of λ, respectively. Re(λ) is measured by irradiating light having a wavelength of λ nm in the normal direction of a film in KOBRA 21ADH (manufactured by Oji Scientific Instruments). Rth(λ) is calculated by KOBRA 21ADH on the basis of retardation values measured in total 3 directions, that is, the aforementioned Re(λ), a retardation value measured by irradiating light having a wavelength of λ nm from a direction tilted by +40° relative to the film normal direction while taking an in-plane slow phase axis (judged by KOBRA 21ADH) as a tilt axis (rotation axis), and a retardation value measured by irradiating light having a wavelength of λ nm from a direction tilted by −40° relative to the film normal direction while taking an in-plane slow phase axis as a tilt axis (rotation axis). As the wavelength λ, usually, a value in the range of 450-750 nm is used. In the present application, a value of 589 nm is used. Here, as a presumptive value of an average refractive index, values in Polymer Handbook (JOHN WILEY & SONS, INC) and catalogs of various optical films can be used. For a material whose average refractive index is not known, it can be measured with an Abbe refractometer. Average values of refractive index of prevailing optical films are exemplified below: cellulose acylate (1.48), cycloolefin polymer (1.52), polycarbonate (1.59), polymethyl methacrylate (1.49), and polystyrene (1.59). By inputting a presumptive value of the average refractive index and a film thickness, KOBRA 21ADH calculates nx, ny and nz. From the calculated nx, ny and nz, Nz=(nx−nz)/(nx−ny) is further calculated.

"Parallel" and "vertical" as used herein mean an angle in the range of the accurate angle less than 10°. The error from the accurate angle is preferably in the range of ±less than 5°, more preferably less than 2°. "Substantially vertical" means an angle in the range of the accurate vertical angle±less than 20°. The error from the accurate angle is preferably in the range of less than 15°, more preferably less than 10°. "A slow phase axis" means a direction in which the refractive index becomes maximum. A measurement wavelength of the refractive index is λ=550 nm in the visible light range unless otherwise specified.

"A polarizing plate" as used herein means to include both of a long polarizing plate and a polarizing plate cut ("cut" as used herein includes "punched" and "cutout" and the like) into a size to be assembled in a liquid crystal device unless otherwise specified. "A polarizing film" and "polarizing plate" are used with distinction herein, wherein "a polarizing plate" means a laminated body having a transparent protective film on at least one face of "the polarizing film" for protecting the polarizing film.

Preferable embodiments of the optical compensatory film, the polarizing plate and the liquid crystal display device will be described in detail below.

Optical Compensatory Film

First, the optical compensatory film of the invention will be described. The optical compensatory film of the invention has an optically anisotropic layer composed of a liquid crystal composition including a liquid crystal compound, wherein the liquid crystal composition is characterized by containing at least one type of copolymer having a fluoroaliphatic group (hereinafter, it is occasionally abbreviated as "a fluoroaliphatic group-containing copolymer"). Various embodiments of the invention will be described below.

A first embodiment of the invention relates to an optical compensatory film having an optically anisotropic layer composed of a liquid crystal composition containing at least one type of fluoroaliphatic group-containing copolymer including a repeating unit derived from a monomer of the following (i) and a repeating unit derived from a monomer of the following (ii).

(i) A fluoroaliphatic group-containing monomer represented by the following formula [1]:

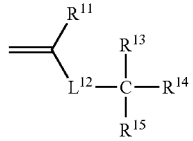

Formula [1]

wherein $R^0$ represents a hydrogen atom, a halogen atom or an alkyl group, L represents a divalent linking group, and n represents an integer in the range of 1-18.

(ii) A monomer represented by the following formula [2]:

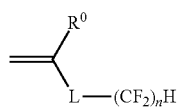

Formula [2]

wherein $R^{11}$ represents a hydrogen atom, a halogen atom or an alkyl group, $L^{11}$ represents a divalent linking group, $R^{13}$, $R^{14}$ and $R^{15}$ each independently represents a straight-chain, branched or cyclic hydrocarbon group having 1-20 carbon atoms or an aromatic heterocyclic group, which may have a substituent.

The monomer represented by the formula [2] for use in the invention more preferably has a tertiary carbon and is introduced at a position near to an unsaturated double bond. The tertiary carbon here means a carbon represented by —C($R^{13}$)($R^{14}$)($R^{15}$))

In the above formula [2], $R^{11}$ represents a hydrogen atom, a halogen atom (preferably fluorine atom) or an alkyl group, wherein a hydrogen atom or a methyl group are preferable. $L^{11}$ represents a divalent linking group, wherein a divalent linking group including an oxygen atom, a sulfur atom or a nitrogen atom is preferable. $R^{13}$, $R^{14}$ and $R^{15}$ each independently represents a straight-chain, branched or cyclic hydrocarbon group having 1-20 carbon atoms, which may have a substituent, wherein a straight-chain, branched or cyclic alkyl group having 1-20 carbon atoms is preferable. Two types or more of polymerization units of the monomer represented by the formula [2] may be included in the fluoroaliphatic group-containing copolymer as a constituent unit.

Among monomers represented by the above-described formula [2], monomers represented by the following formula [6] are preferable.

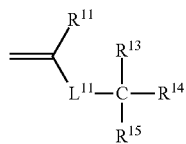

Formula [6]:

wherein $R^{11}$ represents a hydrogen atom, a halogen atom or a methyl group, wherein a hydrogen atom or a methyl group is preferable. $L^{12}$ represents a divalent linking group including any of an oxygen atom, a nitrogen atom and a sulfur atom, wherein —COO—, —COS—, —CON(Rd)— and the like are preferable. Rd represents a hydrogen atom or an alkyl group having 1-8 carbon atoms.

$R^{13}$, $R^{14}$ and $R^{15}$ each independently represents a straight-chain, branched or cyclic hydrocarbon group having 1-20 carbon atoms or an aromatic heterocyclic group, which may have a substituent, wherein a straight-chain, branched or cyclic alkyl group having 1-20 carbon atoms is preferable. Two or more types of polymerization units of the monomer represented by formula [6] may be included in the fluoroaliphatic group-containing copolymer as a constituent unit.

Among the monomers represented by the above-described formula [2], monomers represented by the following formula [7] are also preferable.

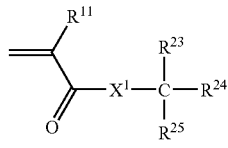

Formula [7]:

wherein $R^{11}$ represents a hydrogen atom, a halogen atom or a methyl group, wherein a hydrogen atom or a methyl group is preferable. $X^1$ represents an oxygen atom, a sulfur atom or —N(Rc)—, wherein an oxygen atom is preferable. Rc represents a hydrogen atom or an alkyl group having 1-8 carbon atoms, which may have a substituent, wherein an alkyl group having 1-4 carbon atoms is preferable. $R^{23}$, $R^{24}$, $R^{25}$ each independently represents a straight-chain, branched or cyclic alkyl group having 1-20 carbon atoms, wherein a straight-chain, branched or cyclic alkyl group having 1-8 carbon atoms is preferable. Two types or more of polymerization units of the monomer represented by formula [7] may be included as a constituent unit in the fluoroaliphatic group-containing copolymer.

More specific examples of the monomer represented by the above-described formula [2], [6] or [7] are represented below.

However, monomers represented by the formula [2], [6] or [7] are not restricted to the monomers shown below.
A-1
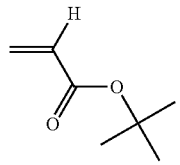
A-2
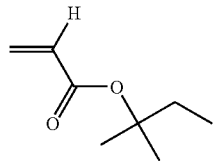
A-3
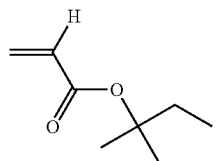
A-4
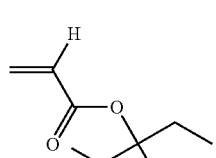
A-5
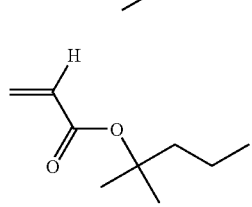
A-6
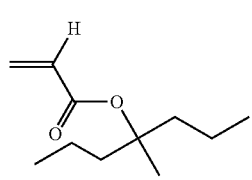
A-7
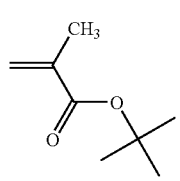
A-8
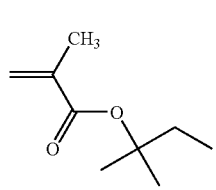
-continued
A-9
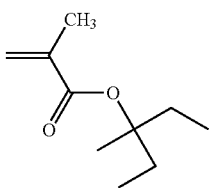
A-10
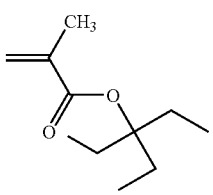
A-11
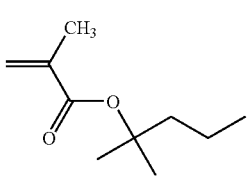
A-12
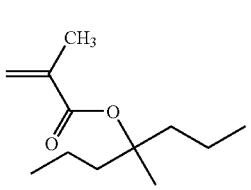
A-13
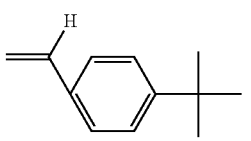
A-14
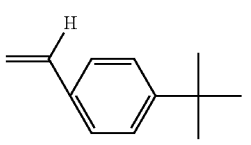
A-15
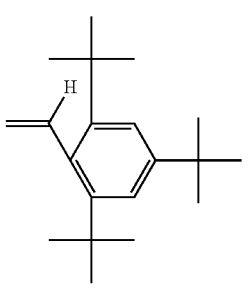
A-16
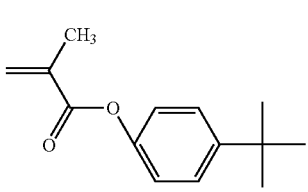

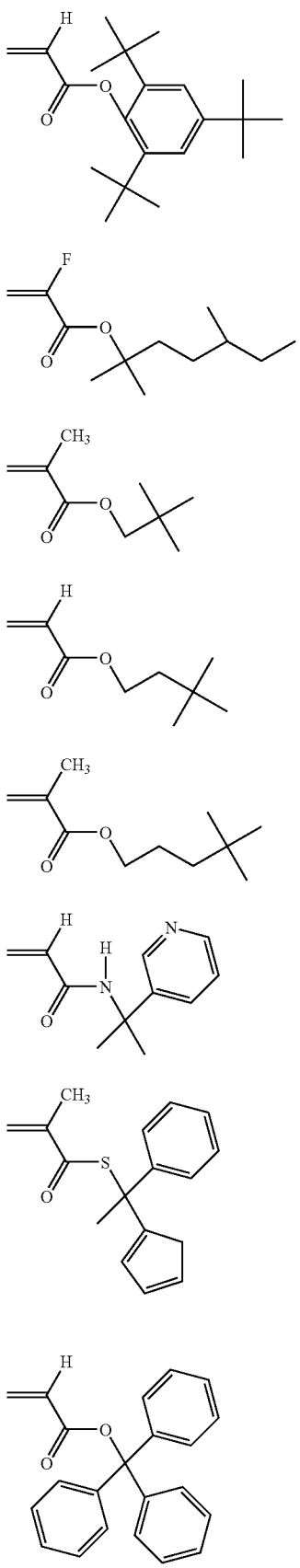
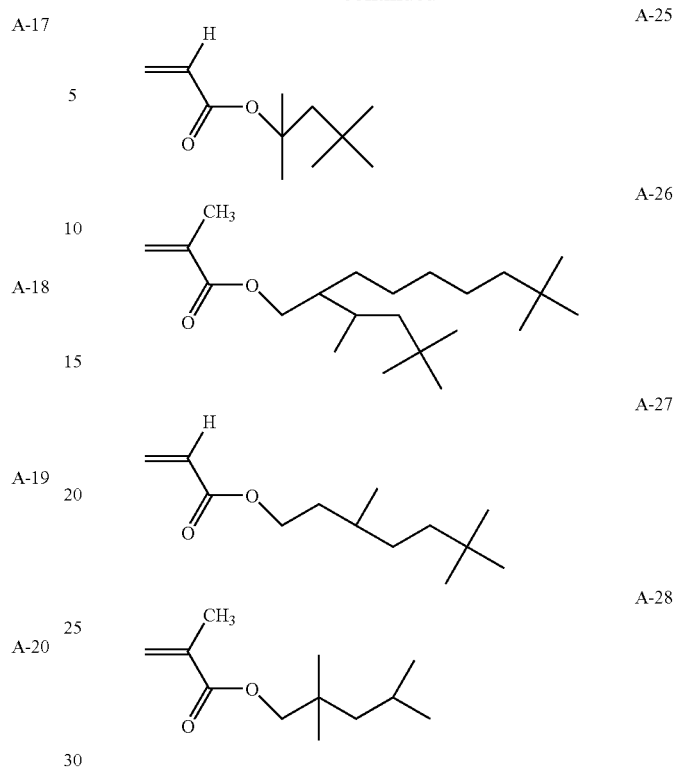

Next, the fluoroaliphatic group-containing monomer represented by formula [1] will be described.

In the formula [1], $R^0$ represents a hydrogen atom, a halogen atom (preferably fluorine atom) or an alkyl group, wherein a hydrogen atom or a methyl group is more preferable. L represents a divalent linking group, wherein a divalent linking group including an oxygen atom, a sulfur atom or a nitrogen atom is preferable. n represents an integer in the range of 1-18, wherein an integer in the range of 4-12 is more preferable, an integer in the range of 6-8 is further preferable, and 6 is most preferable.

Two types or more of polymerization units of fluoroaliphatic group-containing monomers represented by formula [1] may be included as a constituent unit in the fluoroaliphatic group-containing copolymer.

Among monomers represented by the formula [1], the monomer represented by the following formula [3] is preferable.

Formula [3]:

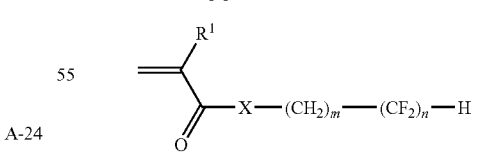

wherein $R^1$ represents a hydrogen atom, a halogen atom (preferably fluorine atom) or an alkyl group, wherein a hydrogen atom or a methyl group is more preferable. X represents an oxygen atom, a sulfur atom or —N(Ra)—, wherein an oxygen atom or —N(Ra)— is more preferable, and an oxygen atom is further preferable. Ra represents a hydrogen atom or an alkyl group having 1-8 carbon atoms, which may have a substituent, wherein a hydrogen atom or an alkyl group having 1-4 carbon atoms is more preferable, and a hydrogen atom or a methyl group is further preferable. m represents an integer in the range of 1-6, wherein an integer in the range of 1-3 is more preferable, and 1 is further preferable. n represents an integer of 1-18, wherein an integer in the range of 4-12 is more preferable, an integer in the range of 6-8 is further preferable, and 6 is most preferable.

Two types or more of polymerization units of fluoroaliphatic group-containing monomers represented by the formula [3] may be included as a constituent unit in the fluoroaliphatic group-containing copolymer.

Specific examples of fluoroaliphatic group-containing monomers represented by formula [1] or formula [3] are listed below. But, fluoroaliphatic group-containing monomers represented by formula [1] or formula [3] are not restricted to these specific examples below.

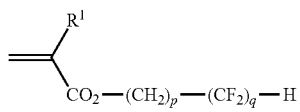

| | $R^1$ | p | q |
|---|---|---|---|
| F-1 | H | 1 | 4 |
| F-2 | $CH_3$ | 1 | 4 |
| F-3 | F | 1 | 4 |
| F-4 | H | 2 | 4 |
| F-5 | $CH_3$ | 3 | 4 |
| F-6 | H | 1 | 6 |
| F-7 | $CH_3$ | 1 | 6 |
| F-8 | F | 1 | 6 |
| F-9 | H | 2 | 6 |
| F-10 | $CH_3$ | 2 | 6 |
| F-11 | H | 3 | 6 |
| F-12 | H | 1 | 8 |
| F-13 | $CH_3$ | 1 | 8 |
| F-14 | F | 1 | 8 |
| F-15 | $CH_3$ | 2 | 8 |
| F-16 | H | 3 | 8 |
| F-17 | $CH_3$ | 3 | 8 |
| F-18 | H | 1 | 10 |
| F-19 | $CH_3$ | 1 | 10 |
| F-20 | F | 1 | 10 |
| F-21 | H | 2 | 10 |
| F-22 | H | 2 | 10 |
| F-23 | H | 1 | 12 |
| F-24 | $CH_3$ | 1 | 12 |
| F-25 | F | 1 | 12 |
| F-26 | H | 2 | 12 |
| F-27 | H | 3 | 12 |
| F-28 | H | 1 | 14 |
| F-29 | $CH_3$ | 1 | 14 |
| F-30 | F | 1 | 14 |
| F-31 | H | 2 | 14 |
| F-32 | $CH_3$ | 2 | 14 |
| F-33 | H | 1 | 16 |
| F-34 | $CH_3$ | 1 | 16 |
| F-35 | F | 1 | 16 |
| F-36 | $CH_3$ | 2 | 16 |
| F-37 | H | 3 | 16 |
| F-38 | H | 1 | 18 |
| F-39 | $CH_3$ | 1 | 18 |
| F-40 | F | 1 | 18 |
| F-41 | H | 3 | 18 |
| F-42 | $CH_3$ | 3 | 18 |

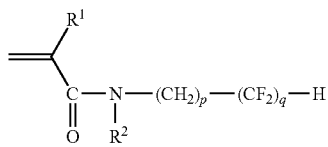

| | $R^1$ | $R^2$ | p | q |
|---|---|---|---|---|
| F-43 | H | H | 1 | 4 |
| F-44 | $CH_3$ | H | 1 | 4 |
| F-45 | H | $CH_3$ | 1 | 4 |
| F-46 | H | H | 2 | 4 |
| F-47 | H | H | 1 | 6 |
| F-48 | $CH_3$ | H | 1 | 6 |
| F-49 | H | $CH_3$ | 1 | 6 |
| F-50 | H | $C_2H_5$ | 1 | 6 |
| F-51 | $CH_3$ | H | 1 | 6 |
| F-52 | F | H | 2 | 6 |
| F-53 | H | H | 1 | 8 |
| F-54 | $CH_3$ | H | 1 | 8 |
| F-55 | H | $CH_3$ | 1 | 8 |
| F-56 | H | $C_4H_9$ (n) | 1 | 8 |
| F-57 | $CH_3$ | $C_2H_5$ | 1 | 8 |
| F-58 | H | $CH_2Ph$ | 1 | 8 |
| F-59 | H | H | 2 | 8 |
| F-60 | $CH_3$ | H | 3 | 8 |
| F-61 | H | H | 1 | 10 |
| F-62 | $CH_3$ | $CH_3$ | 1 | 10 |
| F-63 | H | H | 1 | 12 |
| F-64 | $CH_3$ | H | 1 | 12 |
| F-65 | H | H | 1 | 18 |
| F-66 | H | $CH_3$ | 1 | 18 |

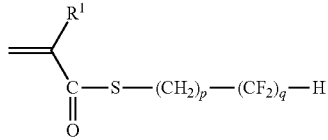

| | $R^1$ | p | q |
|---|---|---|---|
| F-67 | H | 1 | 4 |
| F-68 | $CH_3$ | 1 | 4 |
| F-69 | H | 2 | 4 |
| F-70 | H | 1 | 6 |
| F-71 | $CH_3$ | 1 | 6 |
| F-72 | $CH_3$ | 2 | 6 |
| F-73 | H | 1 | 8 |
| F-74 | $CH_3$ | 1 | 8 |
| F-75 | F | 1 | 8 |
| F-76 | H | 2 | 8 |
| F-77 | $CH_3$ | 3 | 8 |
| F-78 | H | 1 | 10 |
| F-79 | $CH_3$ | 1 | 10 |
| F-80 | H | 1 | 12 |
| F-81 | $CH_3$ | 1 | 12 |
| F-82 | H | 1 | 16 |
| F-83 | $CH_3$ | 2 | 16 |
| F-84 | H | 1 | 18 |
| F-85 | $CH_3$ | 1 | 18 |

A second embodiment of the invention relates to an optical compensatory film having an optically anisotropic layer composed of a liquid crystal composition containing at least one type of fluoroaliphatic group-containing copolymer including a repeating unit derived from a monomer of the following (i) and a repeating unit derived from a monomer of the following (ii).

(i) A fluoroaliphatic group-containing monomer represented by the following formula [4]
(ii) A monomer represented by the above-described formula [2]

Formula [4]:

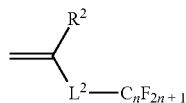

wherein $R^2$ represents a hydrogen atom, a halogen atom (preferably fluorine atom) or an alkyl group, wherein a hydrogen atom or a methyl group is more preferable. $L^2$ represents a divalent linking group, wherein a divalent linking group including an oxygen atom, a sulfur atom or a nitrogen atom is preferable. n represents an integer in the range of 1-6, wherein an integer in the range of 4-6 is more preferable, and 6 is further preferable.

Two types or more of polymerization units of a fluoroaliphatic group-containing monomer represented by formula [4] may be included in the fluoroaliphatic group-containing copolymer as a constituent unit.

Among monomers represented by the formula [4], monomers represented by the following formula [5] are preferable.

Formula [5]:

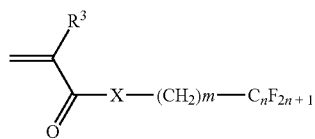

wherein $R^3$ represents a hydrogen atom, a halogen atom or an alkyl group, wherein a hydrogen atom or a methyl group is more preferable. X represents an oxygen atom, a sulfur atom or —N(Rb)—, wherein an oxygen atom or —N(Rb)— is more preferable, and an oxygen atom is further preferable. Rb represents a hydrogen atom or an alkyl group having 1-8 carbon atoms, which may have a substituent, wherein a hydrogen atom or an alkyl group having 1-4 carbon atoms is more preferable, and a hydrogen atom or a methyl group is further preferable. m represents an integer in the range of 1-6, wherein an integer in the range of 1-3 is more preferable, and 1 is further preferable. n represents an integer in the range of 1-6, wherein an integer in the range of 4-6 is more preferable, and 6 is further preferable.

Two types or more of polymerization units of the fluoroaliphatic group-containing monomer represented by the formula [5] may be included in the fluoroaliphatic group-containing copolymer as a constituent unit.

More specific examples of fluoroaliphatic group-containing monomers represented by the formula [4] or [5] are mentioned below. However, fluoroaliphatic group-containing monomers represented by the formula [4] or [5] are not restricted to the monomers shown below.

F-1
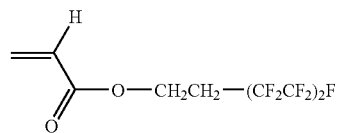

F-2
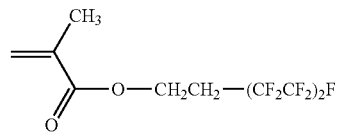

F-3
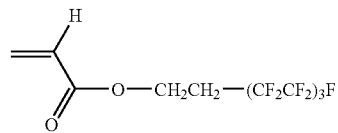

F-4
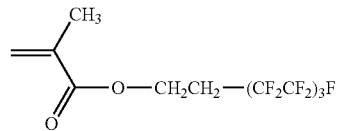

F-5
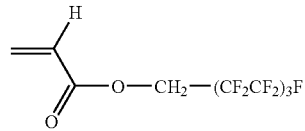

F-6
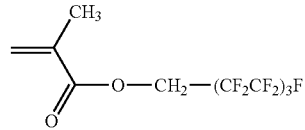

F-7
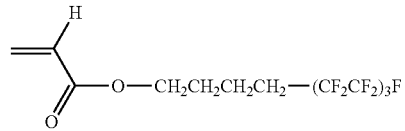

F-8
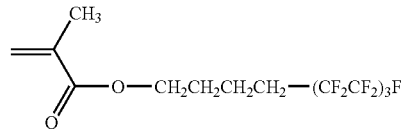

F-9
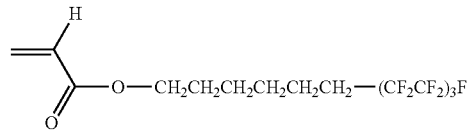

F-10
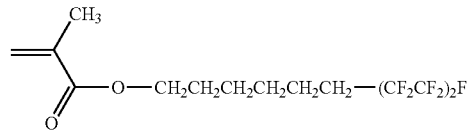

F-11
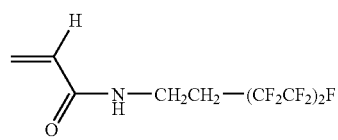

F-12 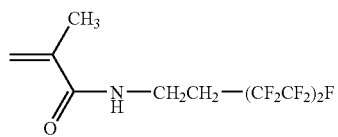
F-13 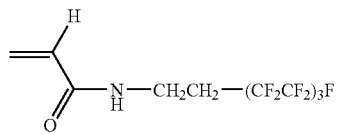
F-14 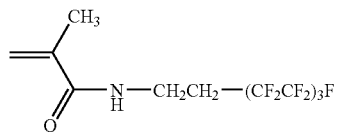
F-15 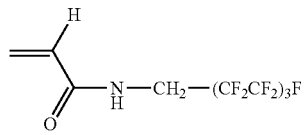
F-16 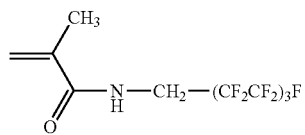
F-17 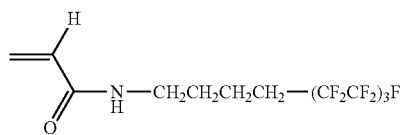
F-18 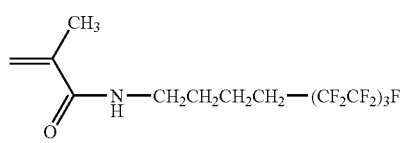
F-19 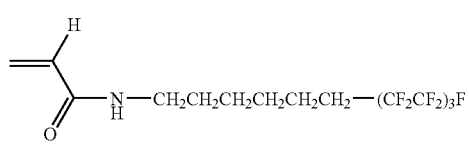
F-20 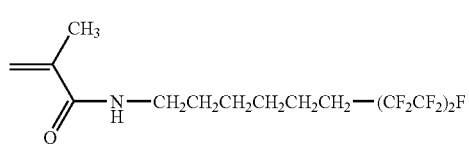
F-21 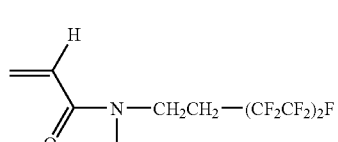
F-22 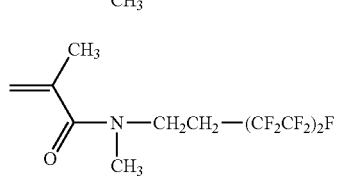
F-23 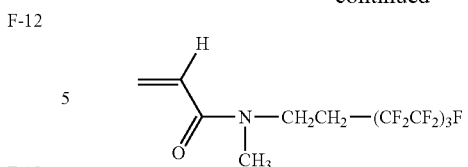
F-24 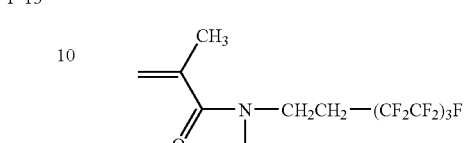
F-25 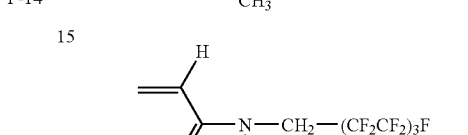
F-26 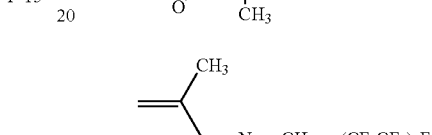
F-27 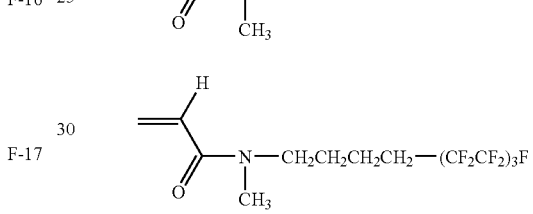
F-28 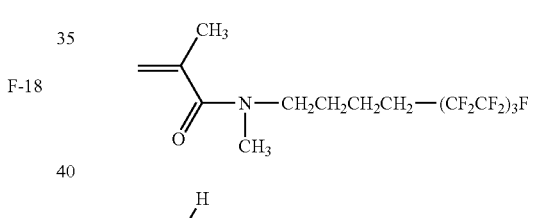
F-29 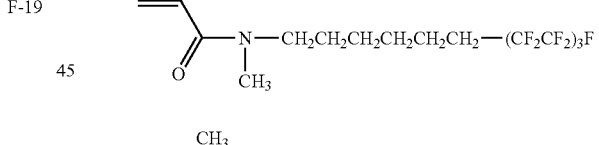
F-30 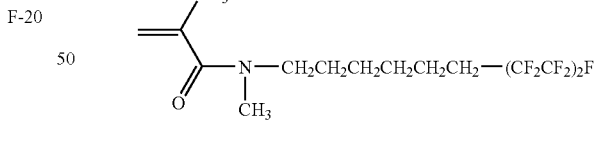
F-31 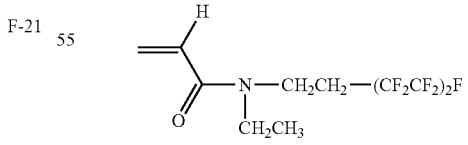
F-32 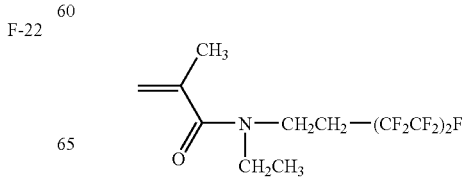

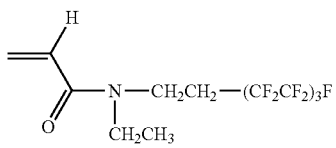
F-33
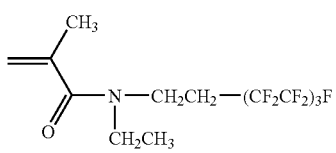
F-34
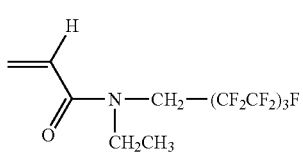
F-35
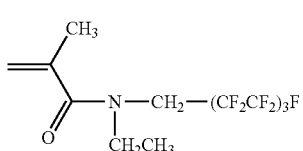
F-36
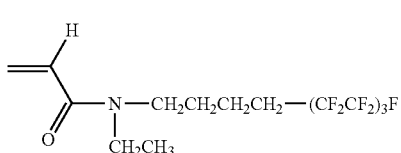
F-37
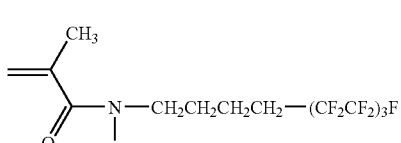
F-38
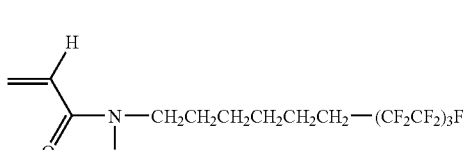
F-39
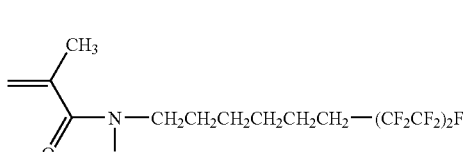
F-40
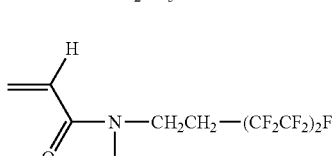
F-41
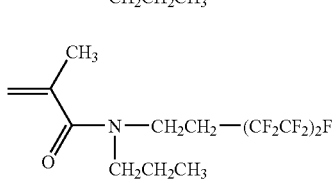
F-42
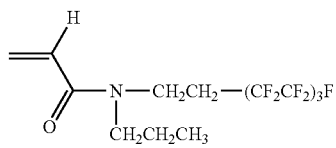
F-43
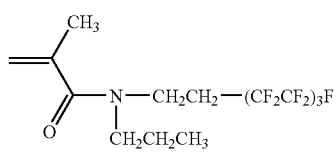
F-44
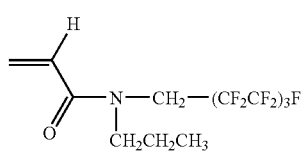
F-45
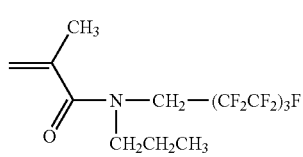
F-46
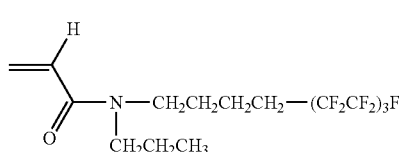
F-47
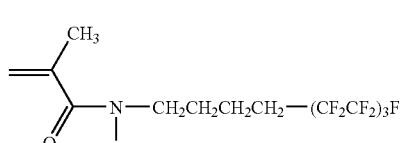
F-48
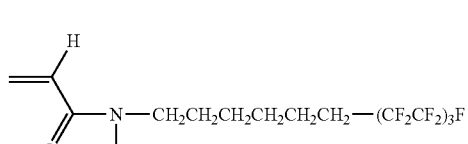
F-49
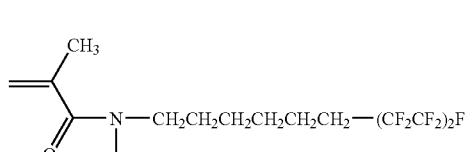
F-50
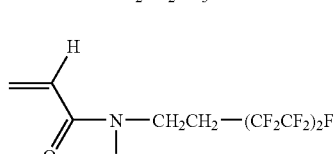
F-51
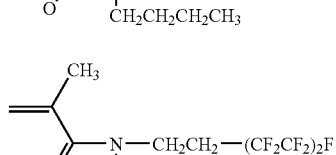
F-52

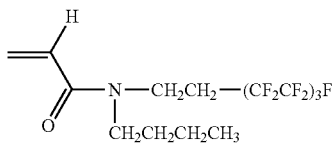
F-53
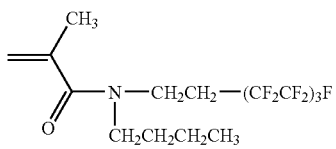
F-54
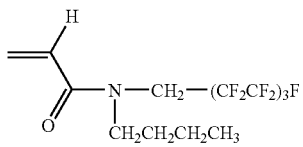
F-55
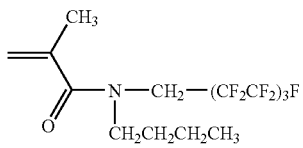
F-56
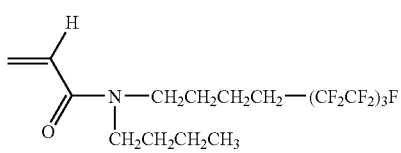
F-57
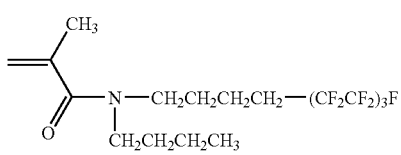
F-58
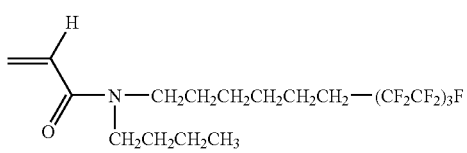
F-59
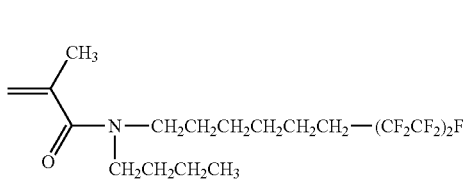
F-60
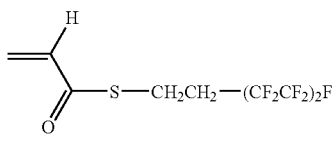
F-61
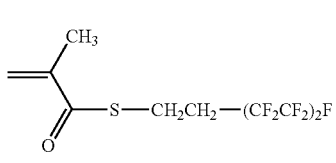
F-62

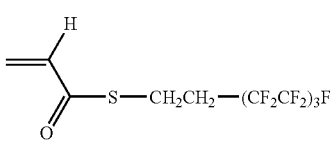
F-63

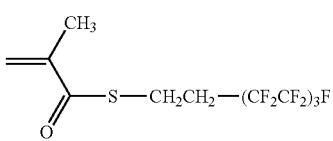
F-64

The preferable range and the specific examples of the monomers represented by the above-described formula [2] in the present embodiment are the same as those in the above-described first embodiment.

It can be said to be an industrially advantageous point that the fluoroaliphatic group-containing copolymer is a material with a higher environment safety because the terminal of the fluoroaliphatic group is a hydrogen atom, or, even when the terminal is a fluorine atom, the fluoroalkyl chain has such short length as $C_6$ or less.

The fluoroaliphatic group-containing copolymer for use in the invention may be a copolymer with another type of copolymerizable monomer. As another type of copolymerizable monomers, those described in Polymer Handbook 2nd ed., J. Brandrup, Wiley Interscience (1975) Chapter 2, Page 1-483 can be employed.

For example, there can be mentioned compounds having one addition-polymerizable unsaturated bond selected from acrylic acid, methacrylic acid, acrylic acid esters, methacrylic acid esters, acrylamides, methacrylamides, allyl compounds, vinyl ethers, and vinyl esters.

Specifically, following monomers can be mentioned.

Acrylic acid esters: methyl acrylate, ethyl acrylate, propyl acrylate, chloroethyl acrylate, 2-hydroxyethyl acrylate, trimethylolpropane monoacrylate, benzyl acrylate, methoxybenzyl acrylate, furfuryl acrylate, tetrahydrofurfuryl acrylate.

Methacrylic acid esters: methyl methacrylate, ethyl methacrylate, propyl methacrylate, chloroethyl methacrylate, 2-hydroxyethyl methacrylate, trimethylolpropane monomethacrylate, benzyl methacrylate, methoxybenzyl methacrylate, furfuryl methacrylate, tetrahydrofurfuryl methacrylate.

Acrylamides: acrylamide, N-alkylacrylamides (alkyl group having 1-3 carbon atoms, e.g., methyl group, ethyl group, propyl group), N,N-dialkylacrylamides (alkyl group having 1-6 carbon atoms), N-hydroxyethyl-N-methylacrylamide, N-2-acetamidoethyl-N-acetylacrylamide.

Methacrylamides: methacrylamide, N-alkylmethacrylamides (alkyl group having 1-3 carbon atoms, e.g., methyl group, ethyl group, propyl group), N,N-dialkylmethacrylamides (alkyl group having 1-6 carbon atoms), N-hydroxyethyl-N-methylmethacrylamide, N-2-acetamidoethyl-N-acetylmethacrylamide.

Allyl compounds: allyl esters (e.g., allyl acetate, allyl caproate, allyl caprylate, allyl laurate, allyl palmitate, allyl stearate, allyl benzoate, allyl acetoacetate, allyl lactate), allyloxyethanol.

Vinyl ethers: alkyl vinyl ethers (e.g., hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, diethylene glycol vinyl ether, dimethylaminoethyl vinyl ether, diethylaminoethyl vinyl ether, butylaminoethyl vinyl ether, benzyl vinyl ether, tetrahydrofurfuryl vinyl ether.

Vinyl esters: vinyl butyrate, vinyl isobutyrate, vinyl trimethylacetate, vinyl diethylacetate, vinyl valate, vinyl caproate, vinyl chloroacetate, vinyl dichloroacetate, vinyl methoxy acetate, vinyl butoxy acetate, vinyl lactate, vinyl-β-phenyl butyrate, vinyl cyclohexyl carboxylate.

Dialkyl itaconates: dimethyl itaconate, diethyl itaconate, dibutyl itaconate, and the like.

Fumaric acid dialkyl esters or monoalkyl esters: dibutyl fumarate, and the like.

Others: crotonic acid, itaconic acid, acrylonitrile, methacrylonitrile, maleylonitrile, styrene.

The amount of polymerization unit of the fluoroaliphatic group-containing monomer represented by the above-described formula [1], formula [3], formula [4] or formula [5] constituting the fluoroaliphatic group-containing copolymer for use in the invention is preferably 80% by mass or less, more preferably 60% by mass or less, further preferably 50% by mass or less, on the basis of the total polymerization units constituting the fluoroaliphatic group-containing copolymer.

The amount of polymerization unit of the monomer preferably used in the invention represented by the formula [2], formula [6] or formula [7] is preferably 20% by mass or more, more preferably 40% by mass or more, further preferably 50% by mass, on the basis of the total polymerization units constituting the fluoroaliphatic group-containing copolymer.

The mass average molecular weight of the fluoroaliphatic group-containing copolymer for use in the invention is preferably 3,000-100,000, more preferably 6,000-80,000, further preferably 8,000-60,000.

The mass average molecular weight and molecular weight are a molecular weight shown in terms of polystyrene according to detection by a differential refractometer and THF as a solvent with a GPC analyzer using a column of TSK-gel GMHXL, TSK-gel G4000HxL or TSK-gel G2000HxL (trade names of products manufactured by TOSOH CORPORATION).

The fluoroaliphatic group-containing copolymer can be produced by a publicly known conventional method. For example, it can be produced by polymerizing above-mentioned monomers such as (meth)acrylate having a fluoroaliphatic group, and (meth)acrylate having a straight-chain, branched or cyclic alkyl group in an organic solvent by adding a general-purpose radical polymerization initiator. Or, depending on the situation, it can be produced in the same way as that described above by adding another addition-polymerizable unsaturated compound. A drip polymerization method, in which monomers and an initiator are dripped into a reaction vessel corresponding to polymerization property of respective monomers, is also effective to obtain a polymer having a homogeneous composition. For example, such polymerization methods can be adopted as cation polymerization, radical polymerization or anion polymerization utilizing a vinyl group. Among these, radical polymerization is particularly preferable in point of general utilization. As an initiator for radical polymerization, such publicly known compound as a radical thermal polymerization initiator or a radical photo polymerization initiator can be used, but, in particular, the use of a radical thermal polymerization initiator is preferable. The radical thermal polymerization initiator is a compound that generates radicals by heating it to the degradation temperature thereof or more. Examples of the radical thermal polymerization initiator include diacyl peroxides (such as acetyl peroxide, benzoyl peroxide), ketone peroxides (such as methyl ethyl ketone peroxide, cyclohexanone peroxide), hydroperoxides (such as hydrogen peroxide, tert-butyl hydroperoxide, cumene hydroperoxide), dialkyl peroxides (such as di-tert-butyl peroxide, dicumyl peroxide, dilauroyl peroxide), peroxy esters (such as tert-butyl peroxyacetate, tert-butyl peroxypivalate), azo-based compounds (such as azobisisobutyronitrile, azobisisovaleronitrile), and persulfates (such as ammonium persulfate, sodium persulfate, potassium persulfate). One type of these radical thermal polymerization initiators can be used independently, or two or more types of these can be used in combination.

The radical polymerization is not particularly restricted, but an emulsion polymerization method, a suspension polymerization method, a block polymerization method, or a solution polymerization method may be adopted. A solution polymerization, a typical radical polymerization method, will be described more specifically. The general outline is similar for other polymerization methods. The details are described in, for example, "Kobunshi Kagaku Jikkenhou (Experimental Method of Polymer Science)" ed. The Society of Polymer Science, Japan (TOKYO KAGAKU DOJIN CO., LTD; 1981).

In order to carry out a solvent polymerization, an organic solvent is used. The organic solvent may be arbitrarily selected insofar as it does not impair the purpose and advantage of the invention. These organic solvents are organic compounds usually having a boiling point in the range of 50-200° C. under atmospheric pressure, wherein such organic compounds are preferable that homogeneously dissolve respective constituents. Examples of the preferable organic solvent include alcohols such as isopropanol and butanol; ethers such as dibutyl ether, ethylene glycol dimethyl ether, tetrahydrofuran and dioxane; ketones such as acetone, methyl ethyl ketone, methyl isobutyl ketone and cyclohexanone; esters such as ethyl acetate, butyl acetate, amyl acetate and γ-butyrolactone; and aromatic hydrocarbons such as benzene, toluene and xylene. These organic solvents may be used in one type alone or in combination of two or more types. Further, from the viewpoint of solubility of the monomer or generating polymer, a water-mixed organic solvent simultaneously using water with the above-described organic solvent may be also applicable.

Conditions of a solution polymerization are also not particularly restricted, but, for example, heating at a temperature in the range of 50-200° C. for 10 minutes-30 hours is preferable. Further, so as not to deactivate generating radicals, inert gas purge is preferably carried out also before the start of a solution polymerization, as a matter of course during the solution polymerization. As the inert gas, usually nitrogen gas is suitably employed.

In order to obtain the fluoroaliphatic group-containing copolymer in the preferable range of molecular weight, a radical polymerization method using a chain transfer agent is particularly effective. Any of chain transfer agents including mercaptans (such as octyl mercaptan, decyl mercaptan, dodecyl mercaptan, tert-dodecyl mercaptan, octadecyl mercaptan, thiophenol, p-nonyl thiophenol), polyhalogenated alkyls (such as carbon tetrachloride, chloroform, 1,1,1-trichloroethane, 1,1,1-tribromooctane), low-active monomers (such as α-methylstyrene, α-methylstyrene dimer) can be used, but mercaptans having 4-16 carbon atoms are preferable. The use amount of these chain transfer agents must be precisely controlled because it is significantly affected by the activity of the chain transfer agent, combination of monomers and polymerization conditions, and is usually around 0.01% by mol-50% by mol, preferably 0.05% by mol-30% by mol, particularly preferably 0.08% by mol-25% by mol, relative to the total moles of monomers used. These chain transfer agents are only required to exist in the system simultaneously with a monomer being the object for which polymerization degree should be controlled during the polymerization process, and a method for adding these are not particularly restricted. They may be added by being dissolved in monomer, or independently from monomer.

Examples of the specific structure of the fluoroaliphatic group-containing copolymer that can be used in the invention are shown below. However, the fluoroaliphatic group-containing copolymer is not restricted to these examples shown below. Numerals in the formula represent mass ratio of respective monomer components. Mw represents mass average molecular weight.

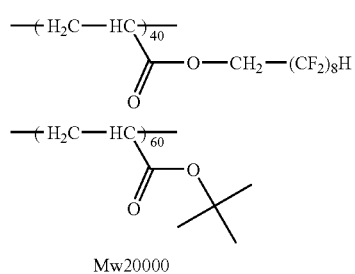

P-1

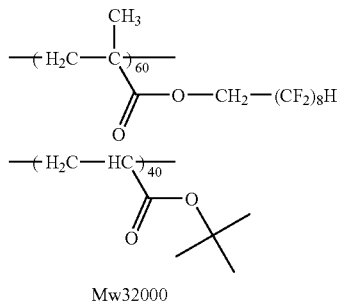

P-5

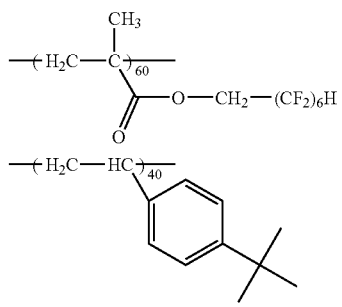

P-6

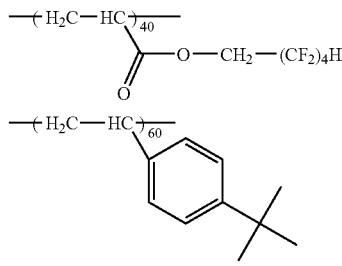

P-7

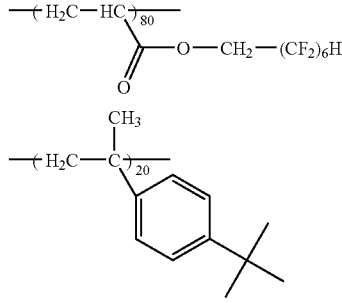

P-8

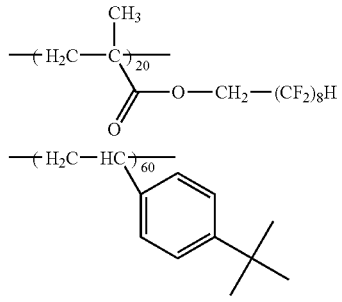

P-9

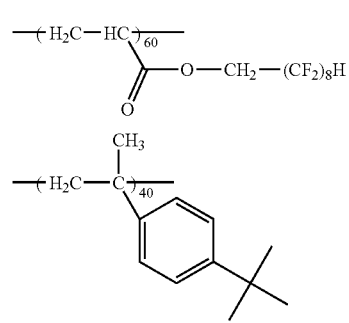
P-10
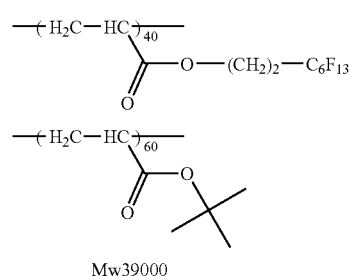
P-11
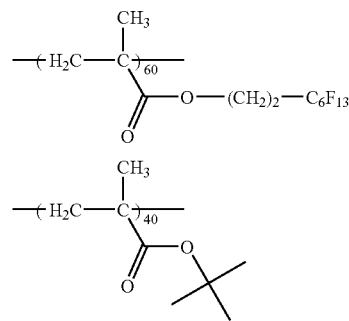
P-12
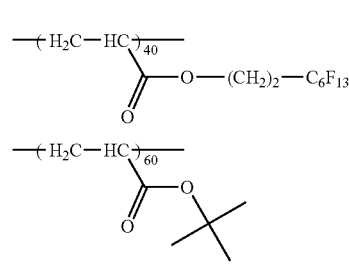
P-13
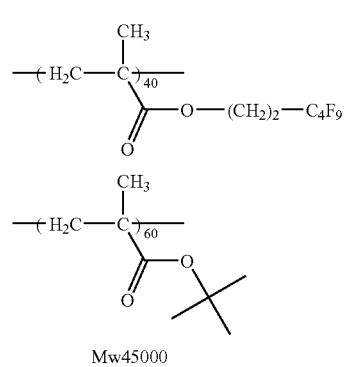
P-14
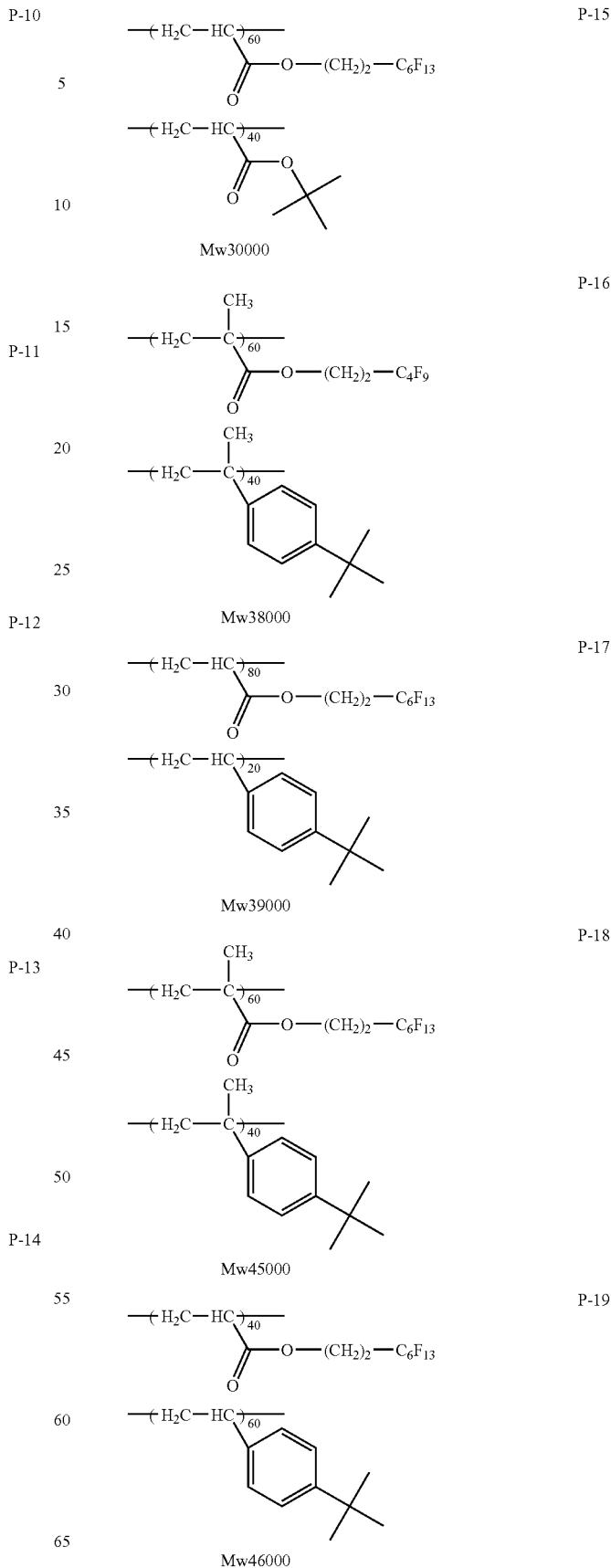

P-20
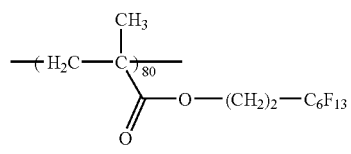
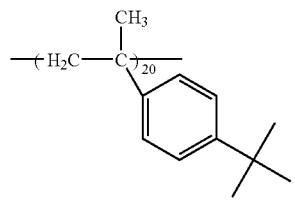
Mw28000
P-21
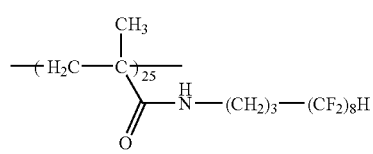
Mw48000
P-22
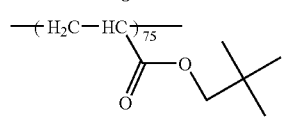
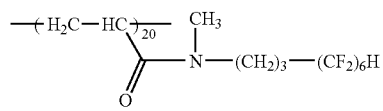
Mw39000
P-23
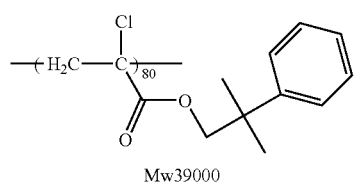
Mw45000
P-24
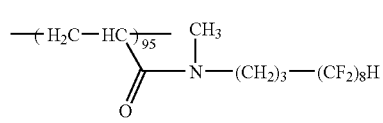
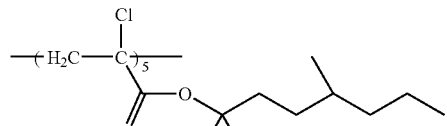
Mw28000
P-25
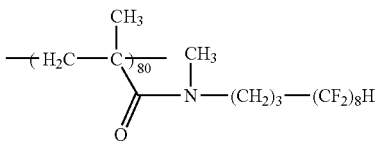
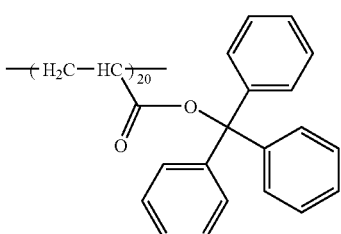
Mw29000
P-26
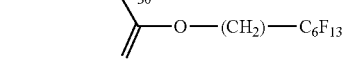
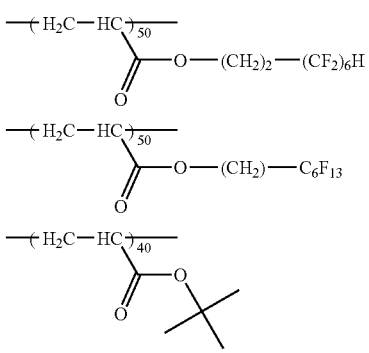
Mw30000
P-27
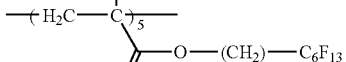
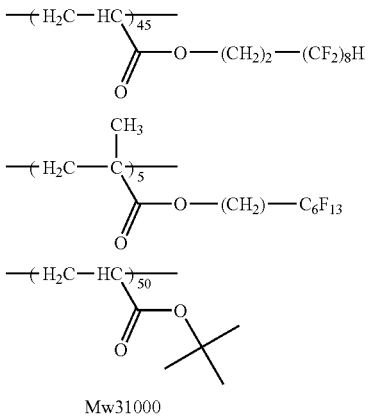
Mw31000
P-28
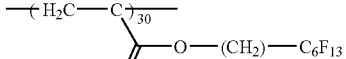
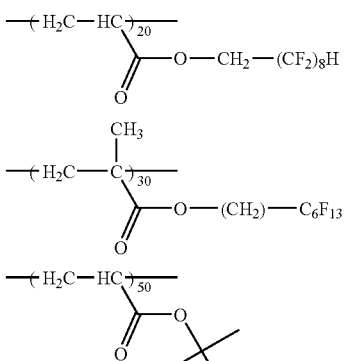
Mw40000

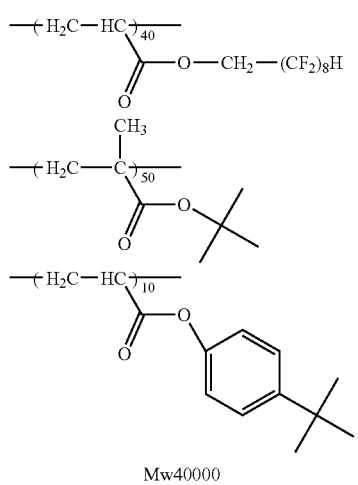

P-29

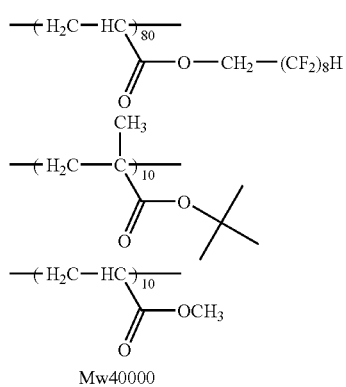

P-30

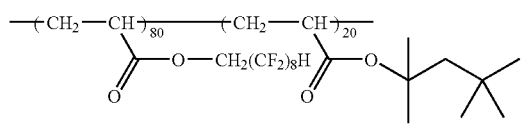

P-31

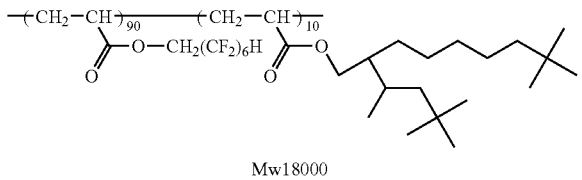

P-32

The liquid crystal composition constituting the optically anisotropic layer in the invention contains the aforementioned fluoroaliphatic group-containing copolymer.

The addition amount of the fluoroaliphatic group-containing copolymer in the composition is preferably 0.001% by mass-5.0% by mass, more preferably 0.01% by mass-1.0% by mass.

The mass ratio of fluorine atoms of the fluoroaliphatic group-containing copolymer in the composition is preferably 0.0003% by mass-3.0% by mass, more preferably 0.003% by mass-0.6% by mass.

From the viewpoint of improving surface conditions, the liquid crystal composition contains water preferably in 30% by mass or less, more preferably in 10% by mass or less.

<<Onium Salt>>

The above-described composition preferably contains an onium salt. In the invention, the onium salt contributes to vertically align molecules of a rod-shaped liquid crystal compound on the alignment film interface side. Examples of the onium salt include ammonium salt, sulfonium salt and phosphonium salt. It is preferably quaternary onium salt, particularly preferably quaternary ammonium salt.

The quaternary ammonium salt can be obtained generally by subjecting tertiary amine (such as trimethylamine, triethylamine, tributylamine, triethanolamine, N-methylpyrrolidine, N-methylpiperidine, N,N-dimethylpiperazine, triethylenediamine, N,N,N',N'-tetramethylethylene diamine) or N-containing heterocycle (such as pyridine ring, picoline ring, 2,2'-bipyridyl ring, 4,4'-bipyridyl ring, 1,10-phenanthroline ring, quinoline ring, oxazole ring, thiazole ring, N-methylimidazole ring, pyrazine ring, tetrazole ring) to alkylation (Menschutkin reaction), alkenylation, alkynylation or arylation.

The quaternary ammonium salt is preferably quaternary ammonium salt composed of a N-containing heterocycle, particularly preferably quaternary pyridinium salt.

More specifically, the quaternary ammonium salt is preferably selected from quaternary pyridinium salts represented by the following formula (3a) or an after-mentioned formula (3b).

Formula (3a):

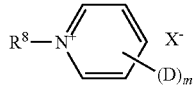

wherein $R^8$ represents a substituted or unsubstituted alkyl group, alkenyl group, alkynyl group, aralkyl group, aryl group or heterocyclic group, D represents a hydrogen-bondable group, m represents an integer in the range of 1-3, and $X^-$ represents an anion.

First, the formula (3a) will be described.

The alkyl group represented by the $R^8$ is preferably a substituted or unsubstituted alkyl group having 1-18 carbon atoms, more preferably a substituted or unsubstituted alkyl group having 1-8 carbon atoms. These may be of straight-chain, branched chain or cycle. Examples of these include a methyl group, an ethyl group, a n-propyl group, an isopropyl group, a n-butyl group, an isobutyl group, a tert-butyl group, a n-hexyl group, a n-octyl group, a neopentyl group, a cyclohexyl group, an adamantyl group and a cyclopropyl group.

Examples of the substituent for the hydrocarbon group, particularly alkyl group in the invention can include substituted or unsubstituted alkenyl groups having 2-18 carbon atoms (preferably 2-8 carbon atoms) (e.g., vinyl group); substituted or unsubstituted alkynyl groups having 2-18 carbon atoms (preferably 2-8 carbon atoms) (e.g., ethynyl group); substituted or unsubstituted aryl groups having 6-10 carbon atoms (e.g., phenyl group, naphthyl group); halogen atoms (such as F, Cl, Br); substituted or unsubstituted alkoxy groups having 1-18 carbon atoms (preferably 1-8 carbon atoms) (e.g., methoxy group, ethoxy group); substituted or unsubstituted aryloxy groups having 6-10 carbon atoms (e.g., phenoxy group, biphenyloxy group, p-methoxyphenoxy group); substituted or unsubstituted alkylthio groups having 1-18 carbon atoms (preferably 1-8 carbon atoms) (e.g., methylthio group, ethylthio group); substituted or unsubstituted arylthio groups having 6-10 carbon atoms (e.g., phenylthio group);

substituted or unsubstituted acyl groups having 2-18 carbon atoms (preferably 2-8 carbon atoms) (e.g., acetyl group, propionyl group); substituted or unsubstituted alkylsulfonyl groups or arylsulfonyl groups having 1-18 carbon atoms (preferably 1-8 carbon atoms) (e.g., methanesulfonyl group, p-toluenesulfonyl group); substituted or unsubstituted acyloxy groups having 2-18 carbon atoms (preferably 2-8 carbon atoms) (e.g., acetoxy group, propionyloxy group); substituted or unsubstituted alkoxycarbonyl group having 2-18 carbon atoms (preferably 2-8 carbon atoms) (e.g., methoxycarbonyl group, ethoxycarbonyl group); substituted or unsubstituted aryloxycarbonyl groups having 7-11 carbon atoms (e.g., naphthoxycarbonyl group); an unsubstituted amino group, or substituted amino groups having 1-18 carbon atoms (preferably 1-8 carbon atoms) (e.g., methylamino group, dimethylamino group, diethylamino group, anilino group, methoxyphenylamino group, chlorophenylamino group, pyridylamino group, methoxycarbonylamino group, n-butoxycarbonylamino group, phenoxycarbonylamino group, methylcarbamoylamino group, ethylcarbamoylamino group, phenylcarbamoylamino group, acetylamino group, ethylcarbonylamino group, ethylthiocarbamoylamino group, cyclohexylcarbonylamino group, benzoylamino group, chloroacetylamino group, methylsulfonylamino group); substituted or unsubstituted carbamoyl groups having 1-18 carbon atoms (preferably 1-8 carbon atoms) (e.g., unsubstituted carbamoyl group, methylcarbamoyl group, ethylcarbamoyl group, n-butylcarbamoyl group, tert-butylcarbamoyl group, dimethylcarbamoyl group, morpholinocarbamoyl group, pyrrolidinocarbamoyl group); an unsaturated sulfamoyl group, or substituted sulfamoyl groups having 1-18 carbon atoms (preferably 1-8 carbon atoms) (e.g., methylsulfamoyl group, phenylsulfamoyl group); a cyano group; a nitro group; a carboxyl group; a hydroxyl group; and heterocyclic groups (e.g., oxazole ring, benzoxazole ring, thiazole ring, benzothiazole ring, imidazole ring, benzimidazole ring, indolenine ring, pyridine ring, piperidine ring, pyrrolidine ring, morpholine ring, sulfolane ring, furan ring, thiophene ring, pyrazole ring, pyrrole ring, chroman ring, coumarin ring). A particularly preferable substituent for the alkyl group is an aryloxy group, an arylthio group, an arylsulfonyl group or an aryloxycarbonyl group.

The alkenyl group represented by the above-described $R^8$ is preferably a substituted or unsubstituted alkenyl group having 2-18 carbon atoms, more preferably a substituted or unsubstituted alkenyl group having 2-8 carbon atoms, including, for example, a vinyl group, an aryl group, a 1-propenyl group, and a 1,3-butadienyl group. As a substituent for the alkenyl group, those mentioned as the substituent for the alkyl group are preferable.

The alkynyl group represented by the $R^8$ is preferably a substituted or unsubstituted alkynyl group having 2-18 carbon atoms, more preferably a substituted or unsubstituted alkynyl group having 2-8 carbon atoms, including, for example, an ethynyl group and a 2-propynyl group. As a substituent for the alkynyl group, those mentioned as the substituent for the alkyl group are preferable.

The aralkyl group represented by the $R^8$ is preferably a substituted or unsubstituted aralkyl group having 7-18 carbon atoms, preferably including, for example, a benzyl group, a methylbenzyl group, a biphenylmethyl group, and a naphthylmethyl group. As a substituent for the aralkyl group, those mentioned as the substituent for the alkyl group can be mentioned.

The aryl group represented by the $R^8$ is preferably a substituted or unsubstituted aryl group having 6-18 carbon atoms, including, for example, aphenyl group, anaphthyl group, and a fluorenyl group. As a substituent for the aryl group, those mentioned as the substituent for the alkyl group are preferable. In addition to these, an alkyl group (such as methyl, ethyl), an alkynyl group or a benzoyl group is also preferable.

The heterocyclic group represented by the $R^8$ can be a 5- or 6-membered saturated or unsaturated heterocycle constituted of a carbon atom, a nitrogen atom, an oxygen atom or a sulfur atom. Examples of these include an oxazole ring, a benzoxazole ring, a thiazole ring, a benzothiazole ring, an imidazole ring, a benzimidazole ring, an indolenine ring, a pyridine ring, a piperidine ring, a pyrrolidine ring, a morpholine ring, a sulfolane ring, a furan ring, a thiophene ring, a pyrazole ring, a pyrrole ring, a chroman ring and a coumarin ring. The heterocyclic group may have been substituted and, as a substituent, those mentioned as the substituent for the alkyl group are preferable. A particularly preferable heterocyclic group represented by the $R^8$ is a benzoxazole ring or a benzothiazole ring.

The $R^8$ is preferably a substituted or unsubstituted alkyl group, aralkyl group, aryl group or heterocyclic group.

D represents a hydrogen-bondable group. The hydrogen bond exists between an electronegative atom (e.g., O, N, F, Cl) and a hydrogen atom bonding to a similarly electronegative atom through a covalent bond. A theoretical interpretation of the hydrogen bond is reported by, for example, H. Uneyama and K. Morokuma, Journal of American Chemical Society, vol. 99, pp 1316-1332, 1977. Specific forms of the hydrogen bond include forms described in J. N. Israerachiviri, translated by Kondo Tamotsu and Oshima Hiroyuki, Intermolecular Force and Surface Force, p 98, FIG. 17, McGraw-Hill (1991). Specific examples of the hydrogen bond include, for example, those described in G. R. Desiraju, Angewante Chemistry International Edition English, vol. 34, p 2311 (1995).

Examples of the preferable hydrogen-bondable group include a mercapto group, a hydroxyl group, an amino group, a carbonamide group, a sulfonamide group, an acid amide group, an ureide group, a carbamoyl group, a carboxyl group, a sulfo group, N-containing heterocyclic groups (for example, imidazolyl group, benzimidazolyl group, pyrazolyl group, pyridyl group, 1,3,5-triazyl group, pyrimidyl group, pyridazyl group, quinolyl group, benzimidazolyl group, benzthiazolyl group, succinimide group, phthalimide group, maleimide group, uracil group, thiouracil group, barbituric acid group, hydantoin group, maleic hydrazide group, isatin group and uramyl can be mentioned). As hydrogen-bondable groups, further preferably an amino group, a carbonamide group, a sulfonamide group, an ureide group, a carbamoyl group, a carboxyl group, a sulfo group and a pyridyl group can be mentioned, and particularly preferably an mino group, a carbamoyl group and a pyridyl group can be mentioned.

Anions represented by $X^-$ may be either inorganic anions or organic anions, including halogen anions (such as fluorine ion, chlorine ion, bromine ion, iodine ion), sulfonate ions (such as methanesulfonate ion, trifluoromethanesulfonate ion, methylsulfate ion, p-toluenesulfonate ion, p-chlorobenzenesulfonate ion, 1,3-benzenedisulfonate ion, 1,5-naphthalenedisulfonate ion, 2,6-benzensulfonate ion), sulfate ion, thiocyanate ion, perchlorate ion, tetrafluoroborate ion, picrate ion, acetate ion, phosphate ions (such as hexafluorophosphate ion) and hydroxyl ion. $X^-$ is preferably halogen anion, sulfonate ion or hydroxyl ion. In this connection, $X^-$ is not necessarily a monovalent ion, but may be a divalent or more valent anion. In this case, the ratio of cations and anions in the compound is not necessarily 1:1, but determined suitably.

m in the formula (3a) represents an integer in the range of 1-3, and is preferably 1.

More preferable quaternary ammonium salts as the formula (3a) are represented by the following formula (4).

Formula (4):

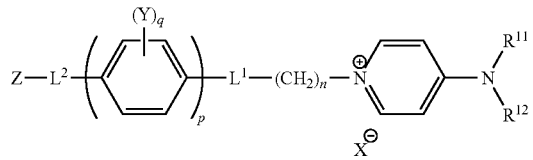

wherein $L^1$ and $L^2$ each independently represents a divalent linking group or a single bond. Examples of the divalent linking group include substituted or unsubstituted alkylene group having 1-10 carbon atoms (such as methylene group, ethylene group, 1,4-butylene group), —O—, —C(=O)—, —C(=O)O—, —OC(=O)O—, —S—, —NR'—, —C(=O)NR"—, —S(=O)$_2$— and divalent linking groups formed by further linking 2 or more of these, and R' and R" represent a hydrogen atom or a substituted or unsubstituted alkyl group. When these divalent linking groups are asymmetric in right and left (such as —C(=O)O—), they may be linked in either direction.

Y represents a substituent other than a hydrogen atom that can be substituted to a phenyl group. Examples of the substituent represented by Y include a halogen atom, an alkyl group (including cycloalkyl group, bicycloalkyl group), an alkenyl group (including cycloalkenyl group, bicycloalkenyl group), an alkynyl group, an aryl group, a heterocyclic group, a cyano group, a hydroxyl group, a nitro group, an alkoxy group, an aryloxy group, an acyloxy group, a carbamoyloxy group, an amino group (including anilino group), an acylamino group, a sulfamoylamino group, a mercapto group, an alkylthio group, an arylthio group, an acyl group, an aryloxycarbonyl group, an alkoxycarbonyl group, and a carbamoyl group.

$R^{11}$ and $R^{12}$ each independently represents a hydrogen atom, an alkyl group, an aryl group, an acyl group, a carbamoyl group, a hydroxyl group or an amino group. $R^{11}$ and $R^{12}$ may be linked to form a ring.

Z represents a hydrogen atom, a substituted or unsubstituted aliphatic hydrocarbon group (such as an alkyl group having 1-30 carbon atoms, an alkenyl group having 2-30 carbon atoms), or a substituted or unsubstituted aryl group (such as a phenyl group having 6-30 carbon atoms). n and p each represents an integer of 1-10, q represents 0 or an integer of 1-4. When p is 2 or more, $L^2$, Y and q included in respective repeating units may be same with or different from each other.

Preferable quaternary ammoniums represented by the formula (4) will be described in detail below.

In the formula (4), a divalent linking group represented by $L^1$ is preferably —O— or a single bond, and a divalent linking group represented by $L^2$ is preferably —O—, —C(=O)O—, —OC(=O)O— or a single bond.

In the formula (4), a substituent represented by Y is preferably a halogen atom (such as fluorine atom, chlorine atom, bromine atom), an alkyl group (straight-chain, branched, cyclic substituted or unsubstituted alkyl group), more preferably an alkyl group (preferably alkyl group having 1-30 carbon atoms, such as methyl group, ethyl group, n-propyl group, isopropyl group, tert-butyl group, n-octyl group, 2-chloroethyl group, 2-cyanoethyl group, 2-ethylhexyl group), an alkoxy group (such as methoxy group, ethoxy group) or a cyano group.

In the formula (4), $R^{11}$ and $R^{12}$ each is preferably a substituted or unsubstituted alkyl group, most preferably a methyl group.

In the formula (4), p is preferably 1-5, more preferably 2-4; n is preferably 1-4, more preferably 1 or 2; and q is preferably 0 or 1. In this connection, when p is 2 or more, q is more preferably 1 or more in at least one constituent unit.

Next, the aforementioned formula (3b) will be described.

Formula (3b):

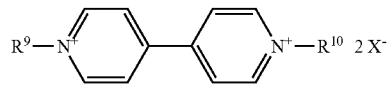

wherein $R^9$ and $R^{10}$ each independently represents a substituted or unsubstituted alkyl group, alkenyl group, alkynyl group, aralkyl group, aryl group or heterocyclic group, and $X^-$ represents an anion.

The substituted or unsubstituted alkyl group, alkenyl group, alkynyl group, aralkyl group, aryl group or heterocyclic group each represented by $R^9$ or $R^{10}$ has the same meaning and preferable range as the group represented by $R^8$ in the above-describe formula (3a). The anion represented by $X^-$ has the same meaning and preferable range as the anion represented by $X^-$ in the formula (3a). As described above, $X^-$ is not necessarily a monovalent anion, and may be a divalent or more valent anion. In this case, the ratio of the cation and the anion in the above-described compound is also not necessarily 1:2, and is determined suitably.

Specific examples of the onium salt that can be used in the invention are shown below. However, onium salts that can be used in the invention are not restricted to these. In specific examples below, Nos. II-1-II-12 and Nos. II-13-II-32 are examples of compounds represented by the formula (3b) and the formula (3a), respectively.

II-1

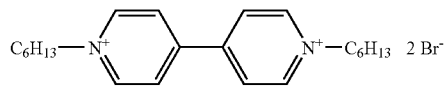

II-2

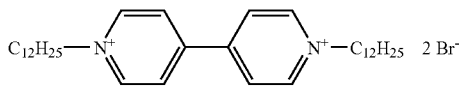

-continued
II-3
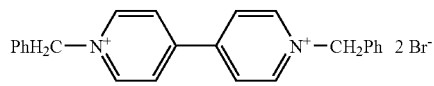
II-4
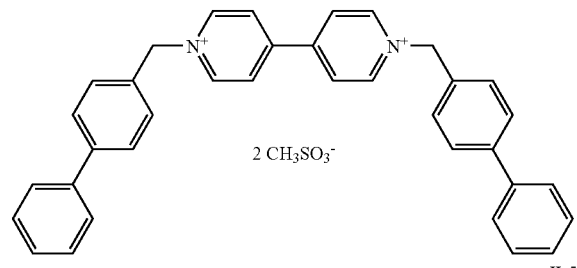
II-5
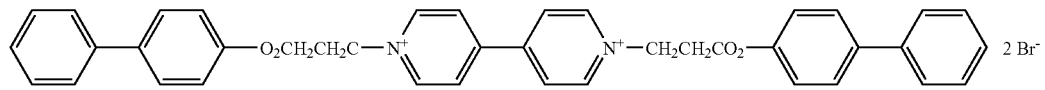
II-6
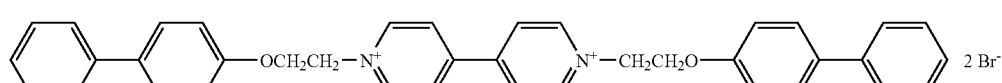
II-7
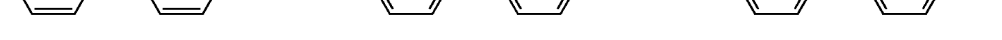
II-8
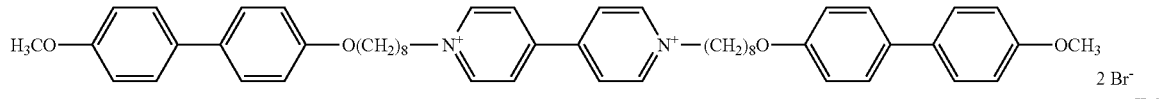
II-9
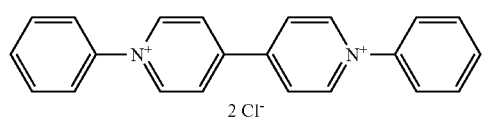
II-10
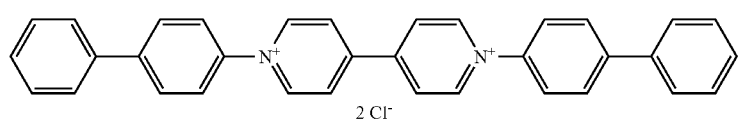
II-11
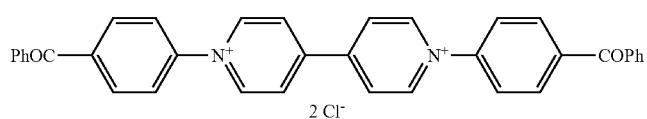
II-12
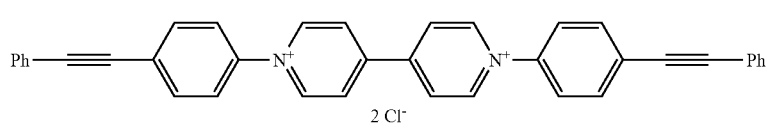
II-13
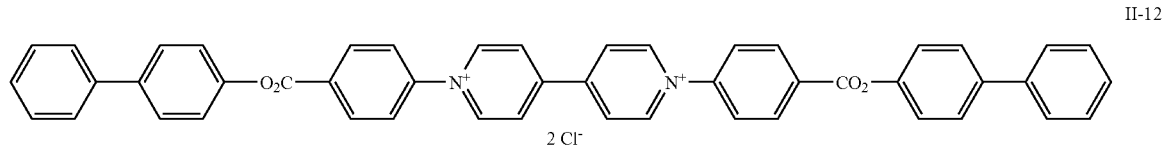
II-14
II-15
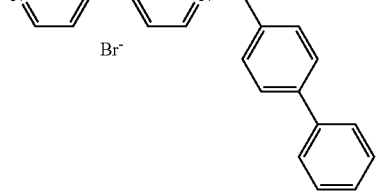
II-16

-continued
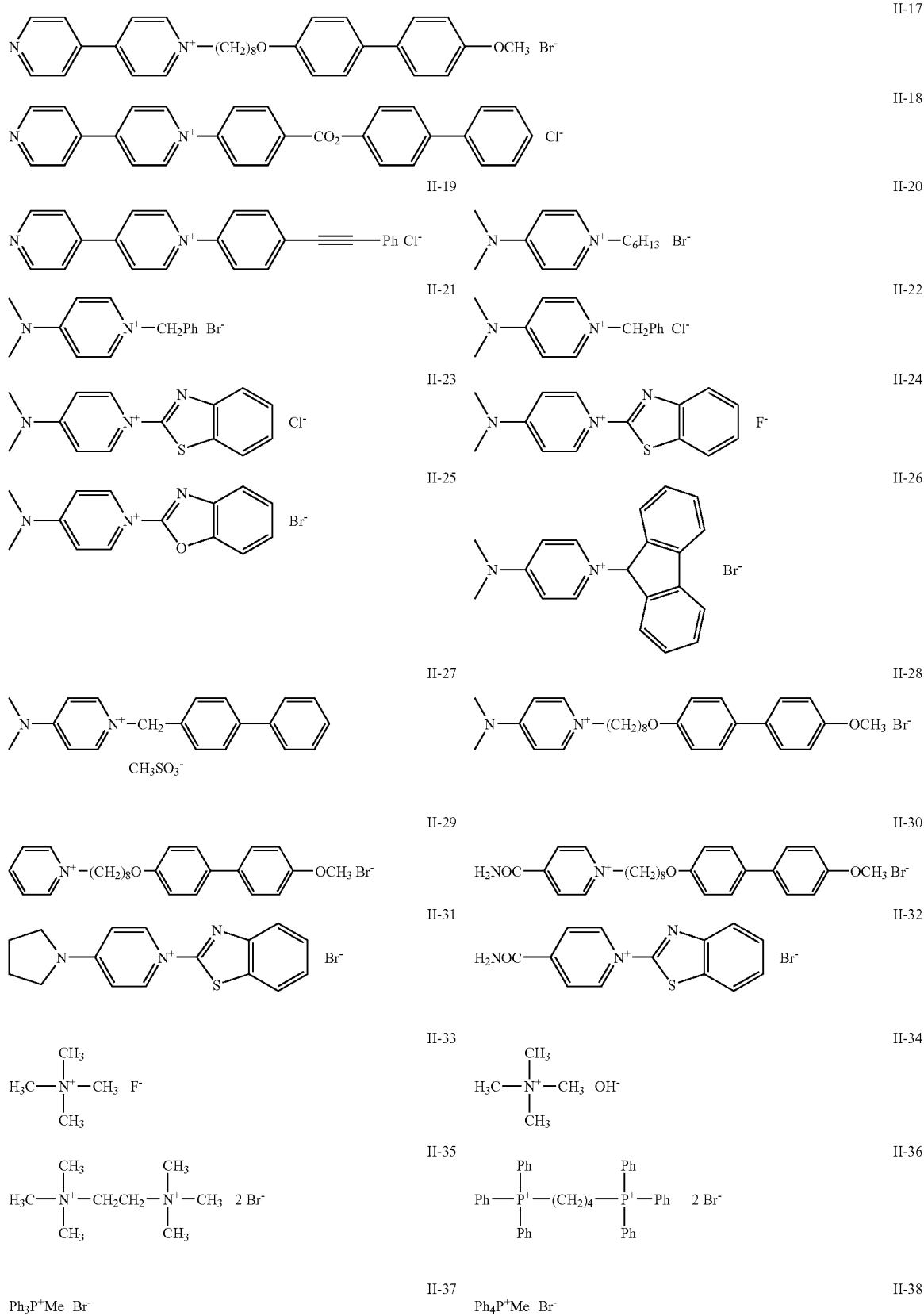

In addition, quaternary ammonium salts of (1)-(60) below are also preferable.
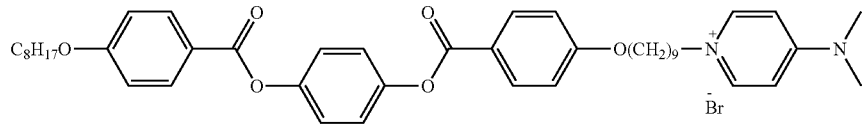
(1)
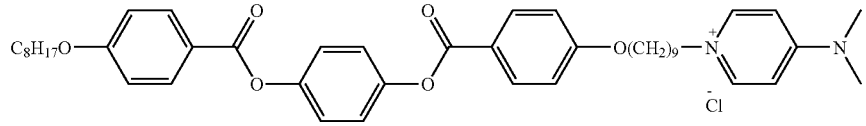
(2)
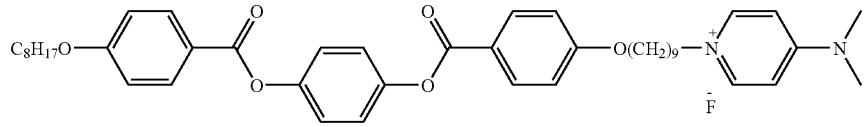
(3)
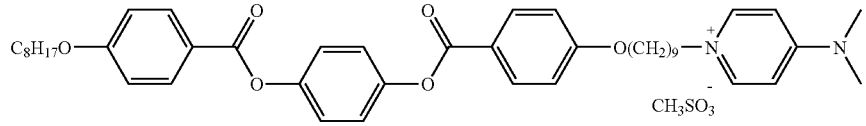
(4)
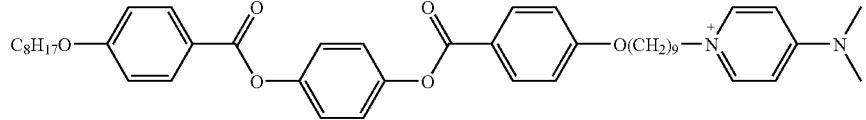
(5)
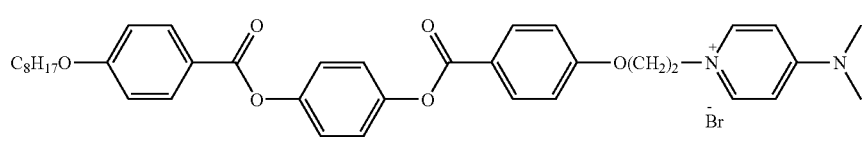
(6)
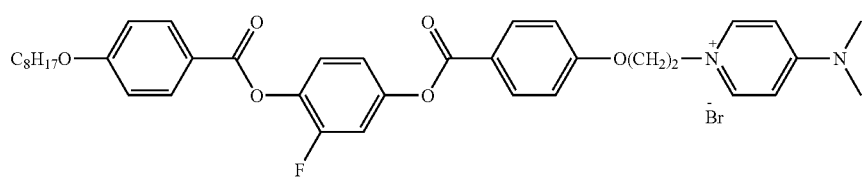
(7)
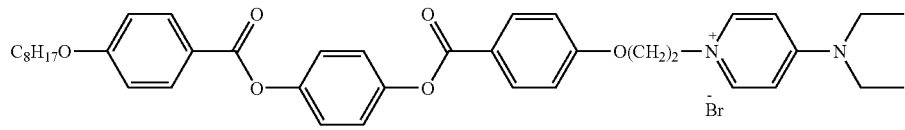
(8)
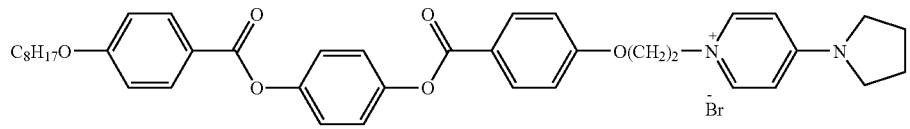
(9)
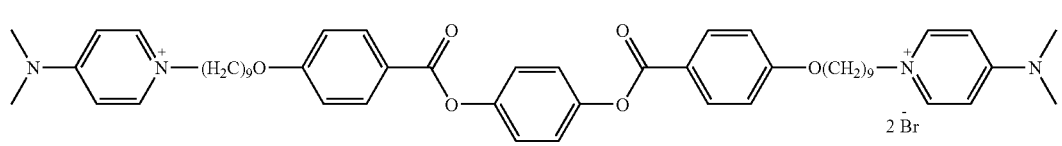
(10)

-continued
(11)
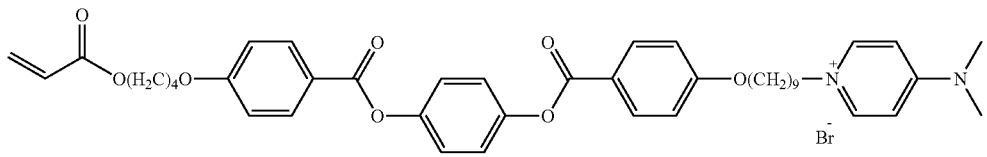
(12)
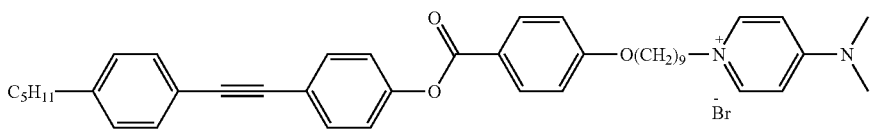
(13)
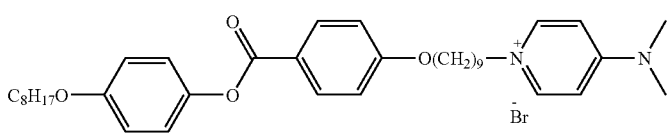
(14)
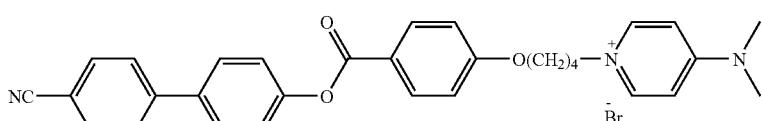
(15)
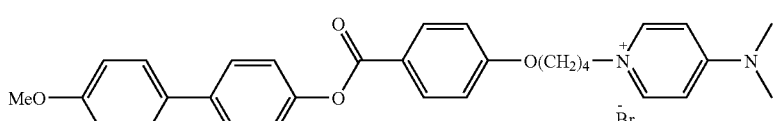
(16)
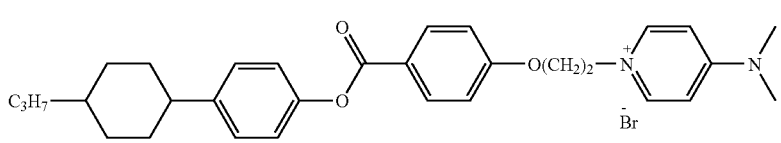
(17)
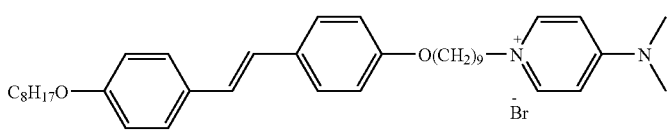
(18)
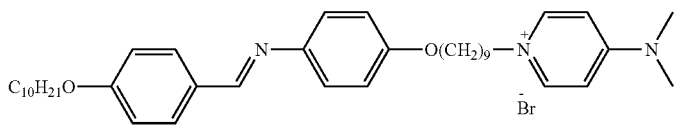
(19)
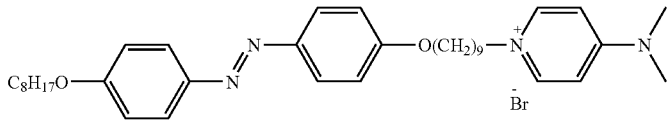
(20)
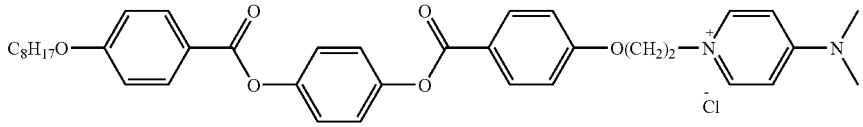

-continued
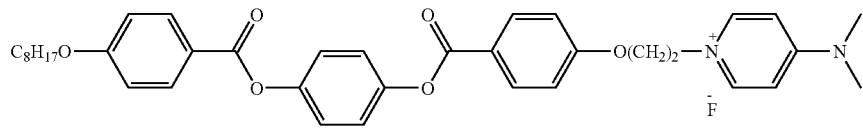
(21)
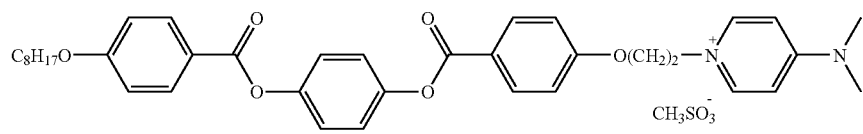
(22)
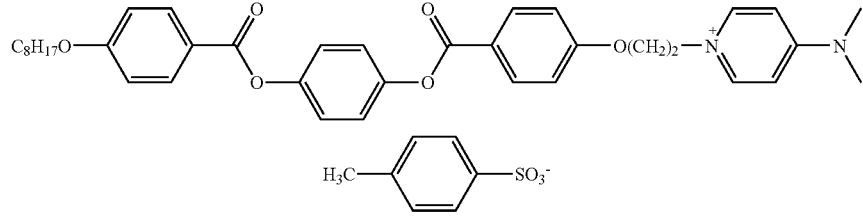
(23)
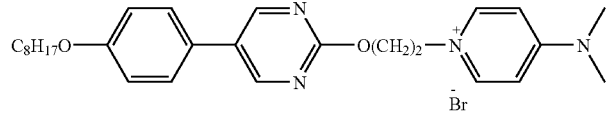
(24)
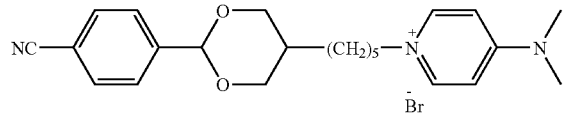
(25)
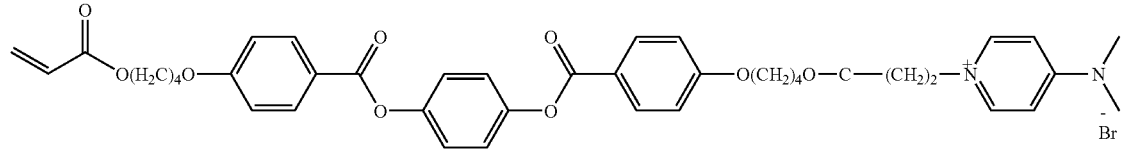
(26)
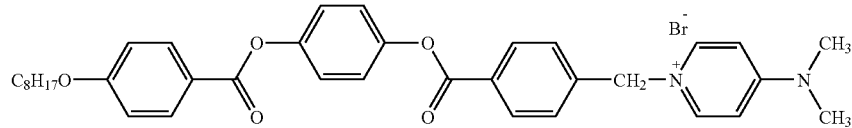
(27)
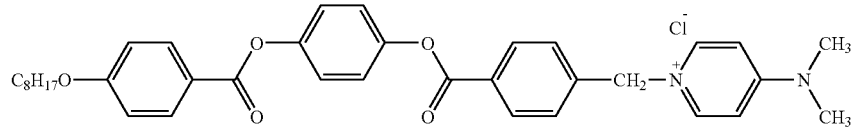
(28)
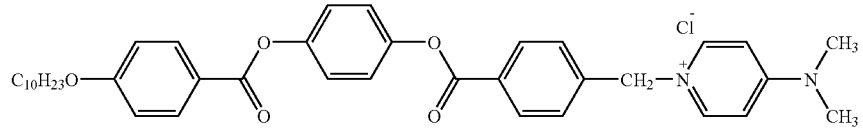
(29)
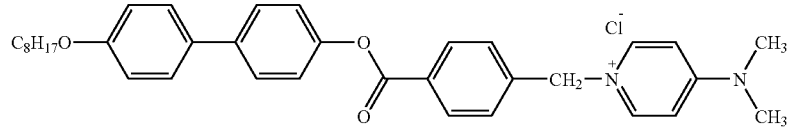
(30)

-continued
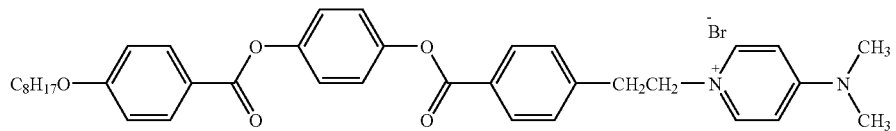
(31)
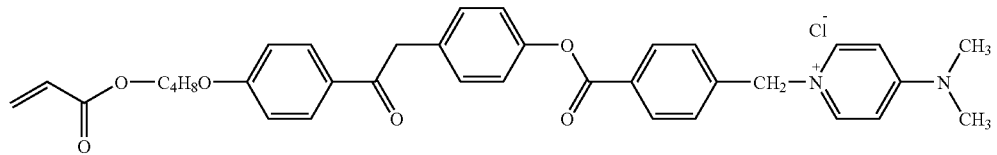
(32)
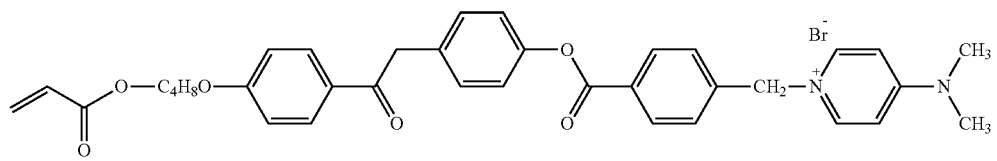
(33)
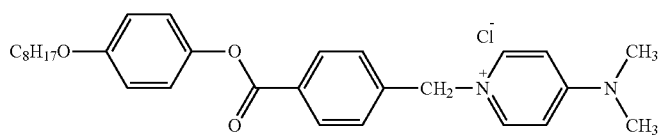
(34)
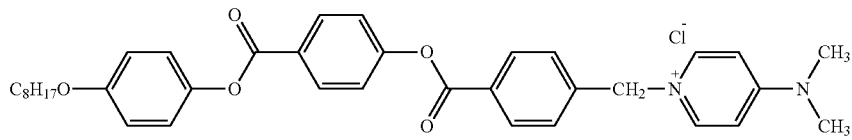
(35)
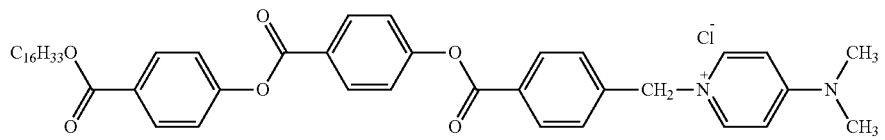
(36)
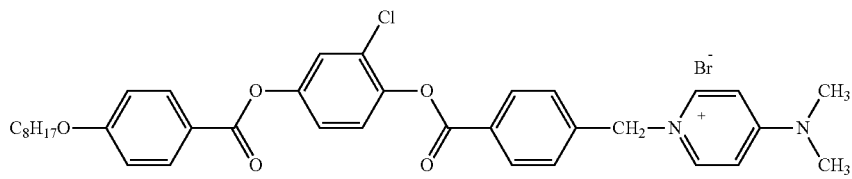
(37)
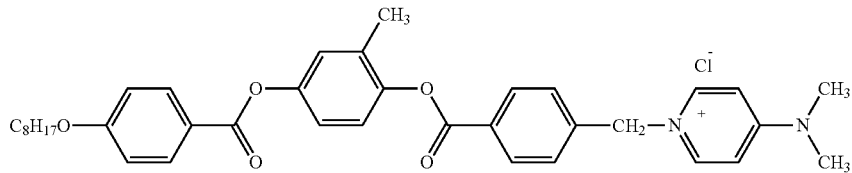
(38)

-continued
(39)
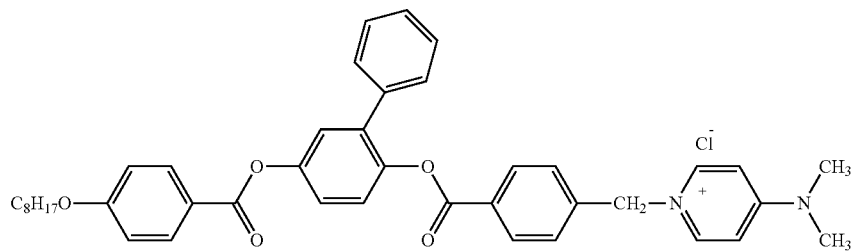
(40)
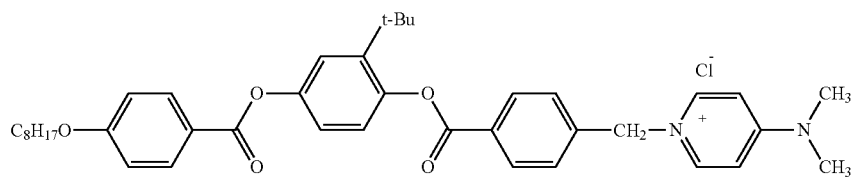
(41)
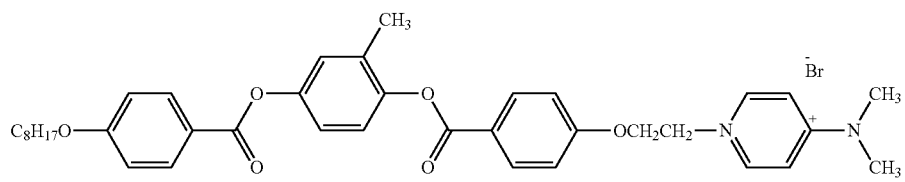
(42)
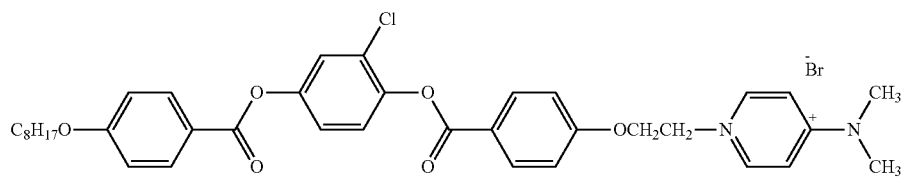
(43)
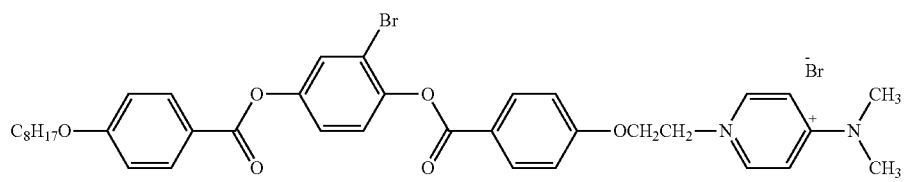
(44)
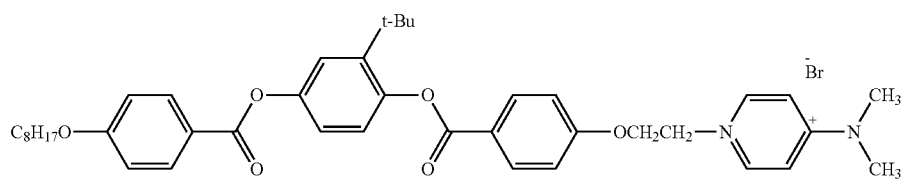
(45)
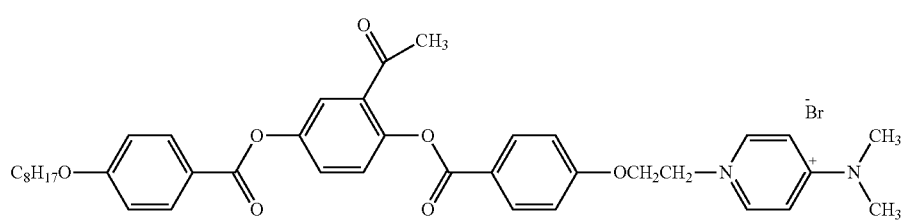

-continued
(46)
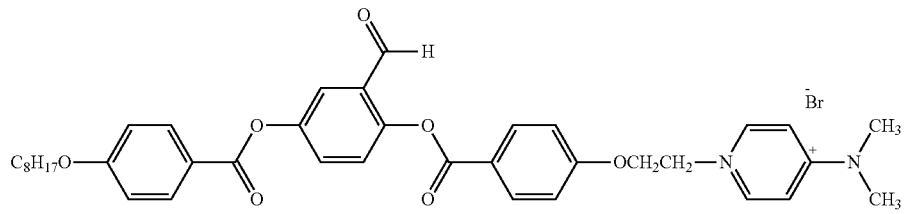
(47)
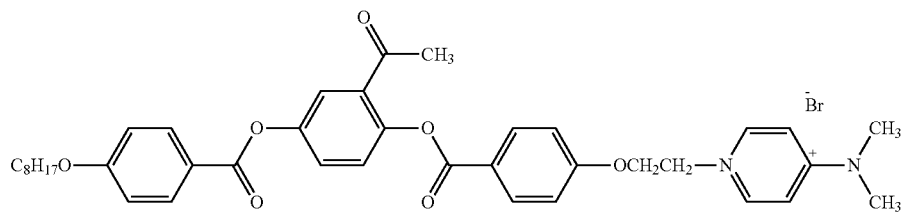
(48)
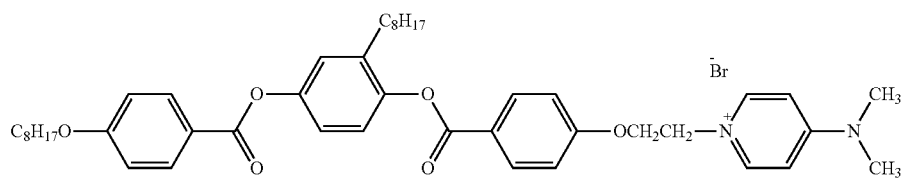
(49)
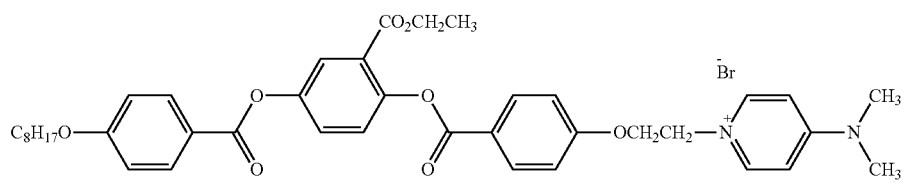
(50)
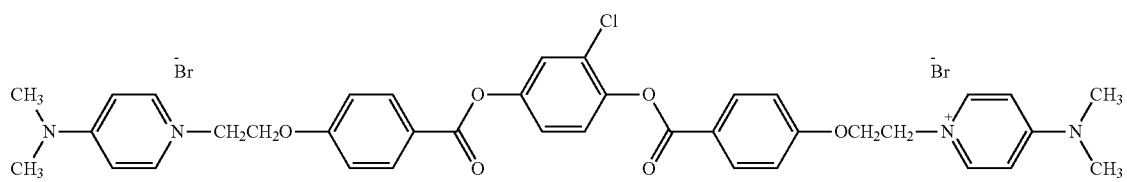
(51)
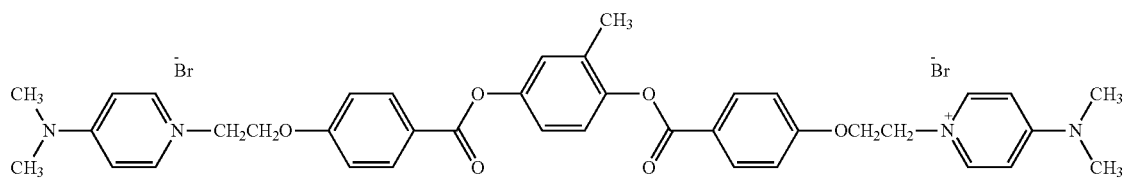
(52)
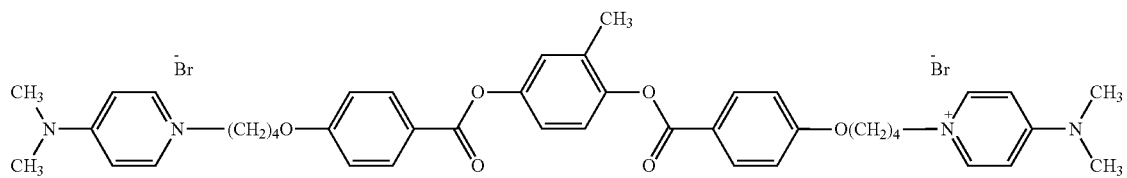

-continued
(53)
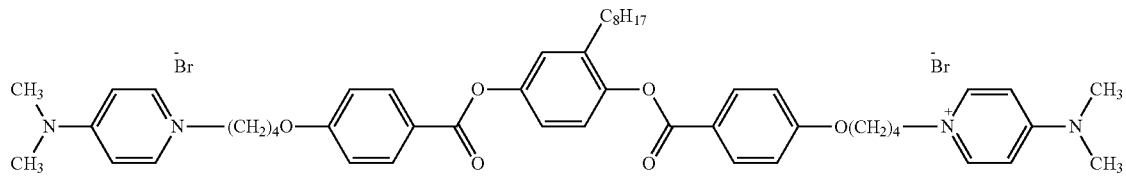
(54)
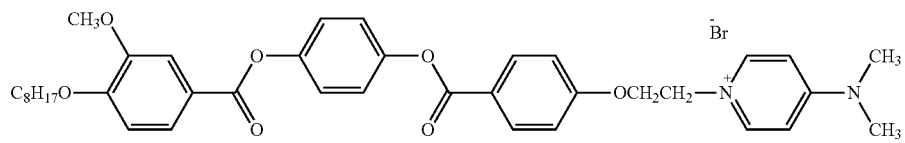
(55)
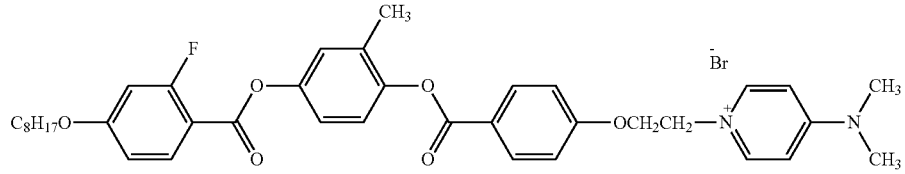
(56)
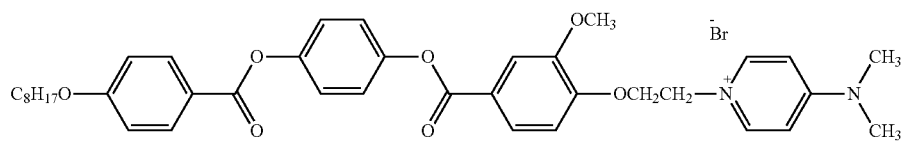
(57)
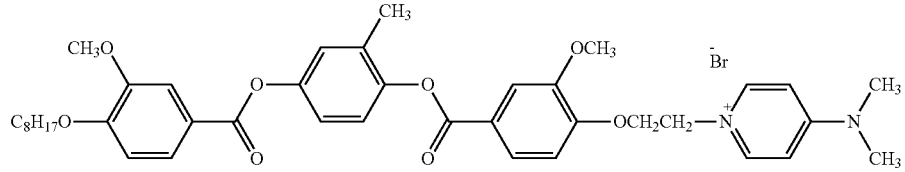
(58)
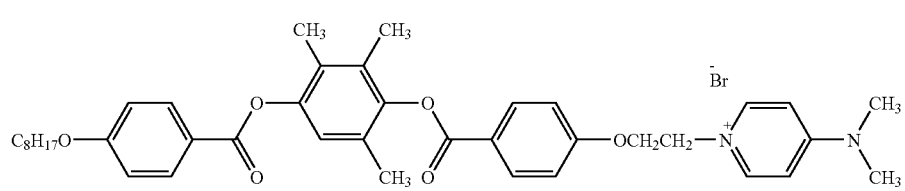
(59)
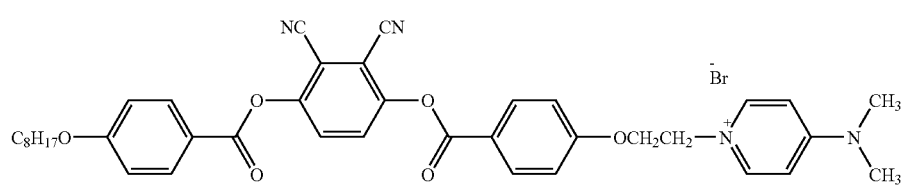
(60)
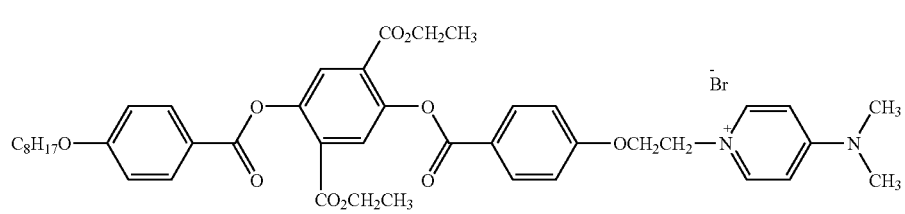

-continued (61)

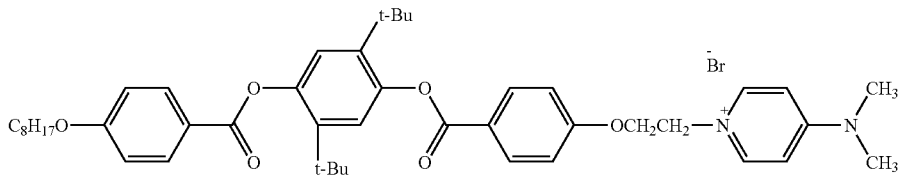

The above-described pyridinium derivatives are generally obtained by alkylation of a pyridine ring (Menshtkin reaction).

Preferable content of an onium salt in the above-described liquid crystal composition varies depending on the type thereof, but usually the content is preferably 0.01-10% by mass, more preferably 0.05-7% by mass, further preferably 0.05-5% by mass, relative to the content of a rod-shaped liquid crystal compound used in combination. The onium salt may be used in 2 types or more, and, in this case, the sum of the contents of all the types of onium salts is preferably in the above range.

<<Liquid Crystal Compound>>

The above-mentioned liquid crystal composition contains at least one type of a liquid crystal compound. The liquid crystal compound is not particularly restricted, may be a rod-shaped liquid crystal compound, a discotic liquid crystal compound or the like, but is preferably a rod-shaped liquid crystal compound. The rod-shaped liquid crystal compound more preferably has a positive refractive index anisotropy. The rod-shaped liquid crystal compound for use in the invention may be a high molecular weight compound or a low molecular weight compound. The rod-shaped liquid crystal compound may have lost liquid crystal property already in a state fixed in the optically anisotropic layer. Preferable examples of the rod-shaped liquid crystal compound include azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolanes and alkenylcyclohexylbenzonitriles. In addition to such low molecular weight liquid crystalline molecules, high molecular weight liquid crystalline molecules can be also used. Preferably used are such liquid crystal molecules that have a partial structure capable of initiating polymerization or cross-linking reaction with active rays, electron beams or heat. The number of the partial structure is 1-6, preferably 1-3. Rod-shaped liquid crystalline molecules usable in the invention are preferably a polymerizable rod-shaped liquid crystal compound having a polymerizable group in order to fix the alignment state thereof. As the polymerizable group, a radical-polymerizable unsaturated group or a cation-polymerizable group is preferable. Specifically, polymerizable groups and polymerizable liquid crystal compounds described in, for example, JP-A-2002-62427, paragraphs [0064]-[0086] can be mentioned.

<<Air Interface Vertical Alignment Agent>>

The liquid crystal composition preferably contains an additive for accelerating vertical alignment of rod-shaped liquid crystal compounds on air interface (hereinafter, it is occasionally referred to as "an air interface vertical alignment agent"). Usually, a rod-shaped liquid crystal compound has such character that it aligns in an inclined state on the air interface side, therefore, in order to obtain a state in which the compound is in a uniform vertical alignment, alignment control of the liquid crystal compound to be vertical is necessary on the air interface side. For this purpose, it is preferable to incorporate a compound that is unevenly distributed on the air interface side and affects the liquid crystal compound to align vertically through an excluded volume effect or electrostatic effect thereof to form an optically anisotropic layer.

Compounds described in JP-A-2002-20363 and JP-A-2002-129162 can be used as the air interface vertical alignment agent. Further, items described in JP-A-2004-53981, paragraphs [0072]-[0075], JP-A-2004-4688, paragraphs [0074]-[0078], and JP-A-2004-139015, paragraphs [0052]-[0054], [0065]-[0066] and [0092]-[0094] can be also applied to the invention suitably. Example of the air interface vertical alignment agent include following compounds B-1-B-33, and C-1-C-45.

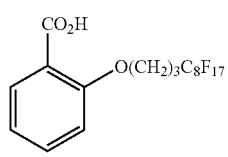

B-1

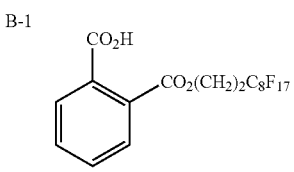

B-2

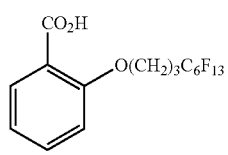

B-3

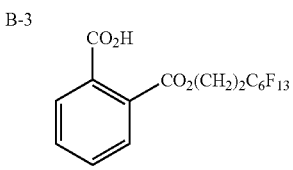

B-4

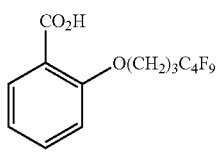 B-5
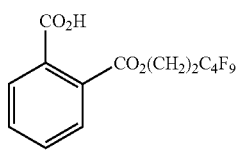 B-6
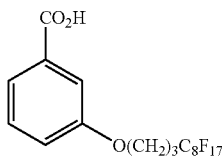 B-7
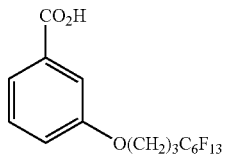 B-8
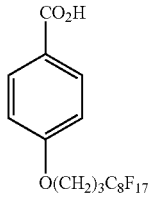 B-9
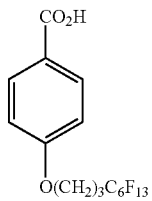 B-10
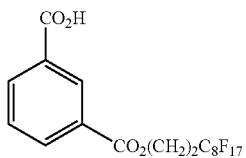 B-11
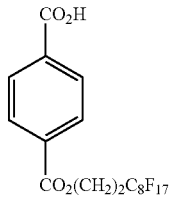 B-12
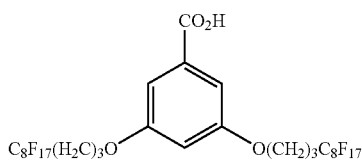 B-13
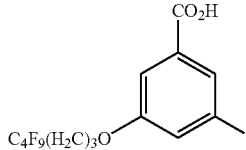 B-14
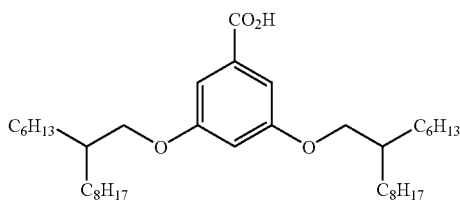 B-15
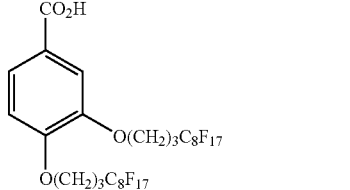 B-16
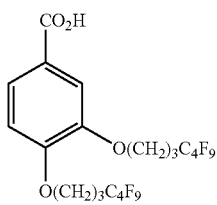 B-17
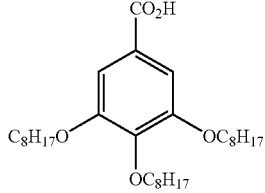 B-18
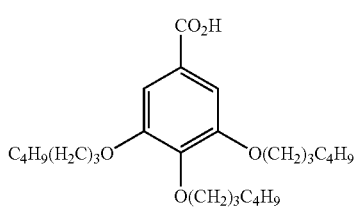 B-19
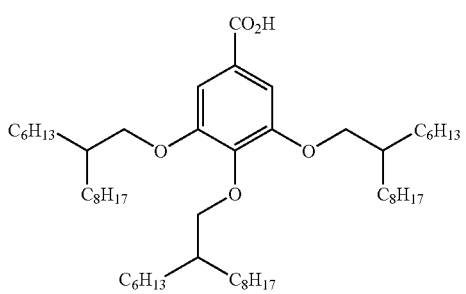 B-20

B-21 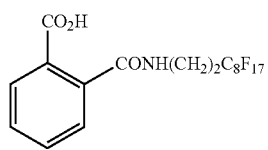
B-22 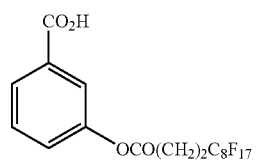
B-23 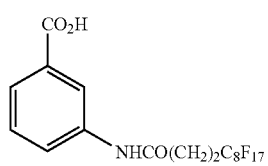
B-24 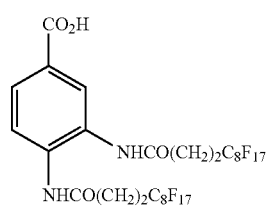
B-25 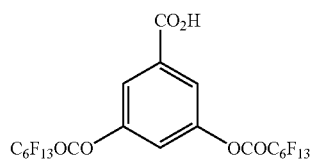
B-26 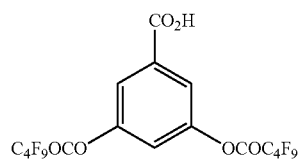
B-27 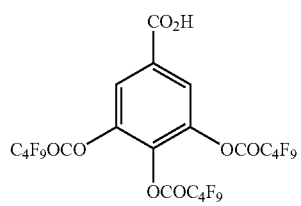
B-28 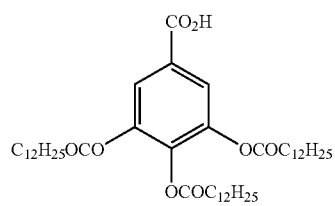
B-29 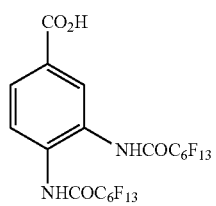
B-30 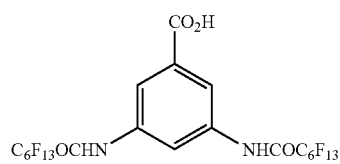
B-31 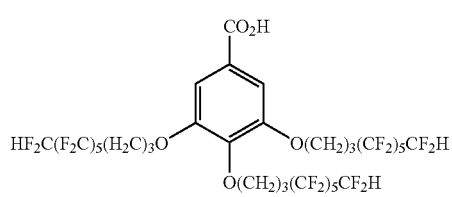
B-32 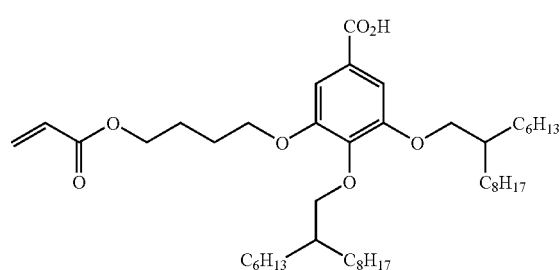

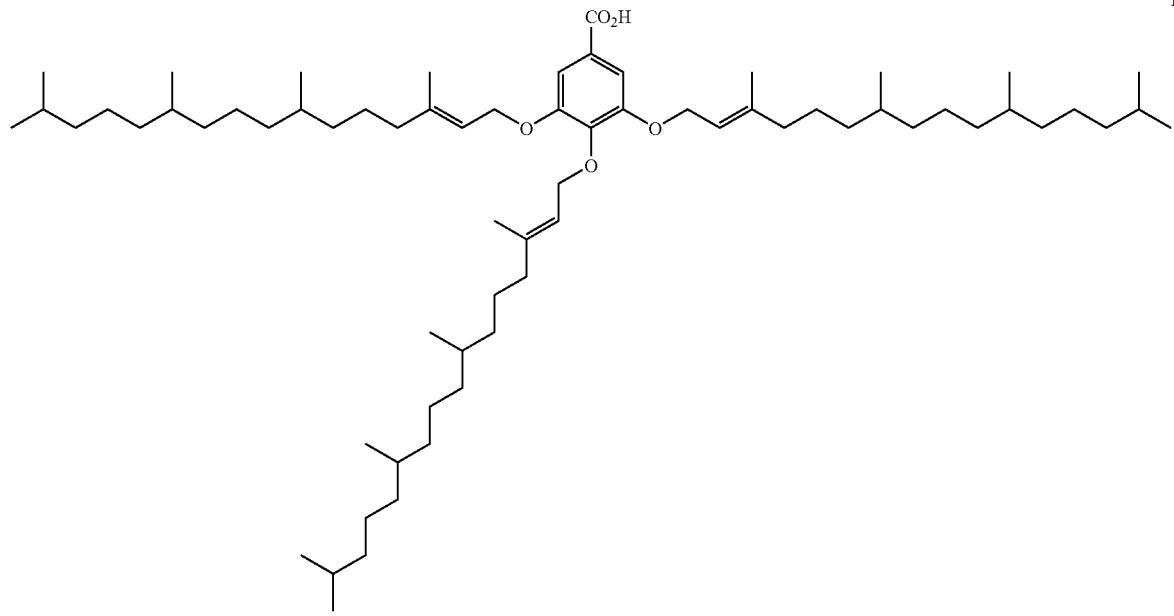
B-33
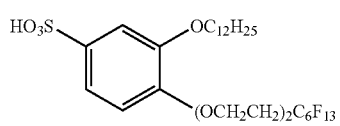 (C-1)
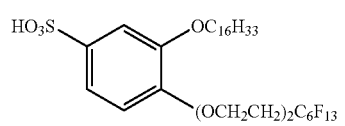 (C-2)
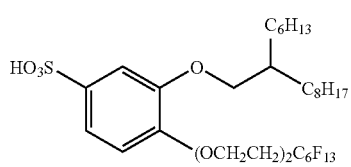 (C-3)
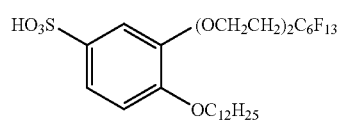 (C-4)
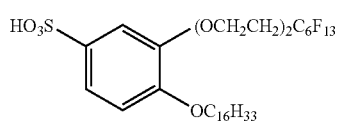 (C-5)
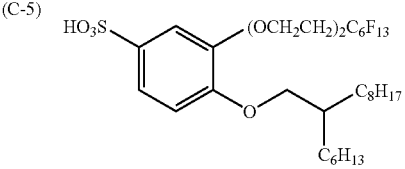 (C-6)
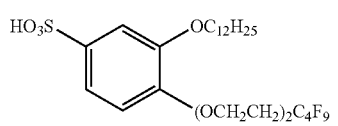 (C-7)
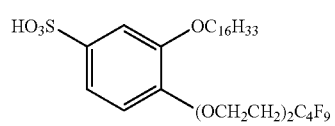 (C-8)
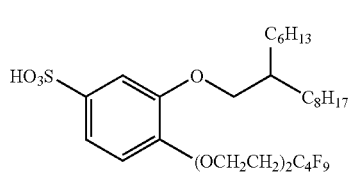 (C-9)
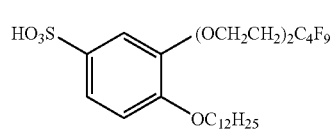 (C-10)
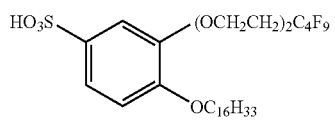 (C-11)
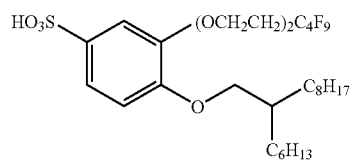 (C-12)

-continued
(C-13) 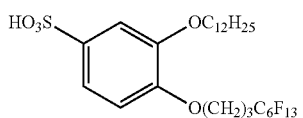
(C-14) 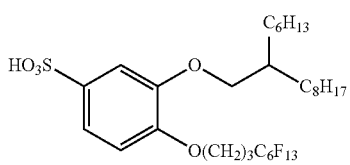
(C-15) 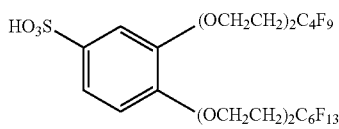
(C-16) 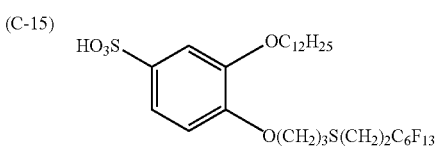
(C-17) 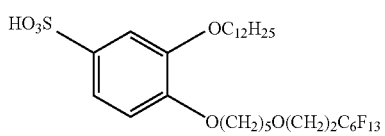
(C-18) 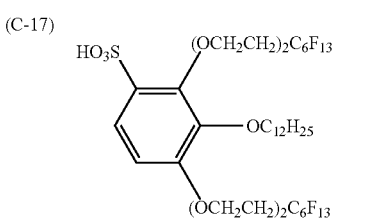
(C-19) 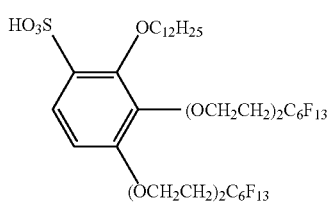
(C-20) 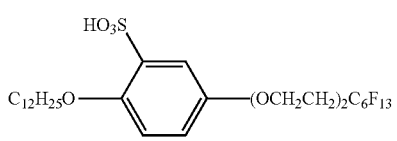
(C-21) 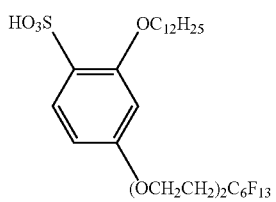
(C-22) 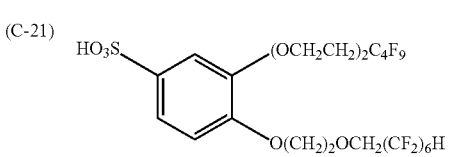
(C-23) 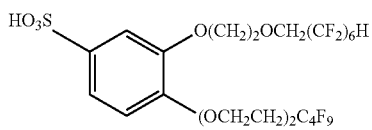
(C-24) 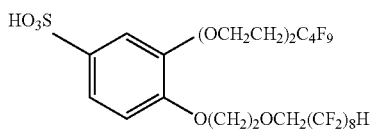
(C-25) 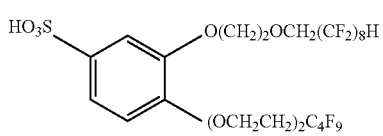
(C-26) 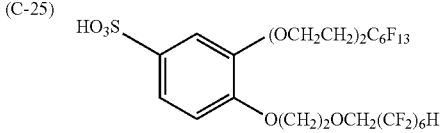
(C-27) 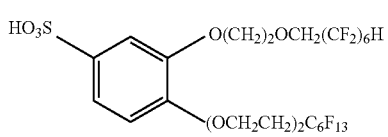
(C-28) 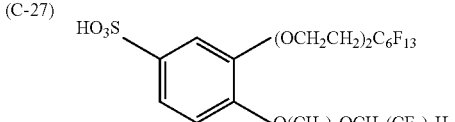
(C-29) 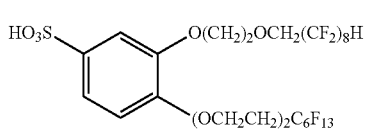
(C-30) 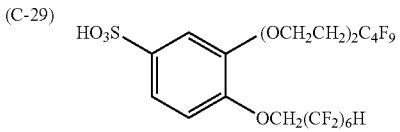
(C-31) 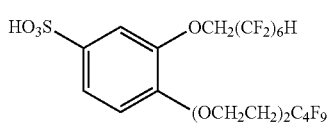
(C-32) 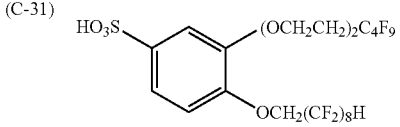

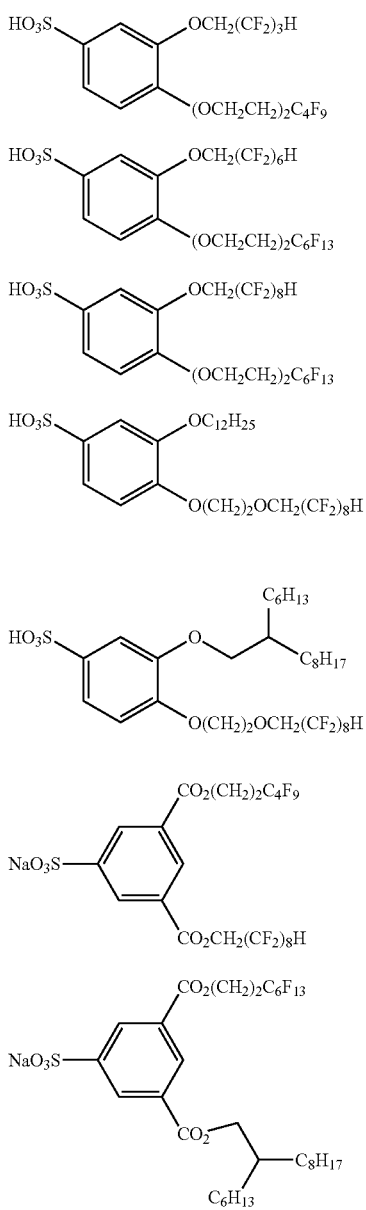
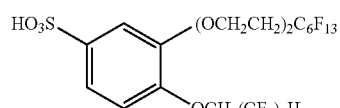
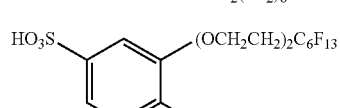
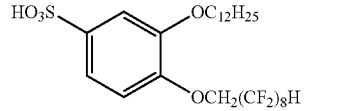
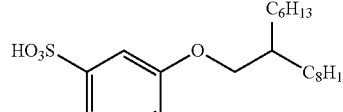
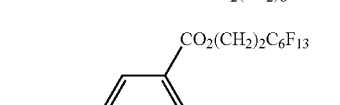
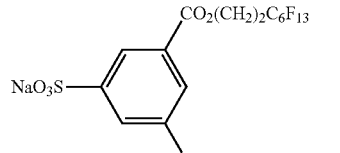

The air interface vertical alignment agent is preferably selected from compounds including a fluoroaliphatic group and one type or more of hydrophilic groups selected from the group consisting of a carboxyl group (—COOH), a sulfo group (—SO$_3$H), a sulphato group (—OSO$_3$H), a phosphonoxy group {—OP(=O)(OH)$_2$} and salts thereof. The compound having such construction enlarges the incline angle of the director of the rod-shaped liquid crystal compound on the air interface side and, at the same time, improves coating property of the composition to contribute to reduce generation of unevenness or uncoated area. The compound having the fluoroaliphatic group and at least one type of hydrophilic group (including a high molecular weight and low molecular weight compound) may have a polymerizable group. In this case, it contributes also to fixation of alignment of a liquid crystalline molecule used in combination.

The air interface vertical alignment agent for use in the invention is preferably a polymer having at least one fluoroaliphatic group and at least one hydrophilic group (hereinafter, it is occasionally referred to as "a fluorine-containing polymer"), or a compound represented by the following formula (2).

First, the fluorine-containing polymer usable as the air interface vertical alignment agent in the invention will be described.

<<Fluorine-Containing Polymer>>

In the above-described liquid crystal composition, a fluorine-containing polymer having a fluoroaliphatic group and one type or more of hydrophilic groups selected from the group consisting of a carboxyl group (—COOH), a sulfo group (—SO$_3$H), a phosphonoxy group {—OP(=O)(OH)$_2$} and salts thereof may be used as an air interface vertical alignment agent. Types of the polymer are described in pages 1-4 of "Kaitei Kobunshi Gousei no Kagaku ("Chemistry of Polymer Synthesis, Revised") (Otsu Takayuki, Kagakudojin Co., 1968), and examples thereof include polyolefins, polyesters, polyamides, polyimides, polyurethanes, polycarbonates, polysulfones, polycarbonates, polyethers, polyacetals, polyketones, polyphenyleneoxides, polyphenylenesulfides, polyarylates, PTFEs, polyvinylidene fluorides, and cellulose derivatives. The fluorine-containing polymer is preferably polyolefins.

The fluorine-containing polymer is a polymer having a fluoroaliphatic group in side chains. The fluoroaliphatic group has carbon atoms of preferably 1-12, more preferably 6-10. The aliphatic group may be in a chain or cyclic shape, and when it is in a chain shape, either a straight-chain or a branched-chain is sufficient. Among these, straight-chain fluoroaliphatic groups having 6-10 carbon atoms are preferable. The substitution degree by a fluorine atom is not particularly restricted, but hydrogen atoms in the aliphatic group is substituted by fluorine atoms preferably in 50% or more, more preferably in 60% or more. The fluoroaliphatic group is included in side chains bonding to the polymer main chain via an ester bond, an amide bond, an imide bond, an urethane bone, an urea bond, an ether bond, a thioether bond, an aromatic ring or the like. One of the fluoroaliphatic groups is that derived from a fluoroaliphatic compound produced by a teromerization method (also referred to as a teromer method) or a oligomerization method (also referred to as a oligomer method). A production method of these fluoroaliphatic compounds are described in, for example, pages 117-118 of "Fusso Kagobutsu no Gosei to Kinou (Synthesis and Function of Fluorine-containing Compounds)" (Ed by Ishikawa Nobuo, CMC, 1987), or in pages 747-752 of "Chemistry of Organic Fluorine Compounds II" (Monograph 187, Ed by Milos Hudlicky and Attila E. Pavlath, American Chemical Society 1995). The telomerization method is a method for synthesizing a telomer by carrying out radical polymerization of a fluorine-containing vinyl compound such as tetrafluoroethylene using an alkyl halide having a large chain transfer constant such as an iodide as a telogen (an example is shown in Scheme-1).

Scheme1

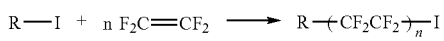

The obtained terminal-iodinated telomer is usually subjected to such appropriate terminal chemical modification, for example, as shown in Scheme 2 and derived to a fluoroaliphatic compound. These compounds are further converted into intended monomer structures according to need, which are used for producing fluorine-containing polymers.

Specific examples of the fluoroaliphatic group-containing monomer that can be utilized for producing a fluorine-containing polymer usable as the air interface vertical alignment agent in the invention are mentioned below. However, the invention is not restricted by the following specific examples in any way.

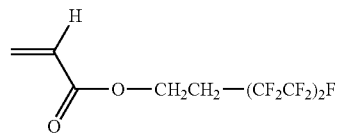
F-1

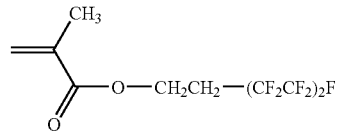
F-2

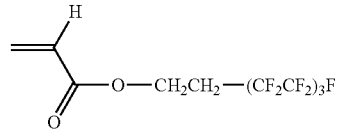
F-3

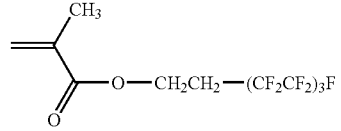
F-4

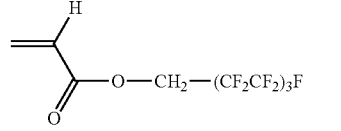
F-5

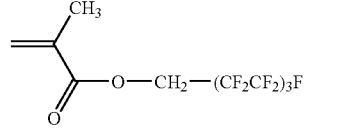
F-6

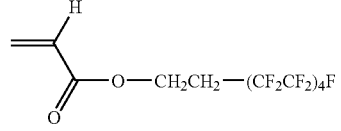
F-7

Scheme2

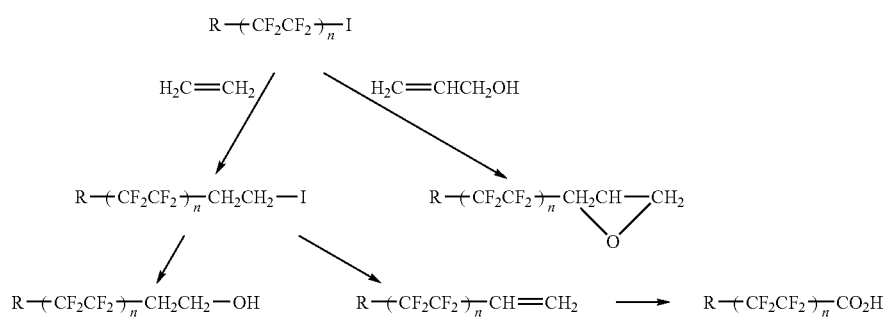

F-8: CH2=C(CH3)-C(=O)-O-CH2CH2-(CF2CF2)4F

F-9: CH2=CH-C(=O)-O-CH2CH2CH2CH2-(CF2CF2)3F

F-10: CH2=C(CH3)-C(=O)-O-CH2CH2CH2CH2CH2-(CF2CF2)2F

F-11: CH2=CH-C(=O)-NH-CH2CH2-(CF2CF2)2F

F-12: CH2=C(CH3)-C(=O)-NH-CH2CH2-(CF2CF2)2F

F-13: CH2=CH-C(=O)-NH-CH2CH2-(CF2CF2)3F

F-14: CH2=C(CH3)-C(=O)-NH-CH2CH2-(CF2CF2)3F

F-15: CH2=CH-C(=O)-NH-CH2-(CF2CF2)3F

F-16: CH2=C(CH3)-C(=O)-NH-CH2-(CF2CF2)3F

F-17: CH2=CH-C(=O)-NH-CH2CH2CH2-(CF2CF2)3F

F-18: CH2=C(CH3)-C(=O)-NH-CH2CH2CH2-(CF2CF2)3F

F-19: CH2=CH-C(=O)-NH-CH2CH2CH2CH2CH2-(CF2CF2)3F

F-20: CH2=C(CH3)-C(=O)-NH-CH2CH2CH2CH2CH2-(CF2CF2)2F

F-21: CH2=CH-C(=O)-N(CH3)-CH2CH2-(CF2CF2)2F

F-22: CH2=C(CH3)-C(=O)-N(CH3)-CH2CH2-(CF2CF2)2F

F-23: CH2=CH-C(=O)-N(CH3)-CH2CH2-(CF2CF2)3F

F-24: CH2=C(CH3)-C(=O)-N(CH3)-CH2CH2-(CF2CF2)3F

F-25: CH2=CH-C(=O)-N(CH3)-CH2-(CF2CF2)3F

F-26: CH2=C(CH3)-C(=O)-N(CH3)-CH2-(CF2CF2)3F

F-27: CH2=CH-C(=O)-N(CH3)-CH2CH2CH2-(CF2CF2)3F

F-28: CH2=C(CH3)-C(=O)-N(CH3)-CH2CH2CH2-(CF2CF2)3F

F-29: CH2=CH-C(=O)-N(CH3)-CH2CH2CH2CH2CH2-(CF2CF2)3F

F-30

$$\text{CH}_2=\text{C}(\text{CH}_3)-\text{C}(=\text{O})-\text{N}(\text{CH}_3)-\text{CH}_2\text{CH}_2\text{CH}_2\text{CH}_2\text{CH}_2-(\text{CF}_2\text{CF}_2)_2\text{F}$$

F-31

$$\text{CH}_2=\text{CH}-\text{C}(=\text{O})-\text{N}(\text{CH}_2\text{CH}_3)-\text{CH}_2\text{CH}_2-(\text{CF}_2\text{CF}_2)_2\text{F}$$

F-32

$$\text{CH}_2=\text{C}(\text{CH}_3)-\text{C}(=\text{O})-\text{N}(\text{CH}_2\text{CH}_3)-\text{CH}_2\text{CH}_2-(\text{CF}_2\text{CF}_2)_2\text{F}$$

F-33

$$\text{CH}_2=\text{CH}-\text{C}(=\text{O})-\text{N}(\text{CH}_2\text{CH}_3)-\text{CH}_2\text{CH}_2-(\text{CF}_2\text{CF}_2)_3\text{F}$$

F-34

$$\text{CH}_2=\text{C}(\text{CH}_3)-\text{C}(=\text{O})-\text{N}(\text{CH}_2\text{CH}_3)-\text{CH}_2\text{CH}_2-(\text{CF}_2\text{CF}_2)_3\text{F}$$

F-35

$$\text{CH}_2=\text{CH}-\text{C}(=\text{O})-\text{N}(\text{CH}_2\text{CH}_3)-\text{CH}_2-(\text{CF}_2\text{CF}_2)_3\text{F}$$

F-36

$$\text{CH}_2=\text{C}(\text{CH}_3)-\text{C}(=\text{O})-\text{N}(\text{CH}_2\text{CH}_3)-\text{CH}_2-(\text{CF}_2\text{CF}_2)_3\text{F}$$

F37

$$\text{CH}_2=\text{CH}-\text{C}(=\text{O})-\text{N}(\text{CH}_2\text{CH}_3)-\text{CH}_2\text{CH}_2\text{CH}_2-(\text{CF}_2\text{CF}_2)_3\text{F}$$

F38

$$\text{CH}_2=\text{C}(\text{CH}_3)-\text{C}(=\text{O})-\text{N}(\text{CH}_2\text{CH}_3)-\text{CH}_2\text{CH}_2\text{CH}_2-(\text{CF}_2\text{CF}_2)_3\text{F}$$

F-39

$$\text{CH}_2=\text{CH}-\text{C}(=\text{O})-\text{N}(\text{CH}_2\text{CH}_3)-\text{CH}_2\text{CH}_2\text{CH}_2\text{CH}_2\text{CH}_2-(\text{CF}_2\text{CF}_2)_3\text{F}$$

F-40

$$\text{CH}_2=\text{C}(\text{CH}_3)-\text{C}(=\text{O})-\text{N}(\text{CH}_2\text{CH}_3)-\text{CH}_2\text{CH}_2\text{CH}_2\text{CH}_2\text{CH}_2-(\text{CF}_2\text{CF}_2)_2\text{F}$$

F-41

$$\text{CH}_2=\text{CH}-\text{C}(=\text{O})-\text{N}(\text{CH}_2\text{CH}_3)-\text{CH}_2\text{CH}_2-(\text{CF}_2\text{CF}_2)_2\text{F}$$

F-42

$$\text{CH}_2=\text{C}(\text{CH}_3)-\text{C}(=\text{O})-\text{N}(\text{CH}_2\text{CH}_2\text{CH}_3)-\text{CH}_2\text{CH}_2-(\text{CF}_2\text{CF}_2)_2\text{F}$$

F-43

$$\text{CH}_2=\text{CH}-\text{C}(=\text{O})-\text{N}(\text{CH}_2\text{CH}_3)-\text{CH}_2\text{CH}_2-(\text{CF}_2\text{CF}_2)_3\text{F}$$

F-44

$$\text{CH}_2=\text{C}(\text{CH}_3)-\text{C}(=\text{O})-\text{N}(\text{CH}_2\text{CH}_3)-\text{CH}_2\text{CH}_2-(\text{CF}_2\text{CF}_2)_3\text{F}$$

F-45

$$\text{CH}_2=\text{CH}-\text{C}(=\text{O})-\text{N}(\text{CH}_2\text{CH}_3)-\text{CH}_2-(\text{CF}_2\text{CF}_2)_3\text{F}$$

F-46

$$\text{CH}_2=\text{C}(\text{CH}_3)-\text{C}(=\text{O})-\text{N}(\text{CH}_2\text{CH}_3)-\text{CH}_2-(\text{CF}_2\text{CF}_2)_3\text{F}$$

F-47

$$\text{CH}_2=\text{CH}-\text{C}(=\text{O})-\text{N}(\text{CH}_2\text{CH}_3)-\text{CH}_2\text{CH}_2\text{CH}_2\text{CH}_2-(\text{CF}_2\text{CF}_2)_3\text{F}$$

F-48

$$\text{CH}_2=\text{C}(\text{CH}_3)-\text{C}(=\text{O})-\text{N}(\text{CH}_2\text{CH}_3)-\text{CH}_2\text{CH}_2\text{CH}_2\text{CH}_2-(\text{CF}_2\text{CF}_2)_3\text{F}$$

F-49

$$\text{CH}_2=\text{CH}-\text{C}(=\text{O})-\text{N}(\text{CH}_2\text{CH}_3)-\text{CH}_2\text{CH}_2\text{CH}_2\text{CH}_2\text{CH}_2-(\text{CF}_2\text{CF}_2)_3\text{F}$$

F-50

$$\text{CH}_2=\text{C}(\text{CH}_3)-\text{C}(=\text{O})-\text{N}(\text{CH}_2\text{CH}_3)-\text{CH}_2\text{CH}_2\text{CH}_2\text{CH}_2\text{CH}_2-(\text{CF}_2\text{CF}_2)_2\text{F}$$

F-51

$$\text{CH}_2=\text{CH}-\text{C}(=\text{O})-\text{N}(\text{CH}_2\text{CH}_2\text{CH}_3)-\text{CH}_2\text{CH}_2-(\text{CF}_2\text{CF}_2)_2\text{F}$$

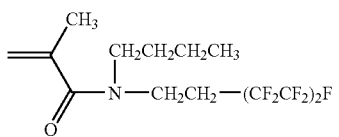 F-52

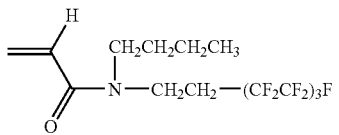 F-53

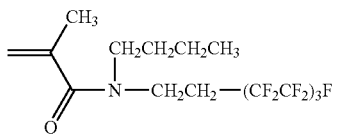 F-54

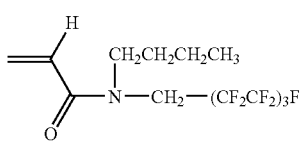 F-55

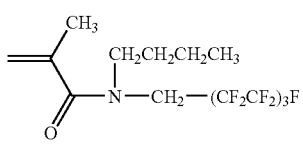 F-56

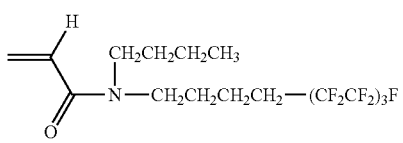 F-57

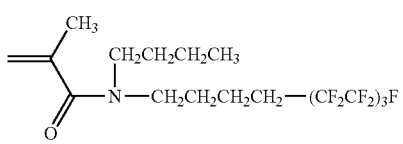 F-58

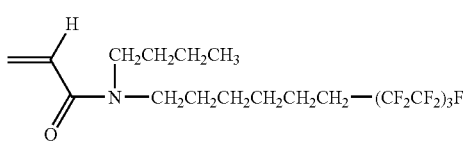 F-59

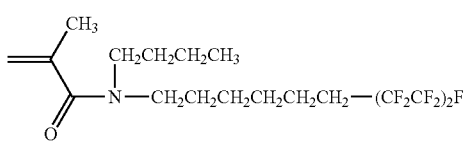 F-60

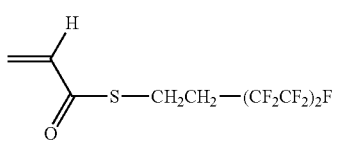 F-61

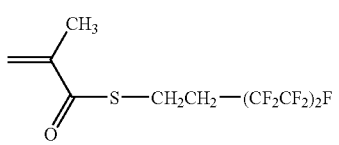 F-62

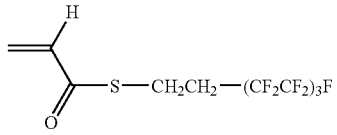 F-63

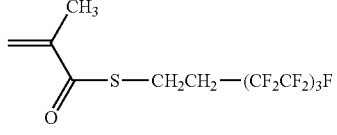 F-64

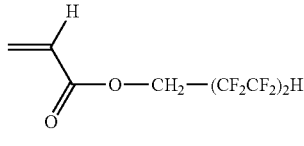 F-65

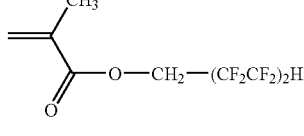 F-66

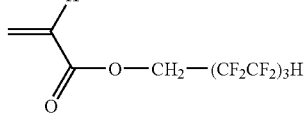 F-67

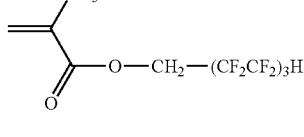 F-68

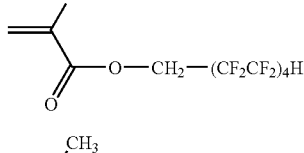 F-69

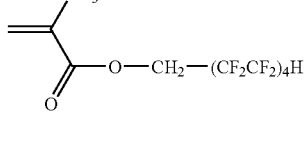 F-70

The above-described fluorine-containing polymer is preferably selected from copolymers having a repeating unit derived from a fluoroaliphatic group-containing monomer and a repeating unit including a hydrophilic group represented by the following formula (1).

Formula (1):

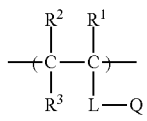

wherein $R^1$, $R^2$ and $R^3$ each independently represents a hydrogen atom or a substituent. Q represents a carboxyl group (—COOH) or its salt, a sulfo group (—SO$_3$H) or its salt, or a phosphonoxy group {—OP(=O)(OH)$_2$} or its salt.

L represents an arbitrary group selected from the following linking groups, or divalent linking groups formed by combining 2 or more of these.

(Group of Linking Groups)

A single bond, —O—, —CO—, —NR$^4$— (R$^4$ represents a hydrogen atom, an alkyl group, an aryl group or an aralkyl group), —S—, —SO$_2$—, —P(=O)(OR$^5$)— (R$^5$ represents an alkyl group, an aryl group or an aralkyl group), an alkylene group and an arylene group.

In the formula (1), R$^1$, R$^2$ and R$^3$ each independently represents a hydrogen atom or a substituent represented from the following group Y of substituents.

(Group Y of Substituents)

Alkyl groups (alkyl groups having preferably 1-20 carbon atoms, more preferably 1-12 carbon atoms, particularly preferably 1-8 carbon atoms, such as methyl group, ethyl group, isopropyl group, tert-butyl group, n-octyl group, n-decyl group, n-hexadecyl group, cyclopropyl group, cyclopentyl group, cyclohexyl group), alkenyl groups (alkenyl groups having preferably 2-20 carbon atoms, more preferably 2-12 carbon atoms, particularly preferably 2-8 carbon atoms, such as vinyl group, aryl group, 2-butenyl group, 3-pentenyl group), alkynyl groups (alkynyl groups having preferably 2-20 carbon atoms, more preferably 2-12 carbon atoms, particularly preferably 2-8 carbon atoms, such as propargyl group, 3-pentynyl group), aryl groups (aryl groups having preferably 6-30 carbon atoms, more preferably 6-20 carbon atoms, particularly preferably 6-12 carbon atoms, such as phenyl group, p-methylphenyl group, naphthyl group), aralkyl groups (aralkyl groups having preferably 7-30 carbon atoms, more preferably 7-20 carbon atoms, particularly preferably 7-12 carbon atoms, such as benzyl group, phenethyl group, 3-phenylpropyl group), substituted or unsubstituted amino groups (amino groups having preferably 0-20 carbon atoms, more preferably 0-10 carbon atoms, particularly preferably 0-6 carbon atoms, such as unsubstituted amino group, methylamino group, dimethylamino group, diethylamino group, anilino group), alkoxy groups (alkoxy groups having preferably 1-20 carbon atoms, more preferably 1-16 carbon atoms, particularly preferably 1-10 carbon atoms, such as methoxy group, ethoxy group, butoxy group), alkoxycarbonyl groups (alkoxycarbonyl groups having preferably 2-20 carbon atoms, more preferably 2-16 carbon atoms, particularly preferably 2-10 carbon atoms, such as methoxycarbonyl group, ethoxycarbonyl group), acyloxy groups (acyloxy groups having preferably 2-20 carbon atoms, more preferably 2-16 carbon atoms, particularly preferably 2-10 carbon atoms, such as acetoxy group, benzoyloxy group), acylamino groups (acylamino groups having preferably 2-20 carbon atoms, more preferably 2-16 carbon atoms, particularly preferably 2-10 carbon atoms, such as acetylamino group, benzoylamino group), alkoxycarbonylamino groups (alkoxycarbonylamino groups having preferably 2-20 carbon atoms, more preferably 2-16 carbon atoms, particularly preferably 2-12 carbon atoms, such as methoxycarbonylamino group), aryloxycarbonylamino groups (aryloxycarbonylamino group having preferably 7-20 carbon atoms, more preferably 7-16 carbon atoms, and particularly preferably 7-12 carbon atoms, such as phenyloxycarbonylamino group), sulfonylamino groups (sulfonylamino groups having preferably 1-20-carbon atoms, more preferably 1-16 carbon atoms, particularly preferably 1-12 carbon atoms, such as methanesulfonylamino group, benzenesulfonylamino group), sulfamoyl groups (sulfamoyl groups having preferably 0-20 carbon atoms, more preferably 0-16 carbon atoms, particularly preferably 0-12 carbon atoms, such as sulfamoyl group, methylsulfamoyl group, dimethylsulfamoyl group, phenylsulfamoyl group), carbamoyl groups (carbamoyl groups having preferably 1-20 carbon atoms, more preferably 1-16 carbon atoms, particularly preferably 1-12 carbon atoms, such as unsubstituted carbamoyl group, methylcarbamoyl group, diethylcarbamoyl group, phenylcarbamoyl group), alkylthio groups (alkylthio groups having preferably 1-20 carbon atoms, more preferably 1-16 carbon atoms, particularly preferably 1-12 carbon atoms, such as methylthio group, ethylthio group), arylthio groups (arylthio groups having preferably 6-20 carbon atoms, more preferably 6-16 carbon atoms, particularly preferably 6-12 carbon atoms, such as phenylthio group), sulfonyl groups (sulfonyl groups having preferably 1-20 carbon atoms, more preferably 1-16 carbon atoms, particularly preferably 1-12 carbon atoms, such as mesyl group, tosyl group), sulfinyl groups (sulfinyl groups having preferably 1-20 carbon atoms, more preferably 1-16 carbon atoms, particularly preferably 1-12 carbon atoms, such as methanesulfinyl group, benzenesulfinyl group), ureide groups (ureide groups having preferably 1-20 carbon atoms, more preferably 1-16 carbon atoms, particularly preferably 1-12 carbon atoms, such as unsubstituted ureide group, methylureide group, phenylureide group), phosphoric acid amide groups (phosphoric acid amide groups having preferably 1-20 carbon atoms, more preferably 1-16 carbon atoms, particularly preferably 1-12 carbon atoms, such as diethylphosphoric acid amide group, phenylphosphoric acid amide group), a hydroxyl group, a mercapto group, halogen atoms (such as fluorine atom, chlorine atom, bromine atom, iodine atom), a cyano group, a sulfo group, a carboxyl group, a nitro group, a hydroxamic acid group, a sulfino group, a hydrazine group, an imino group, heterocyclic groups (heterocyclic groups having preferably 1-30 carbon atoms, more preferably 1-12 carbon atoms, including a hetero atom of, for example, a nitrogen atom, an oxygen atom or a sulfur atom, such as imidazolyl group, pyridyl group, quinolyl group, furyl group, piperidyl group, morpholino group, benzoxazolyl group, benzimidazolyl group, benzthiazolyl group), silyl groups (silyl groups having preferably 3-40 carbon atoms, more preferably 3-30 carbon atoms, particularly preferably 3-24 carbon atoms, such as trimethylsilyl group, triphenylsilyl group). These substituents may have been further substituted by these substituents. When 2 or more substituents are included, they may be same with or different from each other. Further, when possible, they may bond with each other to form a ring.

R$^1$, R$^2$ and R$^3$ each independently is preferably a hydrogen atom, an alkyl group, a halogen atom (such as fluorine atom, chlorine atom, bromine atom, iodine atom) or a group represented by an after-mentioned -L-Q, more preferably a hydrogen atom, an alkyl group having 1-6 carbon atoms, a chlorine atom or a group represented by the after-mentioned -L-Q, particularly preferably a hydrogen atom or an alkyl group having 1-4 carbon atoms, and most preferably a hydrogen atom or an alkyl group having 1-2 carbon atoms. Specific examples of the alkyl group include a methyl group, an ethyl group, a n-propyl group, a n-butyl group, and a sec-butyl group. The alkyl group may have an appropriate substituent. Examples of the substituent include a halogen atom, an aryl group, a heterocyclic group, an alkoxy group, an aryloxy group, an alkylthio group, an arylthio group, an acyl group, a hydroxyl group, an acyloxy group, an amino group, an alkoxycarbonyl group, an acylamino group, an oxycarbonyl group, a carbamoyl group, a sulfonyl group, a sulfamoyl group, a sulfonamide group, a sulfolyl group and a carboxyl group. In this connection, the carbon number of the alkyl group does not include the carbon number of a substituent. Hereinafter, the same applies to the carbon number for other groups.

L represents a divalent linking group selected from the above-described group of linking groups or a divalent linking group formed by combining two or more of these. In the group of linking groups, $R^4$ in —$NR^4$— represents a hydrogen atom, an alkyl group, an aryl group or an aralkyl group, and is preferably a hydrogen atom or an alkyl group. $R^5$ in —$PO(OR^5)$— represents an alkyl group, an aryl group or an aralkyl group, and is preferably an alkyl group. When $R^4$ and $R^5$ each represents an alkyl group, an aryl group or an aralkyl group, the preferable range of the number of carbon atoms is the same as that described in "Group Y of Substituent Groups." L includes preferably a single bond, —O—, —CO—, —$NR^4$—, —S—, —$SO_2$—, an alkylene group or an arylene group, more preferably —CO—, —O—, —$NR^4$—, an alkylene group or an arylene group. When L includes an alkylene group, the number of carbon atoms of the alkylene group is preferably 1-10, more preferably 1-8, particularly preferably 1-6. Specific example of the particularly preferable alkylene group include methylene, ethylene, trimethylene, tetrabutylene and hexamethylene groups. When L includes an arylene group, the number of carbon atoms of the arylene group is preferably 6-24, more preferably 6-18, particularly preferably 6-12. Specific examples of the particularly preferable arylene group include phenylene and naphthalene groups. When L includes a divalent linking group obtained by combining an alkylene group and an arylene group (i.e., aralkylene group), the number of carbon atoms of the aralkylene group is preferably 7-34, more preferably 7-26, particularly preferably 7-16. Specific examples of the particularly preferable aralkylene group include a phenylenemethylene group, a phenyleneethylene group, and a methylene phenylene group. Groups mentioned as L may have an appropriate substituent. As the substituent, substituents similar to ones mentioned before as the substituent in $R^1$-$R^3$ can be mentioned.

Specific structures of L are exemplified below, but the invention is not restricted to these specific examples.

—— (single bond)    L-1

—COO—(CH$_2$)$_2$—    L-2

—COO—(CH$_2$)$_3$—    L-3

—COO—(CH$_2$)$_5$—    L-4

—COO—(CH$_2$)$_8$—    L-5

—COO—(CH$_2$)$_{11}$—    L-6

—COO—(CH$_2$)$_3$—CH(CH$_3$)CH$_2$—    L-7

—CONH—(CH$_2$)$_3$—    L-8

—CONH—(CH$_2$)$_5$—    L-9

—CON(CH$_3$)—(CH$_2$)$_8$—    L-10

—CONH—(CH$_2$)$_{11}$—    L-11

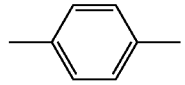 L-12

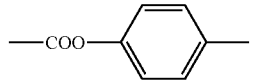 L-13

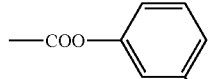 L-14

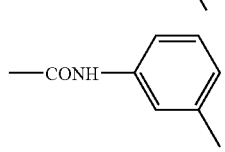 L-15

—COOCH$_2$CH$_2$OCH$_2$—    L-16

—COO—(CH$_2$CH$_2$O)$_2$—CH$_2$—    L-17

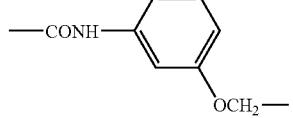 L-18

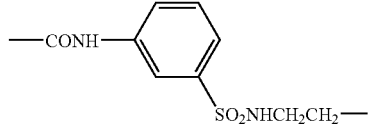 L-19

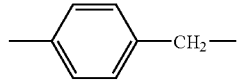 L-20

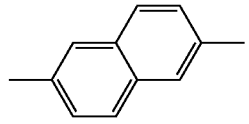 L-21

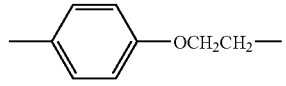 L-22

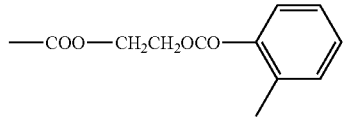 L-23

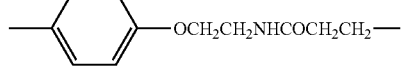 L-24

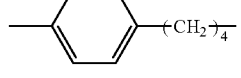 L-25

—(CH$_2$)$_5$—    L-26

—O—(CH$_2$)$_4$—O—CH$_2$—    L-27 wherein Q represents a carboxyl group, a salt of carboxyl group (such as lithium salt, sodium salt, potassium salt, ammonium salt (such as ammonium, tetramethylammonium, trimethyl-2-hydroxyethylammonium, tetrabutylammonium, trimethylbenzylammonium, dimethylphenylammonium), pyridinium salt), a sulfo group, a salt of sulfo group (examples of cations for forming the salt are the same as ones described for a carboxyl group), a phosphonoxy group, a salt of phosphonoxy group (examples of cations for forming the salt are the same as ones described for a carboxyl group) It is more preferably a carboxyl group, a sulfo group or a phospho group, particularly preferably a carboxyl group or a sulfo group.

The fluorine-containing polymer may include the repeating unit represented by the formula (1) in 1 type or 2 or more types. Further, the fluorine-containing polymer may include repeating units other than the above-described repeating unit in 1 type or 2 types or more. The above-described other repeating units are not particularly restricted, and repeating units derived from monomers capable of ordinary radical polymerization reaction can be mentioned as preferable examples. Specific examples of the monomer that derive other repeating units are listed below. The fluorine-containing polymer may include a repeating unit derived from 1 type or 2 types or more of monomers selected from the following group of monomers.

Group of Monomers (1) Alkenes ethylene, propylene, 1-butene, isobutene, 1-hexene, 1-dodecene, 1-octadecene, 1-eicosene, hexafluoropropene, vinylidene fluoride, chlorotrifluoroethylene, 3,3,3-trifluoropropylene, tetrafluoroethylene, vinyl chloride, vinylidene chloride;

(2) Dienes 1,3-butadiene, isoprene, 1,3-pentadiene, 2-ethyl-1,3-butadiene, 2-n-propyl-1,3-butadiene, 2,3-dimethyl-1,3-butadiene, 2-methyl-1,3-pentadiene, 1-phenyl-1,3-butadiene, 1-α-naphthyl-1,3-butadiene, 1-β-naphthyl-1,3-butadiene, 2-chloro-1,3-butadiene, 1-bromo-1,3-butadiene, 1-chlorobutadiene, 2-fluoro-1,3-butadiene, 2,3-dichloro-1,3-butadiene, 1,1,2-trichloro-1,3-butadiene, 2-cyano-1,3-butadiene, 1,4-divinylcyclohexane;

(3) Derivatives of α,β-unsaturated Carboxylic Acids (3a) Alkyl Acrylates methyl acrylate, ethyl acrylate, n-propyl acrylate, isopropyl acrylate, n-butyl acrylate, isobutyl acrylate, sec-butyl acrylate, tert-butyl acrylate, amyl acrylate, n-hexyl acrylate, cyclohexyl acrylate, 2-ethylhexyl acrylate, n-octyl acrylate, tert-octyl acrylate, dodecyl acrylate, phenyl acrylate, benzyl acrylate, 2-chloroethyl acrylate, 2-bromoethyl acrylate, 4-chlorobutyl acrylate, 2-cyanoethyl acrylate, 2-acetoxyethyl acrylate, methoxybenzyl acrylate, 2-chlorocyclohexyl acrylate, furfuryl acrylate, tetrahydrofurfuryl acrylate, 2-methoxyethyl acrylate, ω-methoxypolyethylene glycol acrylate (addition mole number of polyoxyethylene: n=2-100), 3-methoxybutyl acrylate, 2-ethoxyethyl acrylate, 2-butoxyethyl acrylate, 2-(2-butoxyethoxy)ethyl acrylate, 1-bromo-2-methoxyethyl acrylate, 1,1-dichloro-2-ethoxyethyl acrylate, glycidyl acrylate;

(3b) Alkyl Methacrylates methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, n-hexyl methacrylate, cyclohexyl methacrylate, 2-ethylhexyl methacrylate, n-octyl methacrylate, stearyl methacrylate, benzyl methacrylate, phenyl methacrylate, allyl methacrylate, furfuryl methacrylate, tetrahydrofurfuryl methacrylate, cresyl methacrylate, naphthyl methacrylate, 2-methoxyethyl methacrylate, 3-methoxybutyl methacrylate, ω-methoxypolyethylene glycol methacrylate (addition mole number of polyoxyethylene: n=2-100), 2-acetoxyethyl methacrylate, 2-ethoxyethyl methacrylate, 2-butoxyethyl methacrylate, 2-(2-butoxyethoxy) ethyl methacrylate, glycidyl methacrylate, 3-trimethoxysilylpropyl methacrylate, allyl methacrylate, 2-isocyanatoethyl methacrylate;

(3c) Diesters of Unsaturated Polyvalent Carboxylic Acids dimethyl maleate, dibutyl maleate, dimethyl itaconate, dibutyl itaconate, dibutyl crotonate, dihexyl crotonate, diethyl fumarate, dimethyl fumarate;

(3d) Amides of α,β-Unsaturated Carboxylic Acids

N,N-dimethyl acrylamide, N,N-diethyl acrylamide, N-n-propyl acrylamide, N-tert-butyl acrylamide, N-tert-octyl methacrylamide, N-cyclohexylacrylamide, N-phenylacrylamide, N-(2-acetacetoxyethyl)acrylamide, N-benzylacrylamide, N-acryloylmorpholine, diacetone acrylamide, N-methylmaleimide;

(4) Unsaturated Nitriles acrylonitrile, methacrylonitrile;

(5) Styrene and Derivatives Thereof styrene, vinyltoluene, ethylstyrene, p-tert-butylstyrene, methyl p-vinylbenzoate, α-methylstyrene, p-chloromethylstyrene, vinylnaphthalene, p-methoxystyrene, p-hydroxymethylstyrene, p-acetoxystyrene;

(6) Vinyl Esters vinyl acetate, vinyl propionate, vinyl butyrate, vinyl isobutyrate, vinyl benzoate, vinyl salicylate, vinyl chloroacetate, vinyl methoxyacetate, vinyl phenylacetate;

(7) Vinyl Ethers methylvinyl ether, ethylvinyl ether, n-propylvinyl ether, isopropylvinyl ether, n-butylvinyl ether, isobutylvinyl ether, tert-butylvinyl ether, n-pentylvinyl ether, n-hexylvinyl ether, n-octylvinyl ether, n-dodecylvinyl ether, n-eicosylvinyl ether, 2-ethylhexylvinyl ether, cyclohexylvinyl ether, fluorobutylvinyl ether, fluorobutoxyethylvinyl ether;

(8) Other Polymerizable Monomers

N-vinylpyrrolidone, methylvinyl ketone, phenylvinyl ketone, methoxyethylvinyl ketone, 2-vinyl oxazoline, 2-isopropenyl oxazoline.

In the above-described fluorine-containing polymer, the amount of the fluoroaliphatic group-containing monomer is preferably 5% by mass or more, more preferably 10% by mass or more, further preferably 30% by mass or more, on the basis of the total amount of monomers constituting the polymer. In the fluorine-containing polymer, the amount of the repeating unit represented by the above-described formula (1) is preferably 0.5% by mass or more, more preferably 1-20% by mass, further preferably 1-10% by mass, on the basis of the total amount of monomers constituting the fluorine-containing polymer. The above-described mass percentage tends to vary in a preferable range depending on the molecular weight of monomer to be used, therefore, expression in molar number of functional groups per unit mass of the polymer can precisely define the content of the repeating unit represented by the formula (1). When this expression is used, the amount of the hydrophilic group (Q in the formula (1)) is preferably 0.1 mmol/g-10 mmol/g, more preferably 0.2 mmol/g-8 mmol/g.

The mass average molecular weight of the fluorine-containing polymer for use in the invention is preferably 1,000,000 or less, more preferably 500,000 or less, further preferably 100,000 or less, most preferably 2,000-50,000. The mass average molecular weight may be measured as a value in terms of polystyrene (PS) using gel permeation chromatography (GPC).

The method for producing the fluorine-containing polymer is not particularly restricted, and it can be produced by a publicly known conventional method. For example, it can be produced by adding an all-purpose radical polymerization initiator in an organic solvent including the above-mentioned monomer having a fluoroaliphatic group, monomer having a hydrogen-bondable group, and the like, and polymerizing the same. Occasionally, another addition-polymerizable unsaturated compound can be further added to produce the polymer according to the same method as described above. A drip polymerization method, in which polymerization is carried out while dripping a monomer and an initiator into a reaction vessel in accordance with the polymerization property of respective monomers, is also effective in order to obtain a polymer having homogeneous composition. Details of the production method of the fluorine-containing polymer are the same as those previously described for the fluoroaliphatic group-containing copolymer. As the fluorine-containing polymer, fluorine-containing polymers having a polymerizable group as a substituent are also preferable for the purpose of fixing the alignment state of molecules of a rod-shaped liquid crystal compound.

Specific examples of the fluorine-containing polymer preferably usable in the invention as an air interface vertical alignment agent are shown below, but the invention is not restricted by these specific examples in any way. Each of numerical values in formulae (numerical values such as a, b, c, d) is mass percentage representing the compositional ratio of respective monomers, and Mw is the mass average molecular weight in terms of PS measured by GPC.

P-1
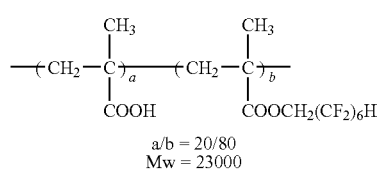

P-2
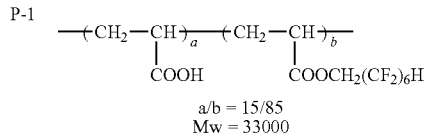

P-3
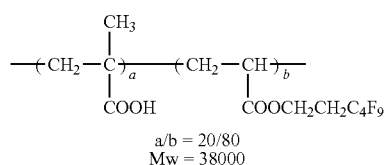

P-4
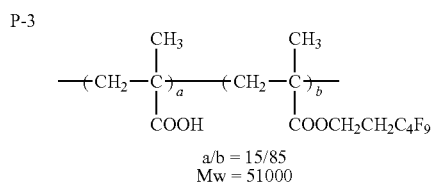

P-5
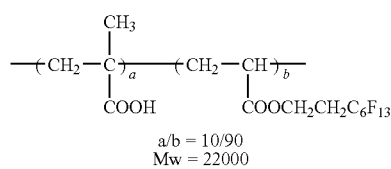

P-6
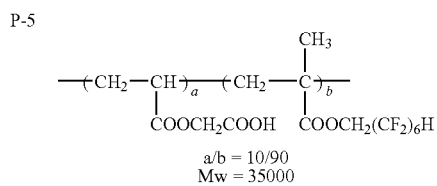

P-7
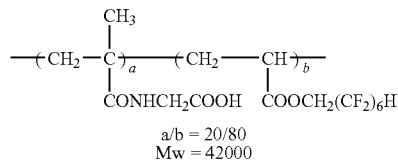

P-8
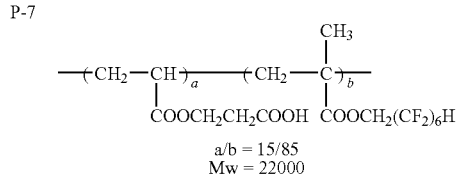

P-9
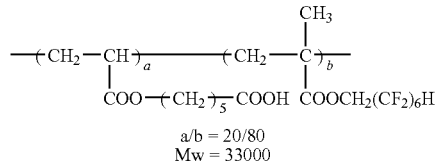

P-10
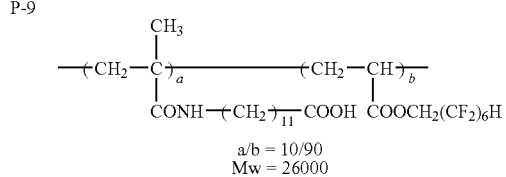

P-11
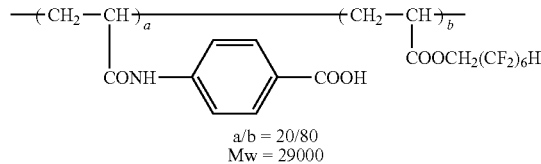

P-12
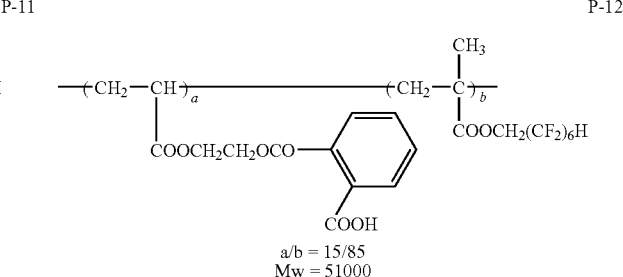

-continued

P-13

$\mathrm{+CH_2-C(CH_3)_a-CH_2-CH_b+}$
CON(CH$_2$COOH)(CH$_2$COOH) ; COOCH$_2$(CF$_2$)$_6$H a/b = 5/95
Mw = 21000

P-14

$\mathrm{+CH_2-C(CH_3)_a-CH_2-CH_b-CH_2-C(CH_3)_c+}$
COOCH$_2$CH$_2$OH ; COOH ; COOCH$_2$(CF$_2$)$_6$H a/b/c = 30/5/65
Mw = 31000

P-15

$\mathrm{+CH_2-C(CH_3)_a-CH_2-CH_b-CH_2-C(CH_3)_c+}$
COOCH$_2$CH$_2$OH ; COOH ; COOCH$_2$(CF$_2$)$_6$H a/b/c = 15/5/80
Mw = 19000

P-16

$\mathrm{+CH_2-C(CH_3)_a-CH_2-CH_b-CH_2-C(CH_3)_c+}$
COOCH$_2$CH$_2$OH ; COOH ; COOCH$_2$CH$_2$C$_4$F$_9$ a/b/c = 25/5/70
Mw = 15000

P-17

$\mathrm{+CH_2-C(CH_3)_a-CH_2-CH_b-CH_2-C(CH_3)_c-CH_2-C(CH_3)_d+}$
COOCH$_2$CH$_2$OH ; COOH ; COOCH$_2$(CF$_2$)$_6$H ; COOC$_{12}$H$_{25}^{(n)}$ a/b/c/d = 25/5/50/20
Mw = 42000

P-18

$\mathrm{+CH_2-C(CH_3)_a-CH_2-CH_b-CH_2-C(CH_3)_c-CH_2-CH_d+}$
COOCH$_2$CH$_2$OH ; COOH ; COOCH$_2$CH$_2$(CF$_2$)$_6$F ; COO(C$_3$H$_6$O)$_8$H a/b/c/d = 15/5/40/40
Mw = 14000

P-19

$\mathrm{+CH_2-CH_a-CH_2-CH_b-CH_2-CH_c+}$
COOH ; CO(C$_3$H$_6$O)$_8$H ; COOCH$_2$CH$_2$(CF$_2$)$_6$F a/b/c = 5/55/40
Mw = 15000

P-20

$\mathrm{+CH_2-C(CH_3)_a-CH_2-C(CH_3)_b+}$
COO(CH$_2$)$_4$SO$_3$Na ; COOCH$_2$(CF$_2$)$_6$H a/b = 35/65
Mw = 24000

P-21

$\mathrm{+CH_2-CH_a-CH_2-C(CH_3)_b-CH_2-CH_c-CH_2-CH_d+}$
COOCH$_2$CH$_2$(CF$_2$)$_4$F ; COOCH$_2$CH$_2$OH ; COOCH$_2$(CF$_2$)$_6$H ; COOH a/b/c/d = 10/9/1/80
Mw = 15000

P-22

$\mathrm{+CH_2-CH_a-CH_2-C(CH_3)_b-CH_2-CH_c+}$
COOH ; COOCH$_2$CH$_2$OH ; COOCH$_2$(CF$_2$)$_6$H a/b/c = 5/15/80
Mw = 14000

P-23

$\mathrm{+CH_2-C(CH_3)_a-CH_2-CH_b-CH_2-C(CH_3)_c+}$
COOCH$_2$CH$_2$OH ; COOCH$_2$CH$_2$-OP(=O)(OH)(OH) ; COOCH$_2$(CF$_2$)$_6$H a/b/c = 23/7/70
Mw = 46000

P-24

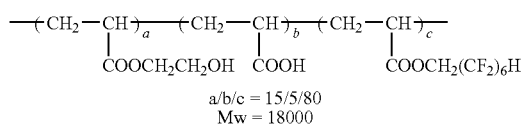

a/b/c = 15/5/80
Mw = 18000

P-25

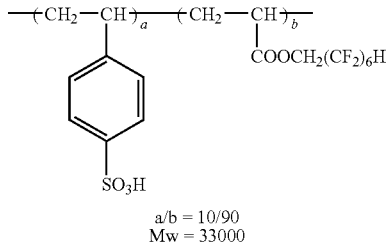

a/b = 10/90
Mw = 33000

P-26

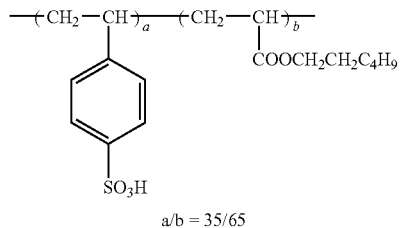

a/b = 35/65
Mw = 25000

The preferable range of the content of the fluorine-containing polymer in the liquid crystal composition varies in accordance with applications thereof. When it is used for forming an optically anisotropic layer, the content is preferably 0.005-8% by mass, more preferably 0.01-5% by mass, and further preferably 0.05-1% by mass in the composition (the composition excluding a solvent when a coating liquid is used). An addition amount of the fluorine-containing polymer less than 0.005% by mass exerts insufficient effects, and the amount more than 8% by mass may result in insufficient drying of a coated film or adversely affect the performance as an optical film (such as evenness of retardation).

Next, fluorine-containing compounds represented by formula (2) below will be described.

<<Fluorine-Containing Compounds Represented by Formula (2)>>

wherein $R^0$ represents an alkyl group, an alkyl group having a $CF_3$ group at the terminal, or an alkyl group having a $CF_2H$ group at the terminal, and m represents an integer of 1 or more. Plural $R^0$s may be same with or different from each other, and at least one of these represents an alkyl group having a $CF_3$ group or a $CF_2H$ group at the terminal.

$L^0$ represents a (m+n)-valent linking group, W represents a carboxyl group (—COOH) or its salt, a sulfo group (—SO$_3$H) or its salt, a sulphato group (—OSO$_3$H) or its salt, or a phosphonoxy group {—OP(=O)(OH)$_2$} or its salt, n represents an integer of 1 or more.

The alkyl group represented by $R^0$ in the formula (2) is a substituted or unsubstituted alkyl group, may be of a straight-chain or a branched chain, and is an alkyl group having preferably 1-20 carbon atoms, more preferably 4-16 carbon atoms, particularly preferably 6-16 carbon atoms. As the substituent, any of substituents exemplified as an after-mentioned group D of substituents can be applied.

The alkyl group having a $CF_3$ group at the terminal thereof represented by $R^0$ preferably has 1-20 carbon atoms, further preferably 4-16 carbon atoms, particularly preferably 4-8 carbon atoms. The alkyl group having a $CF_3$ group at the terminal thereof is an alkyl group in which a part or all of hydrogen atoms included in the alkyl group have been substituted by fluorine atoms. Among hydrogen atoms in the alkyl group, preferably 50% or more have been substituted, more preferably 60% or more have been substituted, particularly preferably 70% or more have been substituted by fluorine atoms. Residual hydrogen atoms may have been further substituted by a substituent exemplified as a group D of substituents below. The alkyl group having a $CF_2H$ group at the terminal thereof represented by $R^0$ preferably has 1-20 carbon atoms, further preferably 4-16 carbon atoms, particularly preferably 4-8 carbon atoms. The alkyl group having a $CF_2H$ group at the terminal thereof is an alkyl group in which a part or all of hydrogen atoms included in the alkyl group have been substituted by fluorine atoms. Among hydrogen atoms in the alkyl group, preferably 50% or more have been substituted, more preferably 60% or more have been substituted, particularly preferably 70% or more have been substituted by fluorine atoms. Residual hydrogen atoms may have been further substituted by a substituent exemplified as a group D of substituents below. Examples of the alkyl group having a $CF_3$ group at the terminal thereof, or having a $CF_2H$ group at the terminal thereof represented by $R^0$ are shown below.

R1: n-C$_8$F$_{17}$—
R2: n-C$_6$F$_{13}$—
R3: n-C$_4$F$_9$—
R4: n-C$_8$F$_{17}$—(CH$_2$)$_2$—
R5: n-C$_6$F$_{13}$—(CH$_2$)$_2$—
R6: n-C$_4$F$_9$—(CH$_2$)$_2$—
R7: H—(CF$_2$)$_8$—
R8: H—(CF$_2$)$_6$—
R9: H—(CF$_2$)$_4$—
R10: H—(CF$_2$)$_8$—(CH$_2$)—
R11: H—(CF$_2$)$_6$—(CH$_2$)—
R12: H—(CF$_2$)$_4$—(CH$_2$)—

In the formula (2), a (m+n)-valent linking group represented by $L^0$ is preferably a linking group formed by combining at least 2 types of groups selected from alkylene groups, alkenylene groups, aromatic groups, heterocyclic groups, —CO—, —NR— (R is an alkyl group having 1-5 carbon atoms or a hydrogen atom), —O—, —S—, —SO— and SO$_2$—.

In the formula (2), W represents a carboxyl group (—COOH) or its salt, a sulfo group (—SO$_3$H) or its salt, a sulphato group (—OSO$_3$H) or its salt, or a phosphonoxy group {—OP(=O)(OH)$_2$} or its salt. The preferable range of W is the same as that of Q in the formula (1).

Among the fluorine-containing compound represented by the above-described formula (2), compounds represented by the following formula (2a) or an after-mentioned formula (2b) are preferable.

Formula (2a):

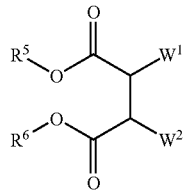

whereon, $R^5$ and $R^6$ each independently represents an alkyl group, an alkyl group having a CF$_3$ group at the terminal thereof, or an alkyl group having a CF$_2$H group at the terminal thereof, wherein $R^5$ and $R^6$ are not alkyl groups at the same time. $W^1$ and $W^2$ each independently represents a hydrogen atom, a carboxyl group (—COOH) or its salt, a sulfo group (—SO$_3$H) or its salt, a sulphato group (—OSO$_3$H) or its salt, a phosphonoxy group {—OP(=O)(OH)$_2$} or its salt, or an alkyl group, alkoxy group or alkylamino group having a carboxyl group, sulfo group, sulphato group or phosphonoxy group as a substituent, wherein $W^1$ and $W^2$ are not hydrogen atoms at the same time.

$R^5$ and $R^6$ have the same meaning and also the preferable range as $R^o$ in the above-described formula (2) The carboxyl group (—COOH) or its salt, sulfo group (—SO$_3$H) or its salt, sulphato group (—OSO$_3$H) or its salt, and phosphonoxy group {—OP(=O)(OH)$_2$} or its salt represented by $W^1$ and $W^2$ have the same meaning and the preferable range as those for W in the formula (2). Alkyl groups having a carboxyl group, a sulfo group, a sulphato group or a phosphonoxy group as a substituent, which are represented by $W^1$ and $W^2$, may be in straight-chain or branched chain, and are alkyl groups having preferably 1-20 carbon atoms, further preferably 1-8 carbon atoms, particularly preferably 1-3 carbon atoms. The alkyl group having a carboxyl group, a sulfo group, a sulphato group or a phosphonoxy group as a substituent is only required to have at least one carboxyl group, sulfo group, sulphato group or phosphonoxy group, wherein the carboxyl group, sulfo group, sulphato group and phosphonoxy group have the same meaning and also the same preferable range as the carboxyl group, sulfo group, sulphato group and phosphonoxy group represented by W in the above-described formula (2). The alkyl group having a carboxyl group, a sulfo group, a sulphato group or a phosphonoxy group as a substituent may have been substituted by another substituent, wherein any of substituents exemplified as the after-mentioned group D of substituents may be applied as the substituent. Alkoxy groups having a carboxyl group, a sulfo group, a sulphato group or a phosphonoxy group as a substituent, which are represented by $W^1$ and $W^2$, may be in a straight-chain or in a branched chain, and are alkoxy groups having preferably 1-20 carbon atoms, more preferably 1-8 carbon atoms, particularly preferably 1-4 carbon atoms. The alkoxy group having a carboxyl group, a sulfo group, a sulphato group or a phosphonoxy group as a substituent is only required to have at least one carboxyl group, sulfo group, sulphato group or phosphonoxy group, wherein the meaning and the preferable range of the carboxyl group, sulfo group, sulphato group and phosphonoxy group are the same as the carboxyl group, sulfo group, sulphato group and phosphonoxy group represented by W in the above-described formula (2). The alkoxy group having a carboxyl group, a sulfo group, a sulphato group or a phosphonoxy group may have been substituted by another substituent, wherein any of substituents exemplified as the after-mentioned group D of substituents can be applied. Alkylamino groups having a carboxyl group, a sulfo group, a sulphato group or a phosphonoxy group as a substituent, which are represented by $W^1$ and $W^2$, may be in a straight-chain or in a branched chain, and are alkylamino groups having preferably 1-20 carbon atoms, more preferably 1-8 carbon atoms, particularly preferably 1-4 carbon atoms. The alkylamino group having a carboxyl group, a sulfo group, a sulphato group or a phosphonoxy group is only required to have at least one carboxyl group, sulfo group, sulphato group or phosphonoxy group, wherein the meaning and the preferable range of the carboxyl group, sulfo group, sulphato group and phosphonoxy group are the same as the carboxyl group, sulfo group, sulphato group and phosphonoxy group represented by W in the formula (2). The alkylamino group having a carboxyl group, a sulfo group, a sulphato group or a phosphonoxy group may have been substituted by another substituent, wherein any of substituents exemplified as the after-mentioned group D of substituents can be applied as the substituent.

$W^1$ and $W^2$ each particularly preferably is a hydrogen atom or (CH$_2$)$_n$SO$_3$M (n represents 0 or 1). M represents a cation, wherein, when charge becomes 0 in the molecule, M may be omitted. Examples of the preferably applicable cation represented by M include protonium ion, alkali metal ions (such as lithium ion, sodium ion, potassium ion), alkali earth metal ions (such as barium ion, calcium ion) and ammonium ion. Among these, protonium ion, lithium ion, sodium ion, potassium ion and ammonium ion are particularly preferable.

Next the following formula (2b) will be described.

$(R^7-L^1-)_{m2}(Ar^1)—W^3$  Formula (2b):

wherein $R^7$ represents an alkyl group, an alkyl group having a CF$_3$ group at the terminal, or an alkyl group having a CF$_2$H group at the terminal, m2 represents an integer of 1 or more, wherein plural $R^7$s may be the same with or different from each other, but at least one of them represents an alkyl group having a CF$_3$ group or a CF$_2$H group at the terminal. $L^1$ represents a divalent linking group selected from the group consisting of an alkylene group, an aromatic group, —CO—, —NR— (R is an alkyl group having 1-5 carbon atoms or a hydrogen atom), —O—, —S—, —SO—, —SO$_2$— and combinations thereof, wherein plural $L^1$ may be the same with or different from each other. $Ar^1$ represents an aromatic hydrocarbon ring or an aromatic heterocycle, $W^3$ represents a carboxyl group (—COOH) or its salt, a sulfo group (—SO$_3$H) or its salt, a sulphato group (—OSO$_3$H) or its salt, a phosphonoxy group {—OP(=O)(OH)$_2$} or its salt, or analkyl group, alkoxy group or alkylamino group having a carboxyl group, sulfo group, sulphato group or phosphonoxy group as a substituent.

The aromatic hydrocarbon ring represented by $Ar^1$ is preferably an aromatic hydrocarbon ring having 6-12 carbon atoms, wherein, for example, a benzene ring or a naphthalene ring is preferable. The aromatic heterocycle represented by $Ar^1$ is preferably an aromatic heterocycle including at least one type of a nitrogen atom, an oxygen atom and a sulfur atom, and a carbon atom as ring-constituting atoms, wherein, for example, a pyridine ring, a thiophene ring, a furan ring, or a pyrimidine ring is preferable. $Ar^1$ is preferably an aromatic hydrocarbon ring, and, among them, more preferably a benzene ring or a naphthalene ring, further preferably a benzene ring.

$R^7$ has the same meaning and also the same preferable range as $R^0$ in the above-described formula (2). $L^1$ represents preferably a linking group having the total 0-40 carbon atoms composed of an alkylene group having 1-12 carbon atoms, an aromatic group having 6-12 carbon atoms, —CO—, —NR—, —O—, —S—, —SO—, —SO$_2$— and combinations of these, and particularly preferably an linking group having the total 0-20 carbon atoms composed of an alkylene group having 1-8 carbon atoms, a phenyl group, —CO—, —NR—, —O—, —S—, —SO$_2$— and combinations of these. The carboxyl group (—COOH) or its salt, sulfo group (—SO$_3$H) or its salt, sulphato group (—OSO$_3$H) or its salt or phosphonoxy group {—OP(=O)(OH)$_2$} or its salt, or the alkyl group, alkoxy group or alkylamino group having a carboxyl group, sulfo group, sulphato group or phosphonoxy group as a substituent represented by $W^3$ has the same meaning and also the same preferable range as the carboxyl group (—COOH) or its salt, sulfo group (—SO$_3$H) or its salt, sulphato group (—OSO$_3$H) or its salt or phosphonoxy group {—OP(=O)(OH)$_2$} or its salt, or the alkyl group, alkoxy group or alkylamino group having a carboxyl group, sulfo group, sulphato group or phosphonoxy group as a substituent represented by $W^1$ and $W^2$ in the above-described formula (2a).

$W^3$ is preferably a carboxyl group (—COOH) or its salt or a sulfo group (—SO$_3$H) or its salt, or an alkylamino group having a carboxyl group (—COOH) or its salt or sulfo group (—SO$_3$H) or its salt as a substituent, particularly preferably SO$_3$M or CO$_2$M. M represents a cation, wherein, when charge becomes 0 in the molecule, M may be omitted. Examples of the preferably applicable cation represented by M include protonium ion, alkali metal ions (such as lithium ion, sodium ion, potassium ion), alkali earth metal ions (such as barium ion, calcium ion) and ammonium ion. Among these, protonium ion, lithium ion, sodium ion, potassium ion and ammonium ion are particularly preferable.

The group D of substituents herein includes alkyl groups (alkyl groups having preferably 1-20 carbon atoms, more preferably 1-12 carbon atoms, particularly preferably 1-8 carbon atoms, such as methyl group, ethyl group, isopropyl group, tert-butyl group, n-octyl group, n-decyl group, n-hexadecyl group, cyclopropyl group, cyclopentyl group, cyclohexyl group), alkenyl groups (alkenyl groups having preferably 2-20 carbon atoms, more preferably 2-12 carbon atoms, particularly preferably 2-8 carbon atoms, such as vinyl group, aryl group, 2-butenyl group, 3-pentenyl group), alkynyl groups (alkynyl groups having preferably 2-20 carbon atoms, more preferably 2-12 carbon atoms, particularly preferably 2-8 carbon atoms, such as propargyl group, 3-pentynyl group), aryl groups (aryl groups having preferably 6-30 carbon atoms, more preferably 6-20 carbon atoms, particularly preferably 6-12 carbon atoms, such as phenyl group, p-methylphenyl group, naphthyl group), substituted or unsubstituted amino groups (amino groups having preferably 0-20 carbon atoms, more preferably 0-10 carbon atoms, particularly preferably 0-6 carbon atoms, such as unsubstituted amino group, methylamino group, dimethylamino group, diethylamino group, dibenzylamino group), alkoxy groups (alkoxy groups having preferably 1-20 carbon atoms, more preferably 1-12 carbon atoms, particularly preferably 1-8 carbon atoms, such as methoxy group, ethoxy group, butoxy group), aryloxy groups (aryloxy groups having preferably 6-20 carbon atoms, more preferably 6-16 carbon atoms, particularly preferably 6-12 carbon atoms, such as phenyloxy group, 2-naphthyloxy group), acyl groups (acyl groups having preferably 1-20 carbon atoms, more preferably 1-16 carbon atoms, particularly preferably 1-12 carbon atoms, such as acetyl group, benzoyl group, formyl group, pivaloyl group), alkoxycarbonyl groups (alkoxycarbonyl groups having preferably 2-20 carbon atoms, more preferably 2-16 carbon atoms, particularly preferably 2-12 carbon atoms, such as methoxycarbonyl group, ethoxycarbonyl group), aryloxycarbonyl groups (aryloxycarbonyl groups having preferably 7-20 carbon atoms, more preferably 7-16 carbon atoms, particularly preferably 7-10 carbon atoms, such as phenyloxycarbonyl group), acyloxy groups (acyloxy groups having preferably 2-20 carbon atoms, more preferably 2-16 carbon atoms, and particularly preferably 2-10 carbon atoms, such as acetoxy group, benzoyloxy group), acylamino groups (acylamino groups having preferably 2-20 carbon atoms, more preferably 2-16 carbon atoms, particularly preferably 2-10 carbon atoms, such as acetylamino group, benzoylamino group); alkoxycarbonylamino groups (alkoxycarbonylamino groups having preferably 2-20 carbon atoms, more preferably 2-16 carbon atoms, particularly preferably 2-12 carbon atoms, such as methoxycarbonylamino group); aryloxycarbonylamino groups (aryloxycarbonylamino groups having preferably 7-20 carbon atoms, more preferably 7-16 carbon atoms, particularly preferably 7-12 carbon atoms, such as phenyloxycarbonylamino group); sulfonylamino groups (sulfonylamino groups having preferably 1-20 carbon atoms, more preferably 1-16 carbon atoms, particularly preferably 1-12 carbon atoms, such as methanesulfonylamino group, benzenesulfonylamino group); sulfamoyl groups (sulfamoyl groups having preferably 0-20 carbon atoms, more preferably 0-16 carbon atoms, particularly preferably 0-12 carbon atoms, such as sulfamoyl group, methylsulfamoyl group, dimethylsulfamoyl group, phenylsulfamoyl group); carbamoyl groups (carbamoyl groups having preferably 1-20 carbon atoms, more preferably 1-16 carbon atoms, particularly preferably 1-12 carbon atoms, such as unsubstituted carbamoyl group, methylcarbamoyl group, diethylcarbamoyl group, phenylcarbamoyl group); alkylthio groups (alkylthio groups having preferably 1-20 carbon atoms, more preferably 1-16 carbon atoms, particularly preferably 1-12 carbon atoms, such as methylthio group, ethylthio group), arylthio groups (arylthio groups having preferably 6-20 carbon atoms, more preferably 6-16 carbon atoms, particularly preferably 6-12 carbon atoms, such as phenylthio group), sulfonyl groups (sulfonyl groups having preferably 1-20 carbon atoms, more preferably 1-16 carbon atoms, particularly preferably 1-12 carbon atoms, such as mesyl group, tosyl group), sulfinyl groups (sulfinyl groups having preferably 1-20 carbon atoms, more preferably 1-16 carbon atoms, particularly preferably 1-12 carbon atoms, such as methanesulfinyl group, benzenesulfinyl group), ureide groups (ureide groups having preferably 1-20 carbon atoms, more preferably 1-16 carbon atoms, particularly preferably 1-12 carbon atoms, such as unsaturated ureide group, methylureide group, phenylureide group), phosphoric acid amide groups (phosphoric acid amide groups having preferably 1-20 carbon atoms, more preferably 1-16 carbon atoms, particularly preferably 1-12 carbon atoms, such as diethylphosphoric acid amide group, phenylphosphoric acid amide group), a hydroxyl group, a mercapto group, halogen atoms (such as fluorine atom, chlorine atom, bromine atom, iodine atom), a cyano group, a sulfo group, a carboxyl group, a nitro group, a hydroxamic acid group, a sulfino group, a hydrazino group, an imino group, heterocyclic groups (heterocyclic groups having preferably 1-30 carbon atoms, more preferably 1-12 carbon atoms, for example, heterocyclic groups having a hetero atom such as a nitrogen atom, an oxygen atom or a sulfur atom; such as imidazolyl group, pyridyl group, quinolyl group, furyl group, piperidyl group, morpholino group, benzoxazolyl group, benzimidazolyl group, benzthiazolyl group), silyl groups (silyl groups having preferably 3-40 carbon atoms, more preferably 3-30 carbon atoms, particularly preferably 3-24 carbon atoms, such as trimethylsilyl group, triphenylsilyl group). These substituents may have been further substituted by these substituents. When 2 or more substituents are included, they may be the same with or different from each other. Further, they may link with each other to form a ring when it is possible.

As the above-described fluorine-containing compound, one having a polymerizable group as a substituent is also preferable in order to fix the alignment state of molecules of a rod-shaped liquid crystal compound.

Specific examples of the fluorine-containing compound represented by the above-described formula (2) usable in the invention are shown below, however, fluorine-containing compounds for use in the invention are not restricted to these. In the following specific examples, Nos. 1-1-1-38 and Nos. 1-39-1-62 are examples of compounds represented by the formula (2a) and the formula (2b), respectively.

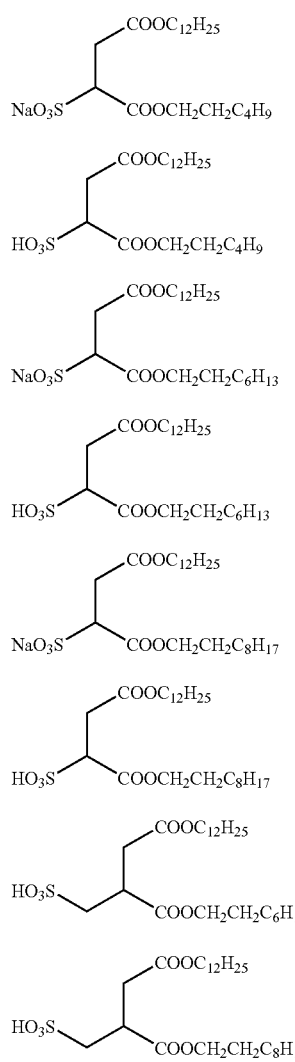

-continued

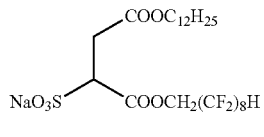
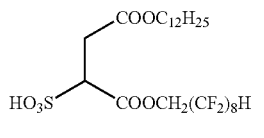
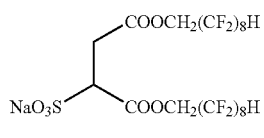
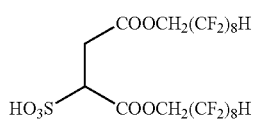
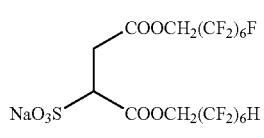
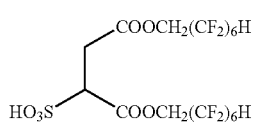
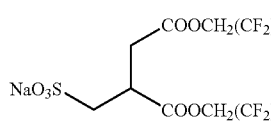
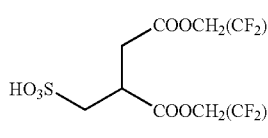
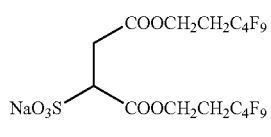
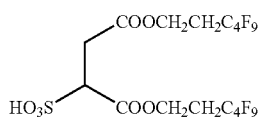
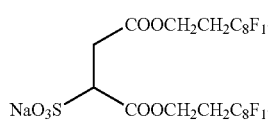
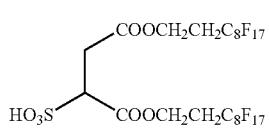
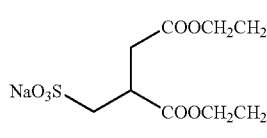

-continued
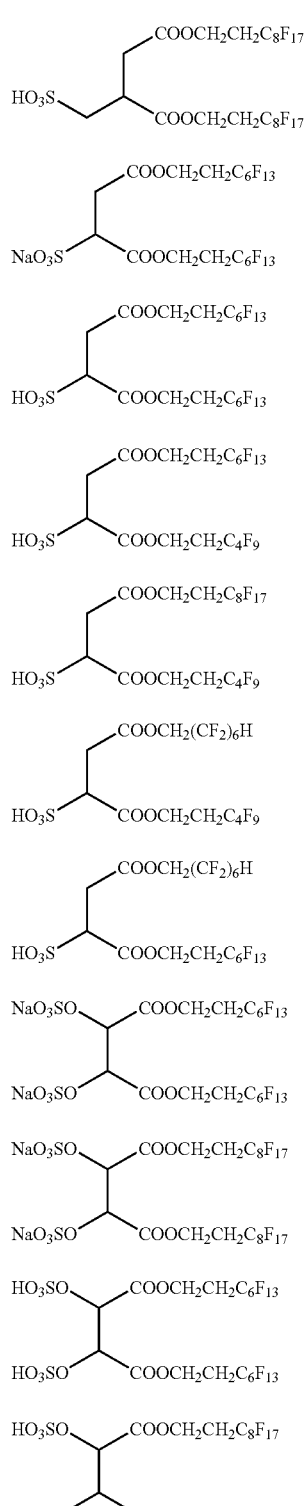
I-22
I-23
I-24
I-25
I-26
I-27
I-28
I-29
I-30
I-31
I-32
I-33
-continued
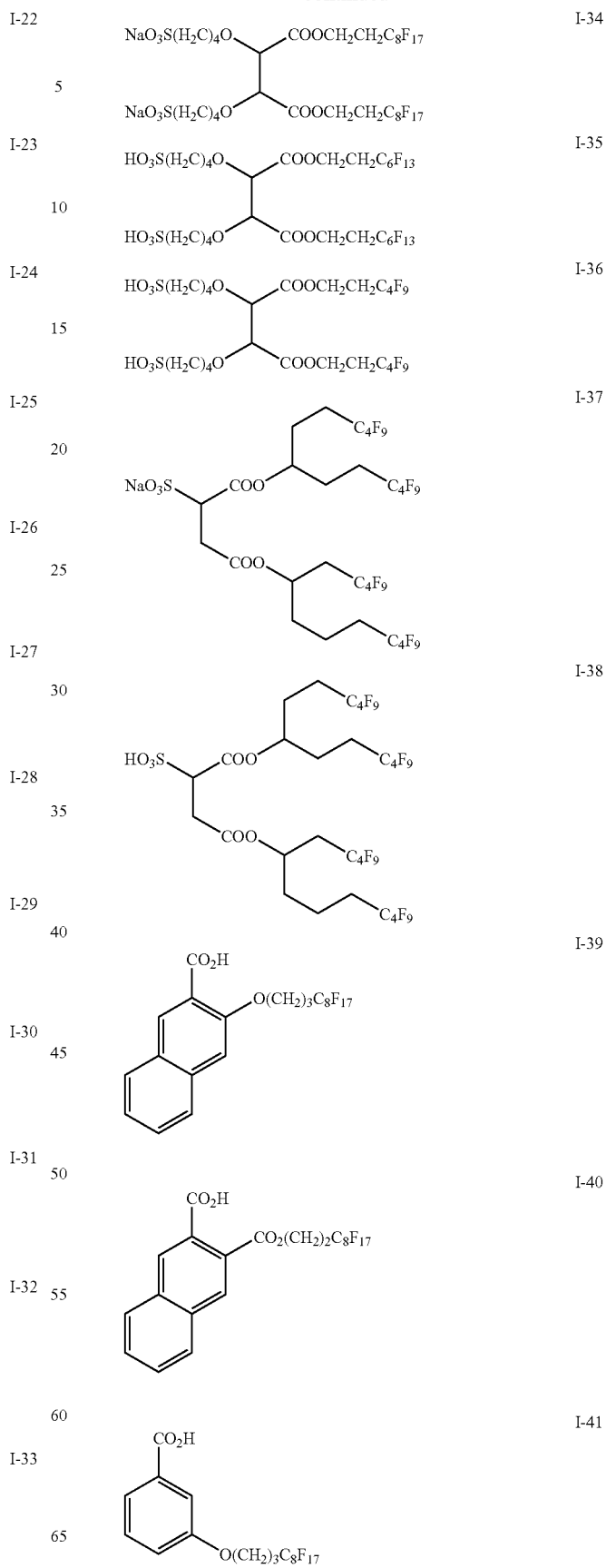
I-34
I-35
I-36
I-37
I-38
I-39
I-40
I-41

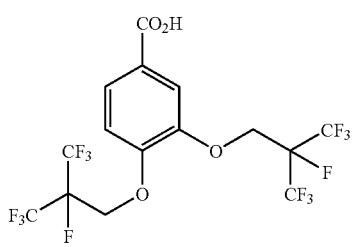
I-42
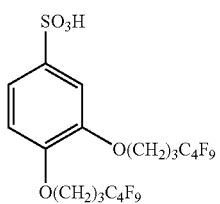
I-43
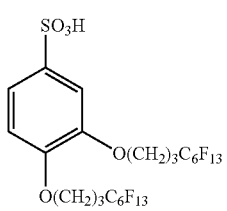
I-44
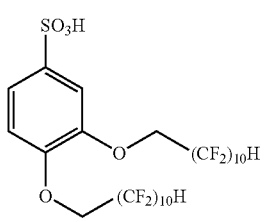
I-45
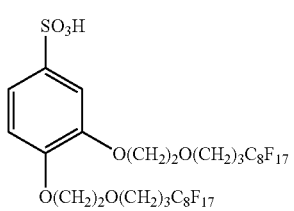
I-46
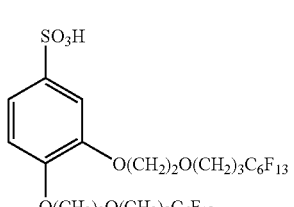
I-47
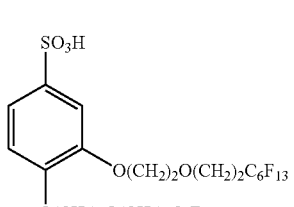
I-48
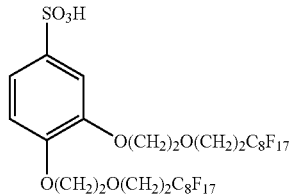
I-49
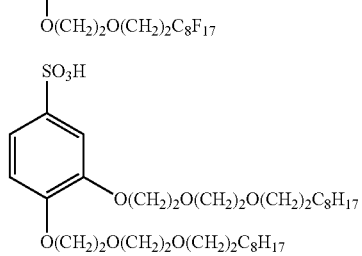
I-50
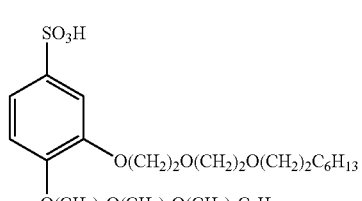
I-51
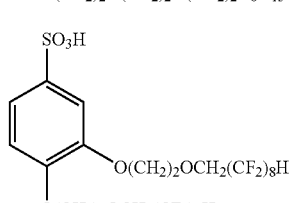
I-52
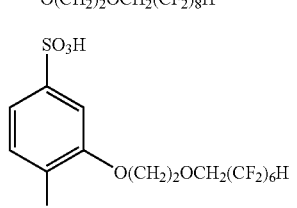
I-53
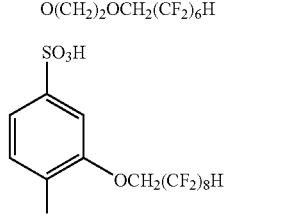
I-54
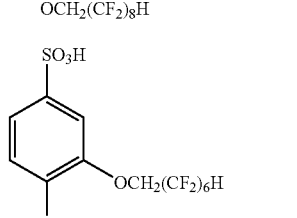
I-55
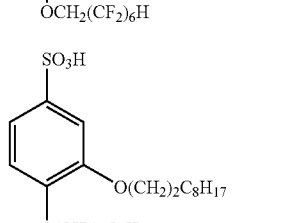
I-56

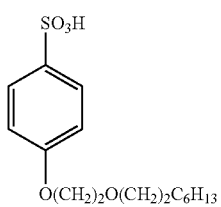

I-57

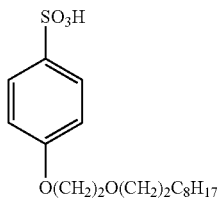

I-58

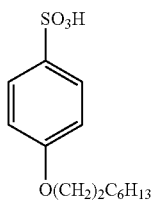

I-59

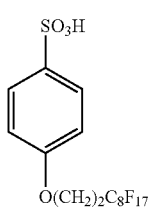

I-60

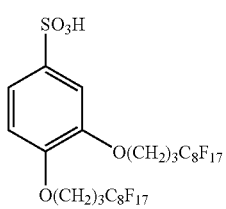

I-61

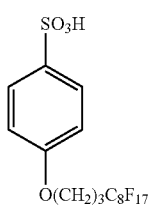

I-62

The preferable range of the content of the fluorine-containing compound in the liquid crystal composition varies in accordance with applications thereof. When it is used for forming an optically anisotropic layer, the content is preferably 0.005-8% by mass, more preferably 0.01-5% by mass, further preferably 0.05-1% by mass in the composition (the composition excluding a solvent when a coating liquid is used).

<<Other Materials in the Composition>>

The above-described liquid crystal composition includes a liquid crystal compound (preferably a rod-shaped liquid crystal compound), the above-described fluoroaliphatic group-containing copolymer, and can additionally include the aforementioned onium salt and air interface vertical alignment agent. Along with the above-described ingredients, it may include a polymerization initiator, a plasticizer, a surfactant, and a polymerizable monomer. These materials are added for various purposes such as fixation of alignment, and improvement of the evenness of a coated film, strength of a film and alignment of the liquid crystal compound. These materials preferably have compatibility with a rod-shaped liquid crystal compound used in combination and does not disturb the alignment.

As a polymerization initiator, either a thermal polymerization initiator or a photo polymerization initiator may be used. A photo polymerization initiator is preferable. Examples of the photo polymerization initiator include α-carbonyl compounds (described in U.S. Pat. Nos. 2,367,661, 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127, 2,951,758), a combination of triarylimidazole dimmer and p-aminophenyl ketone (described in U.S. Pat. No. 3,549,367), acridine and phenazine compounds (described in JP-A-60-105667, U.S. Pat. No. 4,239,850), and oxadiazole compounds (described in U.S. Pat. No. 4,212,970).

The use amount of the photo polymerization initiator is preferably 0.01-20% by mass, more preferably 0.5-5% by mass of the solid content of a coating liquid.

As the polymerizable monomer, radical-polymerizable or cation-polymerizable compounds can be mentioned. It is preferably a polyfunctional radical-polymerizable monomer, wherein it is preferably copolymerizable with the above-described liquid crystal compound including a polymerizable group. Examples of these include those described in JP-A-2002-296423, paragraphs [0018]-[0020]. The addition amount of the above-described compound is generally in the range of 1-50% by mass, preferably in the range of 5-30% by mass relative to the liquid crystal compound.

The polymer used with a liquid crystal compound can preferably increase viscosity of a coating liquid. As an example of the polymer, cellulose acetate ester can be mentioned. Preferable examples of the cellulose ester include those described in JP-A-2000-155216, paragraph [0178]. So as not to disturb the alignment of a liquid crystal compound, the addition amount of the polymer is preferably in the range of 0.1-10% by mass, more preferably in the range of 0.1-8% by mass relative to the liquid crystalline molecule.

<<Method for Manufacturing Optically Anisotropic Layer>>

The above-described optically anisotropic layer can be formed by preparing the above-described liquid crystal composition as a coating liquid, applying the coating liquid on the surface of a support or the like, vertically aligning, preferably, molecules of the rod-shaped liquid crystal compound, and fixing the alignment state. When an optically anisotropic layer is formed on a temporary support, the formed optically anisotropic layer is transferred onto a support. Further, by laminating plural optically anisotropic layers, not only forming a single optically anisotropic layer, it is also possible to constitute an after-mentioned second retardation region showing preferable optical properties. Or, a second retardation region may be manufactured by allowing the whole laminate of a support and the optically anisotropic layer to satisfy after-mentioned preferable optical properties.

As a solvent for use in preparation of the coating liquid, an organic solvent is preferably used. Examples of the organic solvent include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methylethyl ketone), and ethers (e.g., tetrahydrofuran, 1,2- dimethoxyethane). Alkyl halides and ketones are preferable. Two types or more of organic solvents may be used in combination.

Coating of the coating liquid can be practiced by a publicly known method (e.g., extrusion coating method, direct gravure coating method, reverse gravure coating method, die coating method).

After vertically aligning molecules of the rod-shaped liquid crystal compound, the molecules are preferably fixed in the aligned sate. The fixation is preferably practiced by polymerization of the rod-shaped liquid crystal compound when the rod-shaped liquid crystal compound has a polymerizable group and/or polymerization of a polymerizable monomer when a polymerizable monomer is added separately. In the polymerization reaction practiced for the fixation, the utilization of photo polymerization reaction using an photo polymerization initiator is preferable. In the light irradiation for polymerizing the rod-shaped liquid crystalline molecule, the use of ultraviolet rays is preferable. The irradiation energy is preferably 20 mJ/cm$^2$-50 J/cm$^2$, further preferably 100-800 mJ/cm$^2$. In order to accelerate the photo polymerization reaction, light irradiation may be practiced under heated conditions.

The thickness of the optically anisotropic layer is preferably 0.1-10 μm, more preferably 0.5-5 μm, most preferably 1-5 μm.

(Alignment Film)

The optical compensatory film of the invention can be a film having an alignment layer and an optically anisotropic layer in this order on a transparent support. The alignment film has the function of defining the alignment direction of the rod-shaped liquid crystalline molecules. However, when molecules of the rod-shaped liquid crystal compound are subjected to homeotropic alignment, since there is no in-plane alignment direction, the alignment film is not indispensable in the invention. Further, when the liquid crystal composition contains an onium salt and an air interface vertical alignment agent, molecules of the rod-shaped liquid crystal compound can be stably vertically aligned without using the vertical alignment film, the vertical alignment film is not indispensable for forming an optically anisotropic layer. However, since the alignment film can improve the evenness of the alignment of the liquid crystalline composition, or improve the adhesiveness between the polymer base material and the optically anisotropic layer, it can be used if necessary. After aligning molecules of the rod-shaped liquid crystal compound and fixing them in the alignment state, since the alignment film has fulfilled the role, it may be removed. For example, a polarizing plate having the optically anisotropic layer may be manufactured by transferring only the optically anisotropic layer on the alignment film in which an alignment state has been fixed onto a polarizing film.

The alignment film can be provided by such means as rubbing treatment of an organic compound (preferably a polymer), oblique evaporation of an inorganic compound, formation of a micro groove layer, or accumulation of an organic compound (e.g., ω-tricosanoic acid, dioctadecylmethylammonium chloride, methyl stearate) according to a Langmuir-Blodgett method (LB film). Further, alignment films are known that generate alignment function by application of an electric field, application of a magnetic field, or irradiation of light.

The alignment film can be subjected to rubbing treatment if necessary. A polymer for use in an alignment film has, in principle, a molecular structure with a function capable of aligning liquid crystalline molecules.

In the invention, in addition to a function of aligning liquid crystalline molecules, it is preferable to bond a side chain having a crosslinkable functional group (e.g., double bond) to the main chain, or to introduce a crosslinkable functional group having a function of aligning liquid crystalline molecules into side chains.

As a polymer for use in the alignment film, either a polymer capable of crosslinking in itself or a polymer being crosslinked by a crosslinking agent can be used, and plural combinations of these can be used.

Examples of the polymer include methacrylate-based polymer, styrene-based polymer, polyolefin, polyvinyl alcohol, modified polyvinyl alcohol, poly(N-methylol acrylamide), polyester, polyimide, polyvinyl acetate, carboxymethyl cellulose, polycarbonate and the like described in, for example, JP-A-8-338913, paragraph [0022]. A silane coupling agent can be also used as a polymer. Water-soluble polymers (e.g., poly(N-methylol acrylamide), carboxymethyl cellulose, gelatin, polyvinyl alcohol, modified polyvinyl alcohol) are preferable, gelatin, polyvinyl alcohol and modified polyvinyl alcohol are further preferable, and polyvinyl alcohol and modified polyvinyl alcohol are most preferable. Combined use of 2 types of polyvinyl alcohols or modified polyvinyl alcohols having different polymerization degrees is particularly preferable.

The saponification degree of polyvinyl alcohol is preferably 70-100%, further preferably 80-100%. The polymerization degree of polyvinyl alcohol is preferably 100-5000.

A side chain having a function of aligning liquid crystalline molecules generally has a hydrophobic group as a functional group. Specific type of the functional group is determined in accordance with the type of the liquid crystalline molecule and required alignment state. For example, a modifying group of modified polyvinyl alcohol can be introduced by copolymerization modification, chain transfer modification or block polymerization modification. Examples of the modifying group include hydrophilic groups (such as carboxylic acid group, sulfonic acid group, phosphonic acid group, amino group, ammonium group, amide group, thiol group), hydrocarbon groups having 10-100 carbon atoms, fluorine atom-substituted hydrocarbon groups, a thioether group, polymerizable groups (such as unsaturated polymerizable group, epoxy group, azirinidyl group), andalkoxysilyl groups (trialkoxy, dialkoxy, monoalkoxy). Specific examples of these modified polyvinyl alcohol compounds include those described in JP-A-2000-155216, paragraphs [00221-0145] and JP-A-2002-62426, paragraphs [0018]-[0022].

When side chains having a crosslinkable functional group are bonded to the main chain of the alignment film polymer or a crosslinkable functional group is introduced into side chains capable of aligning the liquid crystalline molecules, the polymer of the alignment film and the polyfunctional monomer contained in the optical anisotropic layer can be copolymerized with each other. As a result, not only the polyfunctional monomers are firmly covalently bonded to each other but also the alignment film polymers are firmly covalently bonded to each other or the polyfunctional monomer and the alignment film polymer are firmly covalently bonded to each other. Accordingly, by introducing a crosslinkable functional group into the alignment film polymer, the strength of the optical compensatory film can be significantly enhanced.

The crosslinkable functional group in the alignment film polymer preferably contains a polymerizable group similarly to the polyfunctional monomer. Specific examples of the polymerizable group include those described in JP-A-2000-155216, paragraphs [0080]-[0100].

The alignment film polymer may be also crosslinked using a crosslinking agent separately of the above-described crosslinkable functional group. Examples of the crosslinking agent include aldehyde, N-methylol compounds, dioxane derivatives, compounds which act upon activation of a carboxyl group, activated vinyl compounds, activated halogen compounds, isooxazole, and dialdehyde starch. Two or more types of crosslinking agents may be used in combination. Specific examples of the crosslinking agent include compounds described in JP-A-2002-62426, paragraphs [0023]-[0024]. Aldehyde having a high reaction activity, particularly glutaraldehyde is preferable.

The addition amount of the crosslinking agent is preferably 0.1-20% by mass, more preferably 0.5-15% by mass relative to the mass of the polymer. The amount of the residual unreacted crosslinking agent in the alignment film is preferably 1.0% by mass or less, more preferably 0.5% by mass or less. In this arrangement, the alignment film can be provided with a sufficient durability free from reticulation even after a prolonged use in a liquid crystal display device or a prolonged storage in an atmosphere of high temperature and humidity.

The alignment film can be essentially formed by applying a coating liquid containing the above-described polymer and crosslinking agent being constituents of the alignment film onto a transparent support, heat-drying (crosslinking) the coated layer, and then subjecting the layer to rubbing if necessary. The crosslinking reaction may be carried out at any time after applying the coating liquid as previously mentioned. In the case where a water-soluble polymer such as polyvinyl alcohol is used as an alignment film constituting material, a mixed solvent of an organic solvent having defoaming action (e.g., methanol) and water is preferably used for the coating liquid. The mixing ratio by mass of water:methanol is preferably $0<\text{water}\leqq 99:100>\text{methanol}\geqq 1$, further preferably $0<\text{water}\leqq 91:100>\text{methanol}\geqq 9$. This gives the inhibition of the occurrence of foams, thereby significantly reducing the occurrence of defects on the surface of the alignment film, and further the optical anisotropic layer.

The coating method of the alignment film is preferably a spin coating method, a dip coating method, a curtain coating method, an extrusion coating method, a rod coating method or a roll coating method. The rod coating method is particularly preferable. The dried thickness of the film is preferably 0.1-10 µm. The heat drying can be carried out at a temperature of 20°-110°. In order to form sufficient crosslink, the temperature is preferably from 60°-100°, particularly preferably 80°-100°. The drying time is 1 minute-36 hours, preferably 1 minute-30 minutes. The pH is preferably determined to a value most suitable for the crosslinking agent to be used. When glutaraldehyde is used, the pH is 4.5-5.5, particularly preferably 5.

The alignment film is provided on a transparent support or an undercoating layer formed on a transparent support. The alignment film can be obtained by crosslinking the polymer layer as described above, and then subjecting the surface of the polymer layer to rubbing treatment if necessary.

As the rubbing treatment, a treatment method which is widely used as a step of aligning liquid crystal in LCD can be applied. That is, the surface of the alignment film is rubbed with paper, gauze, felt, rubber or nylon or polyester fiber in a predetermined direction to attain alignment. In general, rubbing is practiced several times using a cloth obtained by uniformly weaving fibers having a uniform length and thickness.

After the alignment of liquid crystalline molecules on the alignment film, according to need, the alignment film polymer and the polyfunctional monomer included in the optically anisotropic layer are reacted with each other, or the alignment film polymer is crosslinked with a crosslinking agent. The thickness of the alignment film is preferably in the range of 0.1-10 µm.

[Support]

In the invention, the optically anisotropic layer may be formed on a support. The support is preferably transparent, specifically, preferably has a light transmittance of 80% or more. The support preferably has a small wavelength dispersion, specifically, preferably the ratio of Re400/Re700 is 1.2 or less. Above all, a polymer film is preferable. The support of the optically anisotropic layer may be a part of an after-mentioned second retardation region, or a part or the whole of an after-mentioned first retardation region. The support of the optically anisotropic layer may also function as a protective film of a polarizing film.

The support preferably has a small optical anisotropy, and has the $Re(\lambda)$ of preferably 20 nm or less, further preferably 10 nm or less, most preferably 5 nm or less. When the support also functions as an after-mentioned first retardation region, the $Re(\lambda)$ is preferably 20 nm-150 nm, more preferably 40 nm-115 nm, further preferably 60 nm-95 nm. In addition, Nz is preferably 1.5-7, more preferably 2.0-5.5, further preferably 2.5-4.5.

Examples of the polymer film constituting the support include cellulose ester, polycarbonate, polysulfone, polyethersulfone, polyacrylate and polymethacrylate films. Among these, a cellulose ester film is preferable, an acetylcellulose film is further preferable, and a triacetylcellulose film is most preferable. The polymer film is preferably formed by the solution casting method. The thickness of the transparent support is preferably 20-500 µm, further preferably 40-200 µm. In order to improve the adhesion between the transparent support and a layer provided thereon (adhesive layer, vertical alignment film or retardation layer), the transparent support may be subjected to surface treatment (e.g., glow discharge treatment, corona discharge treatment, irradiation with ultraviolet rays (UV), flame treatment). An adhesive layer (undercoating layer) may be provided on the transparent support. In order to provide lubricity during a conveying step or to prevent sticking between the rear and front faces after winding, the transparent support or a long transparent support is preferably provided with a polymer layer mixed with inorganic particles having an average particle size of around 10-100 nm in 5%-40% by the solid content weight ratio formed by coating or co-casting with the support on one side of the support.

Polarizing Plate

Next, the polarizing plate of the invention will be described.

The polarizing plate of the invention has the aforementioned optical compensatory film of the invention and a polarizing film. The polarizing plate can be manufactured, in general, by soaking a polarizing film composed of a polyvinyl alcohol film with iodine, stretching the same to give a polarizing film, and laminating a protective film on both faces of the polarizing film. When the optical compensatory film of the invention has a support composed of a polymer film or the like supporting the optically anisotropic layer, the support can be directly used as at least one protective film. In the invention, the optically anisotropic layer can additionally work as the protective film.

[Protective Film for Polarizing Film]

As a protective film for the polarizing film, such film is preferable that has no absorption in a visible light region, a light transmittance of 80% or more, and a small light transmittance based on birefringence. Specifically, the Re(λ) thereof is preferably 0-30 nm, more preferably 0-15 nm, most preferably 0-5 nm. Further, the Rth(λ) thereof is preferably 0-40 nm, more preferably 0-20 nm, most preferably 0-10 nm. Any film having the characteristics can be preferably used, but from the viewpoint of the durability of the polarizing film, cellulose acylate films or norbornene-based films are more preferable. As a method for reducing the Rth of a cellulose acylate film, methods described in JP-A-11-246704, JP-A-2001-247717 and Japan Patent Application No. 2003-379975 can be mentioned. The Rth can be also reduced by reducing the thickness of a cellulose acylate film. The thickness of a cellulose acylate film for a protective film of the polarizing film is preferably 10-100 μm, more preferably 10-60 μm, further preferably 20-45 μm.

Liquid Crystal Display Device

The liquid crystal display device of the invention is one having the optical compensatory film of the invention or the polarizing plate of the invention. The liquid crystal display device of the invention includes 2 retardation regions (first retardation region, second retardation region), and preferably includes the optical compensatory film of the invention in at least one of the regions.

Figure 2:
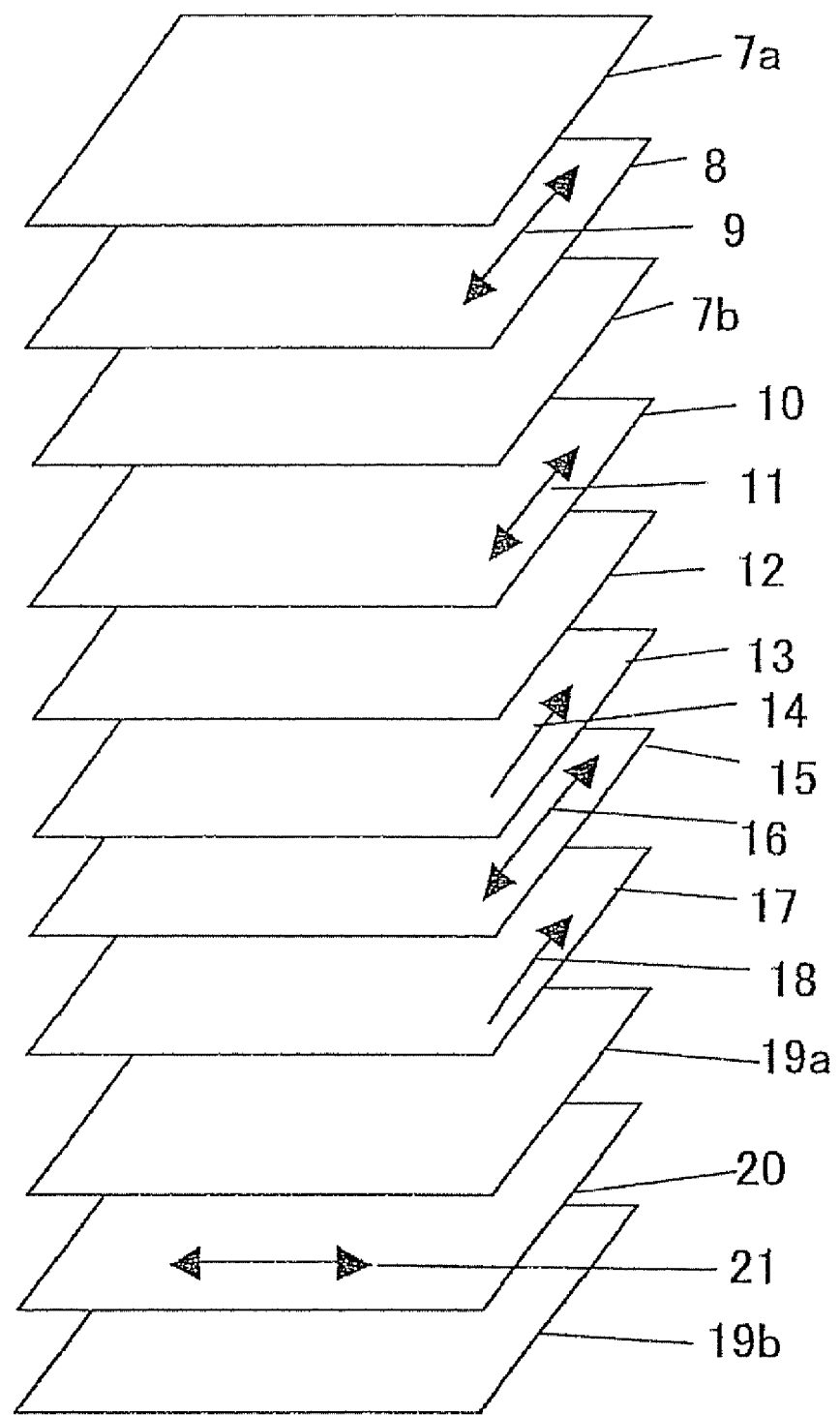
FIG. 2 is a schematic view showing an example of the liquid crystal display device of the invention.
Figure 3:
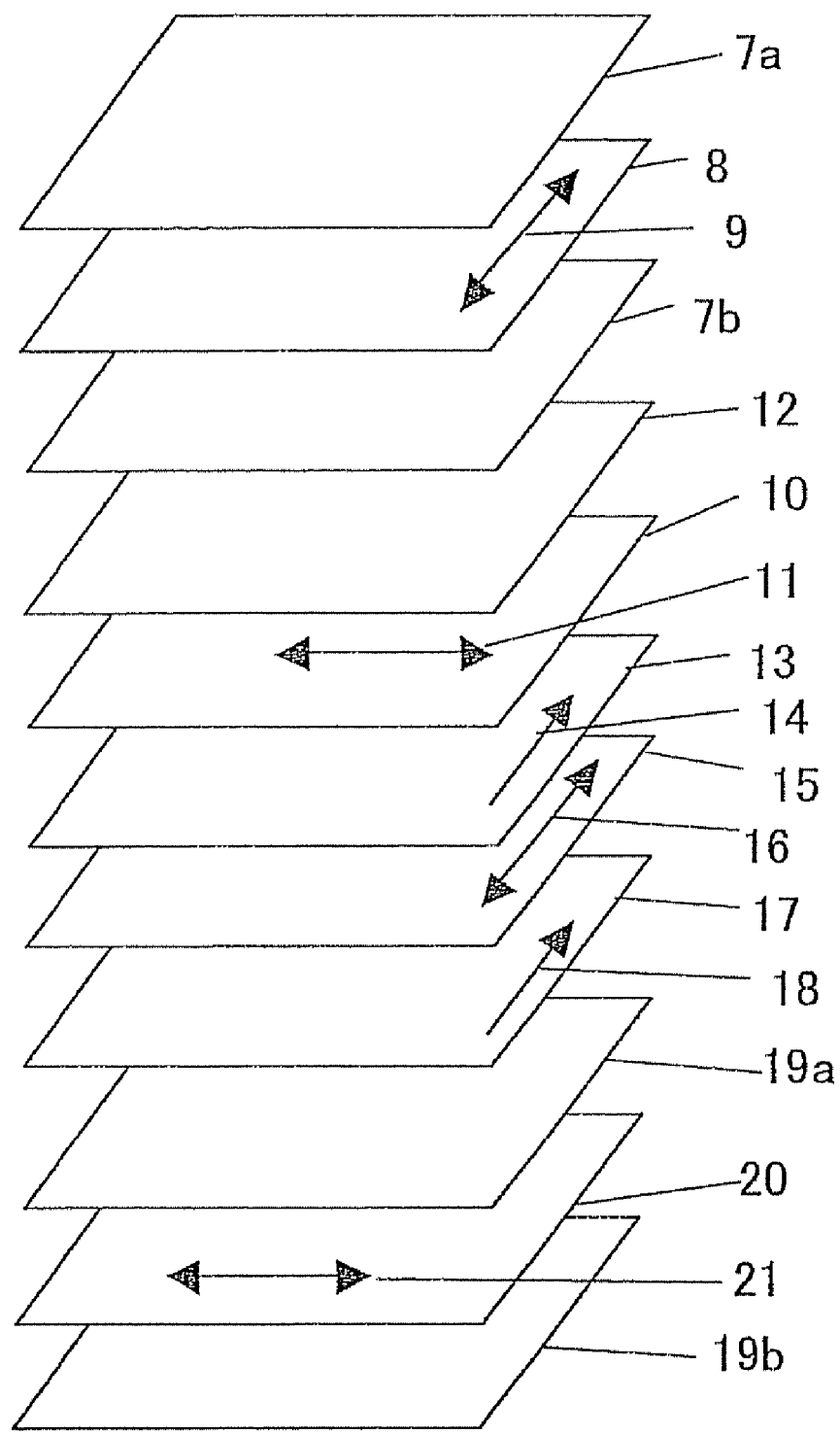
FIG. 3 is a schematic view showing another example of the liquid crystal display device of the invention.

Hereinafter, preferable embodiments of the liquid crystal display device of the invention will be described while referring to drawings. FIG. 1 is a schematic view showing an example of pixel region of the liquid crystal display device of the invention. FIGS. 2 and 3 are schematic views of embodiments of the liquid crystal display device of the invention.

[Liquid Crystal Display Device]

The liquid crystal display device shown in FIG. 2 has polarizing films 8 and 20, a first retardation region 10, a second retardation region 12, substrates 13 and 17, and a liquid crystal layer 15 interposed between the substrates. The polarizing films 8 and 20 are interposed between protective films 7a and 7b, and protective films 19a and 19b, respectively.

In the liquid crystal display device in FIG. 2, the liquid crystal cell is composed of the substrates 13 and 17, and the liquid crystal layer 15 interposed between these. The optimum value of the product Δn·d of the thickness d (μm) of the liquid crystal layer and the refraction index anisotropy Δn is in the range of 0.2-4 μm in a transmission mode for the IPS type having no twist structure. Since white display luminance is high and black display luminance is low in this range, a bright and high-contrast display device can be obtained. On the surface of the substrates 13 and 17 contacting to the liquid crystal layer 15, the alignment film (not shown) is formed, whereby the liquid crystal molecules are aligned approximately parallel to the surface of the substrate, and the alignment direction of liquid crystal molecules in the state of no voltage or low voltage application is controlled by the rubbing directions 14 and 18 provided on the alignment film. On the inside surface of the substrate 13 or 17, electrodes (not shown in FIG. 2) capable of applying voltage to the liquid crystal molecules are formed.

FIG. 1 schematically shows the alignment of liquid crystal molecules in 1 pixel region of the liquid crystal layer 15. FIG. 1 is a schematic view showing the alignment of liquid crystal molecules in a region with an extremely small area corresponding to around 1 pixel of the liquid crystal layer 15, along with a rubbing direction 4 of the alignment film formed on the inside faces of the substrates 13 and 17, and electrodes 2 and 3 capable of applying voltage to liquid crystal molecules formed on the inside faces of the substrates 13 and 17. When nematic liquid crystal having positive dielectric anisotropy is used as electric field effect type liquid crystal and subjected to active drive, the alignment direction of liquid crystal molecules in the state of no voltage or low voltage application is shown by 5a and 5b. The black display is attained at this time. When a voltage is applied between the electrodes 2 and 3, liquid crystal molecules alter the alignment direction to 6a and 6b in accordance with the voltage. Usually, bright display is carried out in this state.

In FIG. 2, a transmission axis 9 of a polarizing film 8 and a transmission axis 21 of a polarizing film 20 are orthogonally arranged. A slow phase axis 11 of a first retardation region 10 is parallel to the transmission axis 9 of the polarizing film 8 and a slow phase axis direction 16 of liquid crystal molecules in a liquid crystal layer 15 at the time of black level. The liquid crystal display device shown in FIG. 2 has a constitution in which the polarizing film 8 is interposed between the 2 protective films 7a and 7b, but the protective film 7b may be omitted. When the protective film 7b is omitted, it is preferable that a part of or the whole of the first retardation region 10 has such property that it can additionally function as the protective film 7b of the polarizing film. The polarizing film 20 is also interposed between 2 protective films 19a and 19b, but the protective film 19a on the side nearer to the liquid crystal layer 15 may be omitted. In the embodiment in FIG. 2, the first retardation region 10 and the second retardation region 12 may be arranged between the liquid crystal cell and the polarizing film on the viewer side, or may be arranged between the liquid crystal cell and the polarizing film on the rear side, on the basis of the position of the liquid crystal cell. In the present embodiment, the second retardation region is arranged so as to be nearer to the liquid crystal cell in either constitution.

Another embodiment is shown in FIG. 3. In the liquid crystal display device in FIG. 3, the second retardation region 12 is arranged between the polarizing film 8 and the first retardation region 10. In the liquid crystal display device in FIG. 3, the protective film 7b may be omitted. When the protective film 7b is omitted, it is preferable that a part or the whole of the second retardation region 12 has such property that it can additionally function as the protective film 7b of the polarizing film. The polarizing film 20 is also interposed between 2 protective films 19a and 19b, but the protective film 19a on the side nearer to the liquid crystal layer 15 may be omitted. In the embodiment shown in FIG. 3, the first retardation region 10 is arranged so that the slow phase axis 11 thereof becomes orthogonal to a transmission axis 9 of the polarizing film 8 and a slow phase axis direction 16 of liquid crystal molecules in the liquid crystal layer 15 at the time of black level. In the embodiment in FIG. 3, the first retardation region 10 and the second retardation region 12 may be arranged between the liquid crystal cell and the viewer side polarizing film, or between the liquid crystal cell and the rear side polarizing film on the basis of the position of the liquid crystal cell. In the present embodiment, the first retardation region is arranged so as to be nearer to the liquid crystal cell in either constitution.

In FIGS. 3 and 2, the embodiment of display device in a transmission mode provided with the upside polarizing plate and downside polarizing plate, but, in the invention, an embodiment in a reflection mode provided with only 1 polarizing plate is also allowable. In this case, since the optical path in the liquid crystal cell becomes double, the optimum value of Δn·d becomes around ½ of the above described value. The liquid crystal cell for use in the invention is not restricted to a cell of the IPS mode, but any liquid crystal display device, in which liquid crystal molecules align substantially parallel to the surfaces of the above-described pair of substrates at the time of black level, can be used preferably. Example of these include a ferroelectric liquid crystal display device, an antiferroelectric liquid crystal display device and an ECB type liquid crystal display device.

The liquid crystal display device of the invention is not restricted to the constitution shown in FIGS. 1-3, but may include other members. For example, a color filter may be arranged between the liquid crystal layer and the polarizing film. The surface of the protective film of the polarizing film may be provided with antireflection treatment or a hard coat. Constitutional members provided with conductivity may be used. When the device is used in a transmission mode, such backlight may be arranged on the rear side thereof that has a cold cathode or hot cathode fluorescent tube, a light-emitting diode, a field emission element or an electroluminescent element as a light source. In this case, the backlight may be arranged on the upside or downside in FIGS. 2 and 3. Between the liquid crystal layer and the backlight, a reflection type polarizing plate, a diffusion plate, a prism sheet or a light guide plate may be arranged. As described above, the liquid crystal display device of the invention may be of a reflection type. In this case, only one polarizing plate is required to be arranged on the observation side, and a reflection film is arranged on the rear side of the liquid crystal cell or on the inside face of the downside substrate of the liquid crystal cell. Of course, a front light using the above-described light source may be arranged on the observation side of the liquid crystal cell.

The liquid crystal display device of the invention includes the image direct-view type, image projection type and light modulation type devices. The invention is particularly effective in an embodiment in which it is applied to the active matrix liquid crystal display device using a 3-terminal or 2-terminal semiconductor element such a TFT and MIM. Of course, such embodiment is also effective that the invention is applied to the passive matrix liquid crystal display device referred to as time-sharing driving.

Hereinafter, preferable optical properties of various members usable for the liquid crystal display device of the invention, materials for use in the members, production methods thereof and the like will be described in detail.

[First Retardation Region]

The first retardation region included in the liquid crystal display device of the invention preferably has the Re($\lambda$) of 20 nm-150 nm. In order to effectively reduce light leakage in oblique directions, the Re($\lambda$) in the first retardation region is more preferably 40 nm-115 nm, further preferably 60 nm-95 nm. Further, $Nz=(nx-nz)/(nx-ny)$ defined by using in-plane refractive indices nx and ny (nx>ny), and a refractive index in the thickness direction nz is preferably 1.5-7, and, in order to effectively reducing light leakage in oblique directions, Nz of the first retardation region is more preferably 2.0-5.5, further preferably 2.5-4.5.

The material and figure of the first retardation region is essentially not particularly restricted, as long as it has the above-described optical properties. For example, any of a retardation film composed of a birefringence polymer film, a film formed by applying a polymer compound on a transparent support and then heating the coating, and a retardation film having a retardation layer formed by applying or transferring a low molecular or high molecular liquid crystal compound, can be used. Further, each of these can be laminated to be used.

As the birefringence polymer film, one excellent in controllability of birefringence property, transparency and heat resistance is preferable. In this case, there is no particular restriction on polymer material to be used as long as it can attain uniform biaxial alignment, but conventionally publicly known one capable of film forming by a solution casting method or an extrusion molding method is preferable. Examples of these include aromatic polymers such as norbornene-based polymer, polycarbonate-based polymer, polyarylate-based polymer, polyester-based polymer and polysulfone, cellulose acylate, and mixtures of 2 types or 3 types or more of these polymers.

The biaxial alignment of a film can be attained by subjecting a film consisting of a thermoplastic resin formed by an appropriate system such as an extrusion molding system or casting film forming system to stretching treatment such as a longitudinal stretching system with rolls, a horizontal stretching system or biaxial stretching system with a tenter. In the longitudinal stretching system with rolls, an appropriate heating method can be employed, such as a method using heating rolls, a method heating the atmosphere, and a combined method of these. In the biaxial stretching system with a tenter, an appropriate method can be employed such as a simultaneous biaxial stretching method by the whole tenter system and a sequential biaxial stretching method by a roll-tenter system.

The film having a little alignment unevenness and retardation unevenness is preferable. The thickness can be suitably determined according to retardation or the like, but, from the viewpoint of thickness reduction, generally it is set, for example, to 1-300 μm, preferably to 10-200 μm, in particular to 20-150 μm.

The norbornene-based polymer is a polymer of monomer having such norbornene-based monomer as norbornene and its derivative, tetracyclododecene and its derivative, dicyclopentadiene and its derivative, or methanotetrahydrofluorene and its derivative as a primary component, including ring-opened polymer of norbornene-based monomer, ring-opened copolymer of norbornene-based monomer and another monomer capable of ring-opening copolymerization with it, addition polymer of norbornene-based monomer, addition copolymer of norbornene-based monomer and another monomer capable of polymerizing with it, and hydrogenated products of these. Among these, from the viewpoint of heat resistance, mechanical strength and the like, hydrogenated ring-opened polymer of norbornene-based monomer is most preferable. The molecular weight of norbornene-based polymer, polymer of monocyclic cycloolefin, or polymer of cyclic conjugated diene is suitably selected in accordance with intended purpose, but when mass average molecular weight in terms of polyisoprene or polystyrene measured by gel permeation chromatography in a cyclohexane solution (when polymer resin does not dissolve in cyclohexane, toluene solution) is in the range of ordinary 5,000-500,000, preferably 8,000-200,000, more preferably 10,000-100,000, the mechanical strength and molding processability of the film are highly balanced, which is suitable. As the typical polymer, those described in JP-A-2003-327800 and JP-A-2004-233604 can be mentioned.

The acyl group of cellulose acylate may be an aliphatic group or an aromatic group, and is not particularly restricted. They are, for example, alkylcarbonyl ester, alkenylcarbonyl ester, aromaticcarbonyl ester or aromaticalkylcarbonyl ester of cellulose, each of which may further have a substituted group, wherein ester groups having total 22 or less carbon atoms are preferable. Examples of the preferable cellulose acylate include acyl groups having total 22 or less carbon atoms in the ester portion (such as acetyl group, propionyl group, butyloyl group, valel group, heptanoyl group, octanoyl group, decanoyl group, dodecanoyl group, tridecanoyl group, hexadecanoyl group, octadecanoyl group), arylcarbonyl groups (such as acrylic group, methacrylic group), allylcarbonyl groups (such as benzoyl group, naphthaloyl group) and a cinnamoyl group. Among these, cellulose acetate, cellulose acetate propionate, cellulose acetate butylate, cellulose acetate stearate and cellulose acetatebenzoate are preferable. In the case of mixed ester, the mixing ratio is not particularly restricted, but preferably acetate is 30% by mol or more of the total esters.

Among these, cellulose acylate is preferable, in particular cellulose acylate of the photographic grade is preferable. Cellulose acylate of the photographic grade satisfying such quality as the viscosity average polymerization degree and substitution degree can be commercially available. There as such makers of cellulose triacetates of the photographic grade as DAICEL CHEMICAL INDUSTRIES, LTD. (such as LT-20, 30, 40, 50, 70, 35, 55, 105), Eastman Chemical Company (such as CAB-551-0.01, CAB-551-0.02, CAB-500-5, CAB-381-0.5, CAB-381-02, CAB-381-20, CAB-321-0.2, CAP-504-0.2, CAP-482-20, CA-398-3), Coutaulds Ltd., and Hoechst. Cellulose acetate of the photographic grade can be available from these companies. For the purpose of controlling mechanical properties or optical properties of the film, plasticizer, surfactant, retardation-controlling agent or UV absorbent can be mixed. Details of these additives are described in, for example, JP-A-2002-277632 and JP-A-2002-182215.

As the method for molding transparent resin into a sheet or film shape, for example, either the heat melt-molding method or the solution casting method can be employed. The heat melt-molding method can be classified more specifically into the extrusion molding method, press molding method, inflation molding method, injection molding method, blow molding method and stretching molding method. Among these methods, in order to obtain a film having an excellent mechanical strength, surface accuracy and the like, the extrusion molding method, inflation molding method and press molding method are preferable, and the extrusion molding method is most preferable. The molding conditions are suitably selected according to the intended purpose or the molding method, and in the case of the heat melt-molding method, the cylinder temperature is suitably set in the range of preferably 100-400° C., more preferably 150-350° C. The thickness of the sheet or film is preferably 10-300 μm, more preferably 30-200 μm.

When representing the glass transition temperature of the transparent resin by Tg, the stretching of the sheet or film is carried out at a temperature in the range of preferably Tg-30° C.-Tg+60° C., more preferably Tg-10° C.-Tg+50° C., at least in one direction preferably at a draw ratio of 1.01-2. The stretching may be carried out at least in one direction. When the sheet is manufactured by an extrusion molding, the direction is preferably a direction of mechanical flow of the resin (extrusion direction). As the stretching method, the free contraction uniaxial stretching method, fixed-width uniaxial stretching method and biaxial stretching method are preferable. The optical property can be controlled by controlling the draw ratio and heating temperature.

[Second Retardation Region]

The second retardation region included in the liquid crystal display device of the invention preferably has the substantially identical in-plane refraction indices nx and ny, and whose refraction index nz in the thickness direction preferably satisfies nx<nz. Further, the Rth(λ) of the second retardation region is preferably −80 nm--400 nm.

The more preferable range of the Rth(λ) of the second retardation region varies in accordance with optical properties of other optical members, in particular in accordance with the Rth(λ) of the protective film (e.g., triacetylcellulose film) of the polarizing film lying nearer to the region, but in order to effectively reduce light leakage in oblique directions, the Rth(λ) of the second retardation region is preferably −100 nm--340 nm, more preferably −120 nm--270 nm. On the other hand, as described above, nx and ny of the second retardation region are substantially identical to each other, and, in this case, the Re(λ) has a value of around 0. Specifically, the in-plane retardation Re(λ) is preferably 0-50 nm, more preferably 0-20 nm.

The second retardation region can include an optical compensatory film having an optically anisotropic layer formed from the aforementioned liquid crystal composition. The composition contains a liquid crystal compound. The liquid crystal compound includes a rod-shaped liquid crystal compound, a discotic liquid crystal compound and the like, and is not particularly restricted, but preferably it is a rod-shaped liquid crystal compound. It is more preferable that the composition contains a rod-shaped liquid crystal compound, and that the molecules of the rod-shaped liquid crystal compound are fixed in a substantially vertically aligned state in the optically anisotropic layer. These liquid crystal compounds may be obliquely aligned, or aligned so as to have a gradually altering tilt angle (hybrid alignment). Also in the oblique alignment or hybrid alignment, an average tilt angle is preferably 70°-90°, more preferably 80°-90°, most preferably 85°-90°.

The second retardation region may be composed of the optically anisotropic layer alone, or of plural optically anisotropic layers. The second retardation region may be also constituted so that the whole laminated body of the support and the optically anisotropic layer satisfies the above-described optical properties. As the rod-shaped liquid crystal compound to be used, those exhibit the state of nematic liquid crystal phase, smectic liquid crystal phase or lyotropic liquid crystal phase in the range of temperatures used on alignment fixing are preferably employed. In order to give homogeneous alignment state, a liquid crystal showing the nematic phase is preferable. In particular, with regard to a rod-shaped liquid crystal compound exhibiting the above-described liquid crystal state in the presence of an additive within a suitable alignment temperature range, it is also preferable to form a layer using a composition containing the additive and the rod-shaped liquid crystal compound.

EXAMPLES

Further specific characteristics of the invention will be described below on the basis of Examples and Comparative Examples. The material, use amount, percentage, treatment content, treatment procedure and the like shown in the following Examples can be arbitrarily changed within a range that does not result in deviation from the purpose of the invention. Accordingly, the scope of the invention should not be construed restrictively by specific examples shown below.

(Synthesis of Fluoroaliphatic Group-containing Copolymer (P-3))

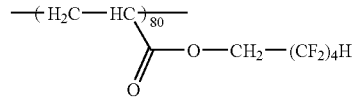

P-3

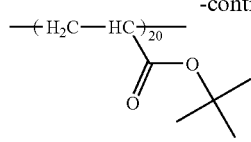

Mw20000

To a reactor provided with a stirrer and a reflux condenser, 31.94 g of 1H,1H,5H-octafluoropentyl acrylate, 7.99 g of tert-butyl acrylate, 1.1 g of dimethyl-2,2'-azobis(isobutyrate) and 30 g of 2-butanone were added, which were heated at 78° C. for 6 hours under nitrogen atmosphere to complete the reaction, thereby giving P-3. The mass average molecular weight thereof was $2.0 \times 10^4$.

(Synthesis of Fluoroaliphatic Group-containing Copolymer (P-6))

P-6

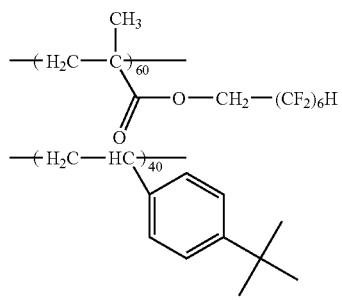

Mw19000

By using 23.96 g of 1H,1H,7H-dodecafluoroheptyl methacrylate, 15.97 g of 4-tert-butylstyrene, 1.1 g of dimethyl-2, 2'-azobis(isobutyrate) and 30 g of 2-butanone, P-6 was obtained in the same way as fluoroaliphatic group-containing copolymer (P-3). The mass average molecular weight thereof was $1.9 \times 10^4$.

(P-9), (P-12), (P-15) and (P-27) were synthesized in the same way as fluoroaliphatic group-containing copolymer (P-3).

<Manufacture of IPS Mode Liquid Crystal Cell 1>

As shown in FIG. 1, electrodes (2 and 3 in FIG. 1) were disposed on a glass substrate so that the distance between the neighboring electrodes became 20 μm, on which a polyimide film was arranged as an alignment film, which was subjected to rubbing treatment. The rubbing treatment was carried out in a direction 4 shown in FIG. 1. On one surface of a glass substrate prepared separately, a polyimide film was disposed, which was subjected to rubbing treatment to form an alignment film. The two glass substrates were stacked in such state that the alignment films faced to each other with a distance (gap; d) of 3.9 μm and the rubbing directions lay parallel to each other, which were then stuck. Subsequently, a nematic liquid crystal composition having a refraction anisotropy (Δn) of 0.0769 and a permittivity anisotropy (Δ∈) of positive 4.5 was sealed in it. The value of d·Δn of the liquid crystal layer was 300 nm.

<Manufacture of First Retardation Region 1, First Retardation Region 2, First Retardation Region 3>

The following composition was put in a mixing tank and stirred with heating to dissolve respective ingredients, thereby preparing a cellulose acetate solution. The solution was filtrated with a filter paper having a retaining particle size of 4 μm and a filtration time of 35 seconds (No. 63, manufactured by Advantech) under a pressure of 0.5 MPa (5 kg/cm²) or less.

| Composition of Cellulose Acetate Solution | |
|---|---|
| Cellulose acetate having an acetylation degree of 60.9% (polymerization degree: 300, Mn/Mw = 1.5) | 100 parts by mass |
| Triphenyl phosphate (plasticizer) | 7.8 parts by mass |
| Biphenyldiphenyl phosphate (plasticizer) | 3.9 parts by mass |
| Methylene chloride (first solvent) | 300 parts by mass |
| Methanol (second solvent) | 54 parts by mass |
| 1-butanol (third solvent) | 11 parts by mass |

In another mixing tank, 8 parts by mass of the following retardation increasing agent A, 10 parts by mass of retardation increasing agent B, 0.28 parts by mass of silicon dioxide fine particles (average particle size: 0.1 μm), 80 parts by mass of methylene chloride and 20 parts by mass of methanol were put, which were stirred with heating to prepare a retardation increasing agent solution (simultaneously fine particle dispersion liquid). To 474 parts by mass of the cellulose acetate solution, 40 parts by mass of the retardation increasing agent solution was mixed and sufficiently stirred to prepare a dope.

Retardation Increasing Agent A

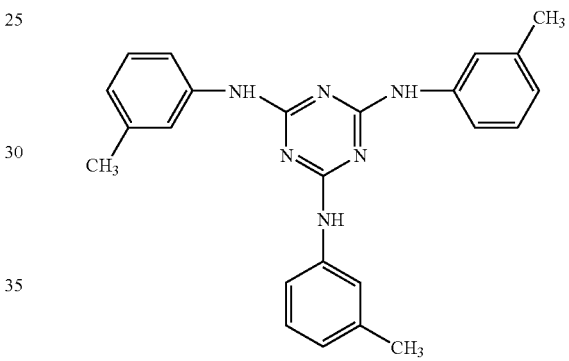

Retardation Increasing Agent B

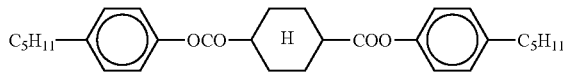

The obtained dope was cast using a band casting machine. A film having a residual solvent amount of 15% by mass was laterally stretched with a tenter at a draw ratio of 20% under a condition of 130° C., which was hold at 50° C. for 30 seconds while maintaining the width after the stretching, and then clips were unfastened to manufacture a cellulose acetate film. A residual solvent amount at the end of the stretching was 5% by mass, which was further dried to make a residual solvent amount be 0.1% by mass or less, thereby manufacturing a film.

The thickness of the film thus obtained (first retardation region 1) was 80 μm. For the manufactured first retardation region 1, light incident angle dependency of Re was measured with an auto-birefringence index meter (KOBRA-21ADH, manufactured by Oji Scientific Instruments) to give Re of 70 nm and Rth of 175 nm, from which Nz was found to be 3.0.

In another mixing tank, 16 parts by mass of the retardation increasing agent A, 8 parts by mass of the retardation increasing agent B, 0.28 parts by mass of silicon dioxide fine particles (average particle size: 0.1 μm), 80 parts by mass of methylene chloride and 20 parts by mass of methanol were put, which were stirred with heating to prepare a retardation increasing agent solution (simultaneously, fine particles dispersion liquid). 45 parts by mass of the retardation increasing agent solution was mixed to 474 parts by mass of a cellulose acetate solution, which were sufficiently stirred to prepare a dope and then film-formed in the similar way to the first retardation region 1. The thickness of thus obtained film (first retardation region 2) was 80 μm. For the manufactured first retardation region 2, light incident angle dependency of Re was measured with an auto-birefringence index meter (KOBRA-21ADH, manufactured by Oji Scientific Instruments) to give Re of 60 nm and Rth of 210 nm, from which Nz was found to be 4.0.

In another mixing tank, 18 parts by mass of the retardation increasing agent A, 0.28 parts by mass of silicon dioxide fine particles (average particle size: 0.1 μm), 80 parts by mass of methylene chloride and 20 parts by mass of methanol were put, which were stirred with heating to prepare a retardation increasing agent solution (simultaneously, fine particle dispersion liquid). 25 parts by mass of the retardation increasing agent solution was mixed to 474 parts by mass of the cellulose acetate solution, which were sufficiently stirred to prepare a dope. Then, film was formed in the similar way to the first retardation region 1 except for setting the draw ratio to 23%. The thickness of thus obtained film (first retardation region 3) was 80 μm. For the manufactured first retardation region 3, light incident angle dependency of Re was measured with an auto-birefringence index meter (KOBRA-21ADH, manufactured by Oji Scientific Instruments) to give Re of 35 nm and Rth of 135 nm, from which Nz was found to be 4-4.

<Manufacture of Second Retardation Regions 1-10>

The surfaces of the manufactured first retardation region 1, first retardation region 2, and first retardation region 3 were subjected to saponification treatment. On these films, an alignment film coating liquid having the following composition was applied with a wire bar coater in 30 ml/m², which was dried with a hot air at 60° C. for 60 seconds, and further with a hot air at 100° C. for 120 seconds to form a layer. Then the formed layer was subjected to rubbing treatment in the direction parallel to the slow phase axis direction of the film to give an alignment film.

| Composition of Alignment Film Coating Liquid | |
|---|---|
| Modified polyvinyl alcohol below | 10 parts by mass |
| Water | 371 parts by mass |
| Methanol | 119 parts by mass |
| Glutaric aldehyde | 0.5 parts by mass |

Modified polyvinyl alcohol $$-(CH_2-CH)_{86.3}-(CH_2-CH)_{12}-(CH_2-CH)_{1.7}-$$
$$\phantom{-(CH_2-CH)_{86.3}}|\phantom{-(CH_2-CH)_{12}}|\phantom{-(CH_2-CH)_{1.7}}|$$
$$\phantom{-(CH_2-CH)_{86.3}}OH\phantom{-(CH_2-}OCOCH_3\phantom{-(CH_2-}OCONHCH_2CH_2OCOC(CH_3)=CH_2$$

Next, respective solutions (coating liquids Nos. 2-1-2-9 shown in Table 1) were prepared by dissolving 3.8 g of the following rod-shaped liquid crystal compound, 0.06 g of a photo polymerization initiator (Irgacure-907, manufactured by Ciba Specialty Chemicals), 0.02 g of a sensitizer (Kayacure DETX, manufactured by NIPPON KAYAKU CO., LTD.), 0.02 g of a fluoroaliphatic group-containing polymer, 0.076 g of the following onium salt and 0.002 g of the following air interface side vertical alignment agent in 9.2 g of methylethyl ketone. Each of the coating liquid was applied onto the surface of the alignment film with a wire bar of the count shown in Table 2, which was set to a metal frame and heated in a constant-temperature bath at 100° C. for 2 minutes to align the rod-shaped liquid crystal compound. Next, each of them was irradiated with UV rays by a high pressure mercury lamp of 120 W/cm at 80° C. for 20 seconds to crosslink the rod-shaped liquid crystal compound. Then, each of them was cooled down to room temperature to manufacture an optically anisotropic layer. Rod-shaped liquid crystal compound

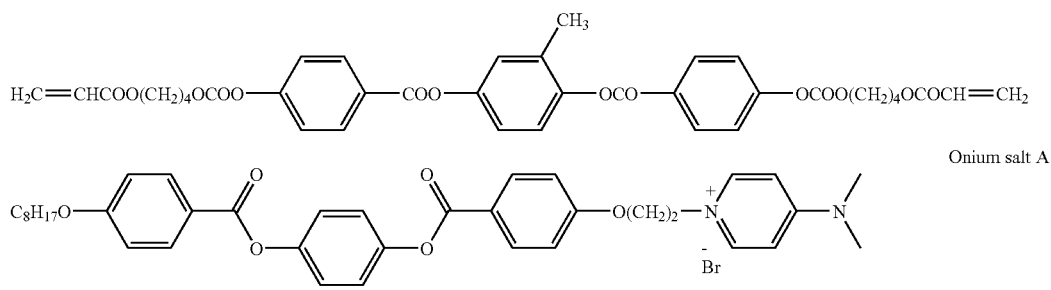

Onium salt A

Onium salt B

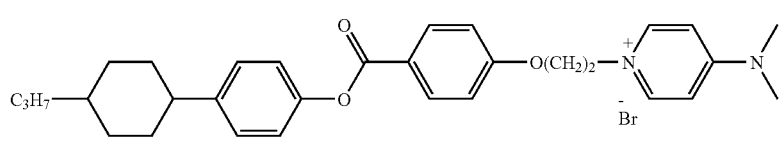

Onium salt C

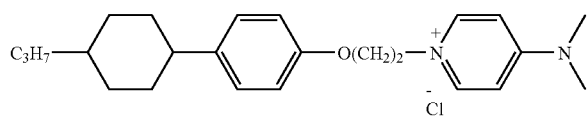

Onium salt D

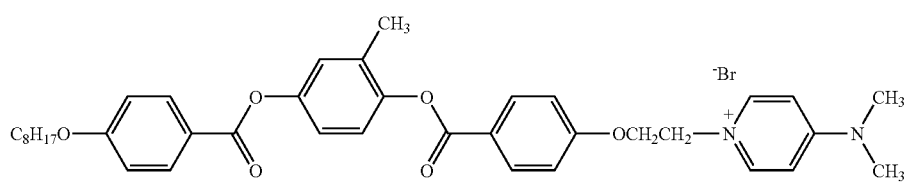

Air interface vertical alignment agent (a, b, c represents mass ratio)

P-27

—(CH₂—CH)ₐ—(CH₂—CH)ᵦ—(CH₂—CH)ᵧ—
     |              |              |
     COOCH₂CH₂(CF₂)₆F  COO(C₃H₆O)₆H  COOH a = 40  b = 55  c = 5

I-48

[benzene ring with SO₃H, O(CH₂)₂O(CH₂)₂C₆F₁₃, O(CH₂)₂O(CH₂)₂C₆F₁₃]

P-2

—(CH₂—CH)ₐ—(H₂C—CH)ᵦ—
     |              |
     COOH         COOCH₂(CF₂)₆H a/b = 15/85

TABLE 1

| Film No | | Coating liquid No | Onium salt | Air interface vertical alignment agent | Fluoroaliphatic group-containing copolymer |
|---|---|---|---|---|---|
| Example | Second retardation region 1 | 2-1 | A | Exemplified comp. P-27 | P-3 |
| Example | Second retardation region 2 | 2-2 | B | Exemplified comp. I-48 | P-6 |
| Example | Second retardation region 3 | 2-3 | C | Exemplified comp. P-27 | P-9 |

TABLE 1-continued

| Film No | | Coating liquid No | Onium salt | Air interface vertical alignment agent | Fluoroaliphatic group-containing copolymer |
|---|---|---|---|---|---|
| Example | Second retardation region 4 | 2-4 | D | Exemplified comp. P-27 | P-12 |
| Example | Second retardation region 5 | 2-5 | D | Exemplified comp. I-48 | P-15 |
| Example | Second retardation region 6 | 2-6 | A | None | P-27 |
| Example | Second retardation region 7 | 2-7 | None | Exemplified comp. P-2 | P-3 |
| Comp. Ex. | Second retardation region 8 | 2-8 | B | Exemplified comp. P-27 | None |
| Comp. Ex. | Second retardation region 9 | 2-9 | A | Exemplified comp. I-48 | R-1 |
| Comp. Ex. | Second retardation region 10 | 2-10 | C | Exemplified comp. P-2 | R-2 |
| Comp. Ex. | Second retardation region 11 | 2-11 | C | Exemplified comp. P-2 | R-3 |

TABLE 2

| Film No | | Name of second retadation region | Name of first retadation region | Wire bar count | Unevenness by drying air | Coating unevenness |
|---|---|---|---|---|---|---|
| Example | Retardation 1 | 2nd retadation region 1 | 1st retadation region 1 | #4.5 | ○ | ○ |
| Example | Retardation 2 | 2nd retadation region 2 | 1st retadation region 2 | #6.0 | ○ | ○ |
| Example | Retardation 3 | 2nd retadation region 3 | 1st retadation region 2 | #6.0 | ○ | ○ |
| Example | Retardation 4 | 2nd retadation region 4 | 1st retadation region 1 | #3.4 | ○ | ○ |
| Example | Retardation 5 | 2nd retadation region 5 | 1st retadation region 1 | #4.5 | ○ | ○ |
| Example | Retardation 6 | 2nd retadation region 6 | 1st retadation region 3 | #6.0 | No alignment | No alignment |
| Example | Retardation 7 | 2nd retadation region 7 | 1st retadation region 3 | #6.0 | No alignment | No alignment |
| Comp. Ex. | Retardation 8 | 2nd retadation region 8 | 1st retadation region 1 | #4.5 | X | X |
| Comp. Ex. | Retardation 9 | 2nd retadation region 9 | 1st retadation region 3 | #3.4 | ○ | X |
| Comp. Ex. | Retardation 10 | 2nd retedation region 10 | 1st retadation region 3 | #3.4 | ○ | X |
| Comp. Ex. | Retardation 11 | 2nd retedation region 11 | 1st retadation region 3 | #3.4 | ○ | X |

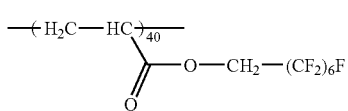

R-1

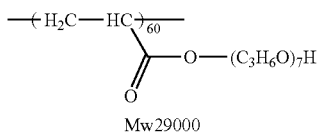

Mw29000

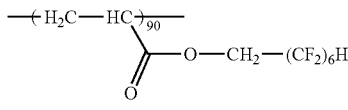

R-2

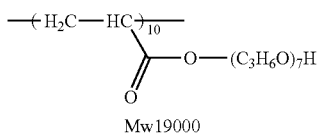

Mw19000

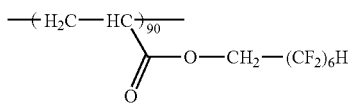

R-3

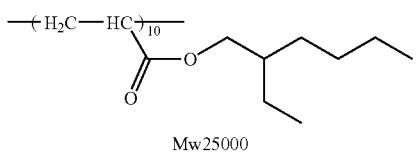

Mw25000

Results of visual observation of the state of the optical compensatory films are shown in Table 2. Respective optical compensatory films obtained by applying a coating liquid containing the composition obtained in the invention had good unevenness in thickness caused by drying air. Here, the unevenness in thickness caused by drying air means a surface trouble that varies when drying conditions are altered, and the coating unevenness means a surface trouble that varies when coating conditions are altered. The surface trouble was determined to be x when it was confirmed by visual observation.

The retardations 6 and 7 did not show an extinction position, and there were observed schlieren defects in respective second retardation regions showing no formation of vertical alignment. The second retardation regions 6 and 7 are optically anisotropic layers formed by using coating liquids that do not include either one of the onium salt and the air interface vertical alignment agent. From this result, it was found that both of the onium salt and the air interface vertical alignment agent are necessary for the vertical alignment of the rod-shaped liquid crystal compound.

Optical properties of the second retardation region alone were calculated by measuring light incident angle dependency of Re with an auto-birefringence index meter (KOBRA-21ADH, manufactured by Oji Scientific Instruments) and subtracting, from this, contribution extent of the support having been previously measured, to give such results that for second retardation region 1 Re was 0 nm, Rth was −225 nm; for second retardation region 2 Re was 0 nm, Rth was −180 nm; for second retardation region 3 Re was 0 nm, Rth was −295 nm; for second retardation region 4 Re was 0 nm, Rth was −170 nm; for second retardation region 5 Re was 0 nm, Rth was −292 nm; for second retardation region 8 Re was 0 nm, Rth was −226 nm; for second retardation region 9 Re was 0 nm, Rth was −297 nm: and for second retardation regions 10 and 11 Re was 0 nm, Rth was −296 nm. Thus it was confirmed that the rod-shaped liquid crystal aligned approximately vertically in all the second retardation regions.

<Manufacture of Polarizing Plate Protective Film 1>

In a mixing tank, the following composition was put and stirred with heating to dissolve respective ingredients, thereby preparing cellulose acetate solution A.

| <Composition of Cellulose acetate Solution A> | |
|---|---|
| Cellulose acetate having substitution degree of 2.86 | 100 parts by mass |
| Triphenyl phosphate (plasticizer) | 7.8 parts by mass |
| Biphenyldiphenyl phosphate (plasticizer) | 3.9 parts by mass |
| Methylene chloride (first solvent) | 300 parts by mass |
| Methanol (second solvent) | 54 parts by mass |
| 1-Butanol | 11 parts by mass |

In another mixing tank, the following composition was put and stirred with heating to dissolve respective ingredients, thereby preparing an additive solution B-1.

| <Composition of Additive Solution B-1> | |
| --- | --- |
| Methylene chloride | 80 parts by mass |
| Methanol | 20 parts by mass |
| Retardation lowering agent below | 40 parts by mass |

Retardation lowering agent

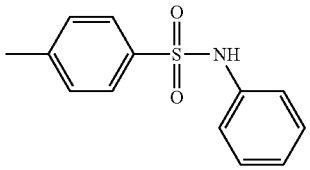

40 parts by mass of the additive solution B-1 was added to 477 parts by mass of the cellulose acetate solution A, which were sufficiently stirred to prepare a dope. The dope was cast from a casting port onto a drum having been cooled to 0° C. The film was peeled off at a solvent content of 70% by mass, and fixed with a pin tenter (pin tenter shown in FIG. 3 of JP-A-4-1009) at both ends in the width direction of the film, and dried in the state of solvent content of 3-5%, while maintaining the distance for defining the draw ratio of 3% in the lateral direction (direction perpendicular to machine direction). Then, by conveying between rolls of a heat treatment apparatus, it was further dried to manufacture a polarizing plate protective film 1 having a thickness of 80 μm.

Light incident angle dependency of Re was measured with an auto-birefringence index meter (KOBRA-21ADH, manufactured by Oji Scientific Instruments) and optical properties were calculated to confirm that Re was 1 nm and Rth was 6 nm.

<Manufacture of Polarizing Plate A>

Next, a polarizing film was manufactured by adsorbing iodine on the previously stretched polyvinyl alcohol film. On the other hand, a commercially available cellulose acetate film (FUJITAC TD80UF, manufactured by Fuji Photo Film Co., LTD., Re=3 nm, Rth=45 nm) was subjected to saponification treatment, which was stuck on one face of the polarizing film with a polyvinyl alcohol-based adhesive to form a polarizing plate A.

<Manufacture of Polarizing Plate B>

A polarizing film was manufactured by adsorbing iodine on the stretched polyvinyl alcohol film. On the other hand, a commercially available cellulose acetate film (FUJITAC TD80UF, manufactured by Fuji Photo Film Co., LTD.) was subjected to saponification treatment, which was stuck on both faces of the polarizing film with a polyvinyl alcohol-based adhesive to form a polarizing plate B.

<Manufacture of Polarizing Plate C>

A polarizing film was manufactured in the same way as above. On the other hand, a commercially available cellulose acetate film (FUJITAC TD80UF, manufactured by Fuji Photo Film Co., LTD.) was subjected to saponification treatment, which was stuck on one face of the polarizing film with a polyvinyl alcohol-based adhesive. Further, in the same way as above, the polarizing plate protective film 1 manufactured as described above was stuck on the other face of the polarizing film to form a polarizing plate C.

<Manufacture of Polarizing Plate D>

A polarizing film was manufactured in the same way as above. On the other hand, a commercially available cellulose acetate film (FUJITAC TD80UF, manufactured by Fuji Photo Film Co., LTD.) was subjected to saponification treatment, which was stuck on one face of the polarizing film with a polyvinyl alcohol-based adhesive. Further, in the same way as above, a commercially available cellulose acetate film (FUJITAC T40UZ, manufactured by Fuji Photo Film Co., LTD., Re=1 nm, Rth=35 nm) was subjected to saponification treatment, which was stuck on the other face of the polarizing film with a polyvinyl alcohol-based adhesive to form a polarizing plate D.

<Manufacture of Polarizing Plate E>

ZEONOR ZF14 (manufactured by ZEON CORPORATION, Re=5 nm, Rth=5 nm) was used in place of the polarizing plate protective film 1 in the polarizing plate C to form a polarizing plate E.

Example 1

The manufactured film retardation 1 was stuck on the side of the polarizing plate A on which the cellulose acetate film as a polarizing film was not stuck with a polyvinyl alcohol-based adhesive so that the first retardation region 1 side was set to the polarizing film side, and that the transmission axis of the polarizing film lay parallel to the slow phase axis of the first retardation region 1, to form a polarizing plate 1.

The polarizing plate 1 was stuck on one side of the IPS mode liquid crystal cell 1 manufactured as above so that the slow phase axis of the first retardation region 1 lay parallel to the rubbing direction of the liquid crystal cell (i.e., so that the slow phase axis of the first retardation region 1 lay parallel to the slow phase axis of the liquid crystal molecules in the liquid crystal cell at the time of black level), and that the second retardation region 1 face side was on the liquid crystal cell side.

Subsequently, on the other side of the IPS mode liquid crystal cell 1, the polarizing plate C was stuck so that the polarizing plate protective film 1 side was on the liquid crystal cell side, and that it was in crossed-Nicols arrangement relative to the polarizing plate 1, to manufacture a liquid crystal display device. For the liquid crystal display device thus manufactured, leaking light was measured. It was 0.06% when observed from the left oblique direction of 60°.

Example 2

The manufactured film retardation 2 was stuck on the side of the polarizing plate A on which a cellulose acetate film as a polarizing film was not stuck with a polyvinyl alcohol-based adhesive so that the first retardation region 1 side was set to the polarizing film side, and that the transmission axis of the polarizing film lay parallel to the slow phase axis of the first retardation region 1, to form a polarizing plate 2.

The polarizing plate 2 was stuck on one side of the IPS mode liquid crystal cell 1 manufactured as above so that the slow phase axis of the first retardation region 1 lay parallel to the rubbing direction of the liquid crystal cell (i.e., so that the slow phase axis of the first retardation region 1 lay parallel to the slow phase axis of the liquid crystal molecule in the liquid crystal cell at the time of black level), and that the second retardation region 2 face side was on the liquid crystal cell side.

Subsequently, on the other side of the IPS mode liquid crystal cell 1, the polarizing plate D was stuck so that the T40UZ side was on the liquid crystal cell side, and that it was in crossed-Nicols arrangement relative to the polarizing plate 2, to manufacture a liquid crystal display device. For the liquid crystal display device thus manufactured, leaking light was measured. It was 0.06% when observed from the left oblique direction of 60°.

Example 3

The film retardation 3 was stuck on the polarizing plate B with an acryl resin-based adhesive so that the second retardation region 3 side was on the polarizing film side, and that the transmission axis of the polarizing film crossed perpendicularly to the slow phase axis of the first retardation region 2, to form a polarizing plate 3.

The polarizing plate 3 was stuck on one side of the IPS mode liquid crystal cell 1 manufactured as above so that the slow phase axis of the first retardation region 2 crossed perpendicularly to the rubbing direction of the liquid crystal cell (i.e., so that the slow phase axis of the first retardation region 2 crossed perpendicularly to the slow phase axis of the liquid crystal molecule in the liquid crystal cell at the time of black level), and that the second retardation region 2 face side was on the liquid crystal cell side.

Subsequently, on the other side of the IPS mode liquid crystal cell 1, the polarizing plate C was stuck so that the polarizing plate protective film 1 side was on the liquid crystal cell side, and that it was in crossed-Nicols arrangement relative to the polarizing plate 3, to manufacture a liquid crystal display device. For the liquid crystal display device thus manufactured, leaking light was measured. It was 0.05% when observed from the left oblique direction of 60°.

Example 4

The film retardation 4 was stuck on the polarizing plate protective film 1 side of the polarizing plate C with an acryl resin-based adhesive so that the second retardation region 4 side was on the polarizing film side, and that the transmission axis of the polarizing film crossed perpendicularly to the slow phase axis of the first retardation region 1, to form a polarizing plate 4.

The polarizing plate 4 was stuck on one side of the IPS mode liquid crystal cell 1 manufactured as above so that the slow phase axis of the first retardation region 1 crossed perpendicularly to the rubbing direction of the liquid crystal cell (i.e., so that the slow phase axis of the first retardation region 1 crossed perpendicularly to the slow phase axis of the liquid crystal molecule in the liquid crystal cell at the time of black level), and that the first retardation region 1 face side was on the liquid crystal cell side.

Subsequently, on the other side of the IPS mode liquid crystal cell 1, the polarizing plate B was stuck so that it was in crossed-Nicols arrangement relative to the polarizing plate 4, to manufacture a liquid crystal display device. For the liquid crystal display device thus manufactured, leaking light was measured. It was 0.09% when observed from the left oblique direction of 60°.

Example 5

The film retardation 6 was stuck on the ZEONOR side of the polarizing plate E with an acryl resin-based adhesive so that the second retardation region 6 side was on the polarizing film side, and that the transmission axis of the polarizing film crossed perpendicularly to the slow phase axis of the first retardation region 1, to form a polarizing plate 6.

This was used to manufacture a liquid crystal display device in the similar way to Example 4, whose leaking light was measured. It was 0.16% when observed from the left oblique direction of 60°.

Example 6

The first retardation region 3 was stuck to the polarizing plate A with a polyvinyl alcohol-based adhesive so that the slow phase axis thereof lay parallel to the transmission axis of the polarizing film. Then, the film retardation 5 was stuck to the first retardation region 3 having been stuck to the polarizing plate A with an acrylic resin-based adhesive so that the first retardation region 3 faced to the stuck first retardation region 3 side, and that the transmission axis of the polarizing film of the polarizing plate A lay parallel to the slow phase axis of the first retardation region 3, to form a polarizing plate 5. In this case, the first retardation region was composed of a laminate of 2 first retardation regions 3 (Re=35 nm, Rth=135 nm) and had optical properties of Re=70 nm, Rth=270 nm and Nz=4.4 as a retardation region.

The polarizing plate 5 was stuck on one side of the IPS mode liquid crystal cell 1 manufactured as above so that the slow phase axis of the first retardation region 3 lay parallel to the rubbing direction of the liquid crystal cell (i.e., so that the slow phase axis of the first retardation region 3 lay parallel to the slow phase axis of the liquid crystal molecule in the liquid crystal cell at the time of black level), and that the second retardation region 3 face side was on the liquid crystal cell side.

Subsequently, on the other side of the IPS mode liquid crystal cell 1, the polarizing plate D was stuck so that the T40UZ side was on the liquid crystal cell side, and that it was in crossed-Nicols arrangement relative to the polarizing plate 2, to manufacture a liquid crystal display device. For the liquid crystal display device thus manufactured, leaking light was measured. It was 0.14% when observed from the left oblique direction of 60°.

Comparative Example 1

A polarizing plate was manufactured in the same way as Example 1 except for replacing the film retardation 1 used in the formation of the polarizing plate 1 with a film retardation 8. Further, it was stuck to a liquid crystal cell in the same way as described in Example 1 to manufacture a liquid crystal display device. For the liquid crystal display device thus manufactured, leaking light was measured. It was 0.14% when observed from the left oblique direction of 60°.

Comparative Example 2

A polarizing plate was manufactured in the same way as Example 1 except for replacing the film retardation 1 used in the formation of the polarizing plate 1 with a film retardation 9. Further, it was stuck to a liquid crystal cell in the same way as described in Example 1 to manufacture a liquid crystal display device. For the liquid crystal display device thus manufactured, leaking light was measured. It was 0.09% when observed from the left oblique direction of 60°.

Comparative Example 3

A polarizing plate 8 was manufactured in the same way as Example 1 except for replacing the film retardation 1 used in the formation of the polarizing plate 1 with a film retardation 10. Further, it was stuck to a liquid crystal cell in the same way as described in Example 1 to manufacture a liquid crystal display device. For the liquid crystal display device thus manufactured, leaking light was measured. It was 0.09% when observed from the left oblique direction of 60°.

Comparative Example 4

A polarizing plate 9 was manufactured in the same way as Example 1 except for replacing the film retardation 1 used in the formation of the polarizing plate 1 with a film retardation 11. Further, it was stuck to a liquid crystal cell in the same way as described in Example 1 to manufacture a liquid crystal display device. For the liquid crystal display device thus manufactured, leaking light was measured. It was 0.09% when observed from the left oblique direction of 60°.

Comparative Example 5

On both sides of the IPS mode liquid crystal cell 1 manufactured as above, commercially available polarizing plates (HLC2-5618, manufactured by SANRITZ Corporation) were stuck in the crossed-Nicols arrangement, to manufacture a liquid crystal display device. No optical compensatory film was used. In the liquid crystal display device, as was the case for Example 1, the upside polarizing plate was stuck so that the transmission axis thereof lay parallel to the rubbing direction of the liquid crystal cell. For the liquid crystal display device thus manufactured, leaking light was measured. It was 0.55% when observed from the left oblique direction of 60°.

As shown above, the optical compensatory film of the invention can satisfy both of improving unevenness in thickness caused by drying air and coating unevenness, and optical properties. The use of the optical compensatory film of the invention made it possible to manufacture a liquid crystal display device having a little light leakage from oblique directions.

Industrial Applicability

The optical compensatory film of the invention is particularly preferable for liquid crystal display devices of the in-plane switching mode that carries out display by applying a lateral electric field to liquid crystal molecules aligned in the horizontal direction.

The invention claimed is:

1. An optical compensatory film comprising an optically anisotropic layer composed of a liquid crystal composition, wherein the liquid crystal composition comprises a liquid crystal compound, and at least one type of fluoroaliphatic group-containing copolymer including a repeating unit derived from a fluoroaliphatic group-containing monomer represented by the following formula [1] and a repeating unit derived from a monomer represented by the following formula [2]:

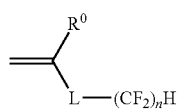

Formula [1]

wherein $R^0$ represents a hydrogen atom, a halogen atom or an alkyl group, L represents a divalent linking group, and n represents an integer in the range of 1-18;

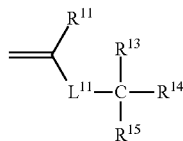

Formula [2]

wherein $R^{11}$ represents a hydrogen atom, a halogen atom or an alkyl group, $L^{11}$ represents a divalent linking group, and $R^{13}$, $R^{14}$ and $R^{15}$ each independently represents a straight-chain, branched or cyclic hydrocarbon group having 1-20 carbon atoms or an aromatic heterocyclic group, which may have a substituent.

2. The optical compensatory film according to claim 1, wherein the fluoroaliphatic group-containing monomer represented by the formula [1] is represented by the following formula [3]:

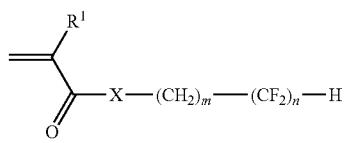

Formula [3]

wherein $R^1$ represents a hydrogen atom, a halogen atom or an alkyl group, X represents an oxygen atom, a sulfur atom or —N(Ra)—, m represents an integer in the range of 1-6, n represents an integer in the range of 1-18, and Ra represents a hydrogen atom or an alkyl group having 1-8 carbon atoms, which may have a substituent.

3. The optical compensatory film according to claim 1, wherein the monomer represented by the formula [2] is represented by the following formula [7]:

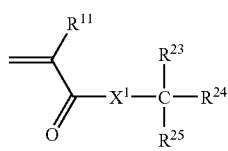

Formula [7]

wherein $R^{11}$ represents a hydrogen atom, a halogen atom or a methyl group, $X^1$ represents an oxygen atom, a sulfur atom or —N(Rc)—, $R^{23}$, $R^{24}$, $R^{25}$ each independently represents a straight-chain, branched or cyclic alkyl group having 1-20 carbon atoms, and Rc represents a hydrogen atom or an alkyl group having 1-8 carbon atoms, which may have a substituent.

4. The optical compensatory film according to claim 1, wherein the liquid crystal compound is a rod-shaped liquid crystal compound, and the liquid crystal compound is substantially vertically aligned.

5. A liquid crystal display device comprising the optical compensatory film according to claim 1.

* * * * *